US011042286B1

(12) United States Patent
Boyers

(10) Patent No.: US 11,042,286 B1
(45) Date of Patent: *Jun. 22, 2021

(54) METHODS AND GRAPHICAL USER INTERFACES FOR POINTING AND EDITING ON COMPUTING DEVICES WITH TOUCH-SENSITIVE DISPLAYS

(71) Applicant: David Graham Boyers, Los Altos, CA (US)

(72) Inventor: David Graham Boyers, Los Altos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/865,385

(22) Filed: May 3, 2020

Related U.S. Application Data

(63) Continuation of application No. 14/120,153, filed on Apr. 29, 2014, now Pat. No. 10,719,224.

(60) Provisional application No. 61/854,738, filed on Apr. 29, 2013.

(51) Int. Cl.
*G06F 3/01* (2006.01)
*G06F 3/0481* (2013.01)
*G06F 3/0484* (2013.01)
*G06F 3/0488* (2013.01)

(52) U.S. Cl.
CPC ............ *G06F 3/0488* (2013.01); *G06F 3/017* (2013.01); *G06F 3/0484* (2013.01); *G06F 3/04812* (2013.01)

(58) Field of Classification Search
None
See application file for complete search history.

(56) References Cited

U.S. PATENT DOCUMENTS

| | | | |
|---|---|---|---|
| 7,856,605 B2 | 12/2010 | Ording et al. |
| 8,201,109 B2 | 6/2012 | Van Os et al. |
| 8,255,830 B2 | 8/2012 | Ording et al. |
| 8,370,736 B2 | 2/2013 | Ording et al. |
| 8,510,665 B2 | 8/2013 | Ording et al. |
| 8,570,278 B2 | 10/2013 | Kocienda et al. |
| 8,584,050 B2 | 11/2013 | Ording et al. |
| 8,610,671 B2 | 12/2013 | Ording et al. |
| 8,650,507 B2 | 2/2014 | Westerman et al. |
| 8,661,362 B2 | 2/2014 | Kocienda et al. |
| 8,698,773 B2 | 4/2014 | Westerman et al. |
| 8,756,534 B2 | 6/2014 | Ording et al. |
| 9,032,338 B2 | 5/2015 | Murrell et al. |
| 9,207,855 B2 | 12/2015 | Kocienda et al. |

(Continued)

OTHER PUBLICATIONS

Vim, "Highlight Current Line," 2004, Vim Tips Wiki, Published on Web; http://vim.wikia.com/wiki/Highlight_current_line.

(Continued)

*Primary Examiner* — Ryan A Lubit

(57) ABSTRACT

A mobile computing device with a touch-sensitive display wherein: a pointer is displayed; a control icon is displayed; a contact on the touch-sensitive display is detected; and in response to detecting a change in a horizontal position of the contact beginning anywhere on the control icon, a horizontal position of the pointer is changed wherein the horizontal position of the pointer with respect to the control icon is changed; and in response to detecting a change in a vertical position of a contact beginning anywhere on the control icon: a vertical position of the pointer is changed; and a vertical position of the control icon is changed.

22 Claims, 86 Drawing Sheets

(56) References Cited

U.S. PATENT DOCUMENTS

| | | | |
|---|---|---|---|
| 2008/0048980 A1* | 2/2008 | Love ................... | G06F 3/0346 |
| | | | 345/158 |
| 2009/0167700 A1 | 7/2009 | Westerman | |
| 2009/0174679 A1* | 7/2009 | Westerman ......... | G06F 3/04883 |
| | | | 345/173 |
| 2009/0228842 A1 | 9/2009 | Westerman | |
| 2011/0279384 A1* | 11/2011 | Miller ................. | G06F 3/04886 |
| | | | 345/173 |
| 2012/0017147 A1 | 1/2012 | Mark | |
| 2012/0306772 A1 | 12/2012 | Tan | |
| 2012/0311507 A1* | 12/2012 | Murrett ................ | G06F 40/166 |
| | | | 715/863 |
| 2014/0078056 A1* | 3/2014 | Yu ....................... | G06F 3/03545 |
| | | | 345/157 |
| 2015/0074578 A1* | 3/2015 | Liang .................. | G06F 3/04886 |
| | | | 715/770 |

OTHER PUBLICATIONS

Head Minion, "Scroll a Word Document, Without Moving the Cursor," Aug. 23, 2010, Bitter Minion Development, Blog Article Published on Web; http://www.bitterminion.com/2010/08/23/stationinary-scrolling-in-microsoft-word/.

\* cited by examiner

METHODS AND GRAPHICAL USER INTERFACES FOR POINTING AND EDITING ON COMPUTING DEVICES WITH TOUCH-SENSITIVE DISPLAYS

RELATED APPLICATIONS

This application claims priority to U.S. Provisional Patent Application, No. 61/854,738, "Methods and Graphical User Interfaces for Pointing and Editing on Computing Devices with Touch-Sensitive Displays," filed by the applicant on Apr. 29, 2013.

TECHNICAL FIELD

The disclosed embodiments relate generally to mobile computing devices with touch-sensitive displays, particularly to computer-implemented methods and graphical user interfaces for enabling a user conveniently to point, select, and drag objects and edit content on a device with a touch-sensitive display.

BACKGROUND

Mobile computing devices with touch-sensitive displays such as smart phones and pad computing devices are two of the fastest growing categories of computing devices. These devices threaten to displace notebook and desktop computers as the preferred platform for many tasks that users engage in every day. Developers of these mobile devices have eschewed mouse and touchpad pointing devices in favor of on-screen graphical user interfaces and methods that have the user select content and edit content on touch-sensitive displays using direct manipulation of objects on the screen. Ording, et. al. describe one example of this current approach in US2010/0235770A1. However, the performance and usability of these current solutions is generally inferior to the mouse and/or touchpad based solutions commonly employed with conventional notebook and desktop devices. These current solutions do not support quick and precise pointing and selecting and dragging tasks for objects of all sizes. Whereas these current solutions support a simple task such quick selection of a single word or an entire content, they do not support quick selection of a particular item, object, character, group of characters, or group of words. In addition, they do not support equally well tasks performed at any location on the display ranging from tasks near the center of the display to those near the edge of the display. Whereas these solutions seek to support applications written for devices with touch sensitive displays, they do not support access to applications written for conventional notebooks and desktop devices designed for use with a mouse or touchpad. This effectively denies the user access to the host of applications that have been written for desktop and notebook computing devices. Furthermore, these existing solutions do not support "secondary click" actions and "mouse-over" actions commonly used in apps written for access by desktop and notebook computing devices. These existing solutions also do not support user setting of key control parameters to meet user preferences and user needs. Finally, these existing solutions do not support accessibility settings to enable the broadest set of users to access applications on these powerful devices.

We have developed methods and graphical user interfaces for pointing and selecting on computing devices with touch-sensitive displays that overcome the deficiencies of existing solutions.

SUMMARY

A method, comprising: at a mobile computing device with a touch sensitive display: displaying a pointer positioning and control icon; displaying a pointer; detecting a finger contact on the pointer positioning and control icon beginning at any position along a horizontal extent of the pointer positioning and control icon; and in response to detecting a change in the position of a finger contact on the pointer positioning and control icon from a first position to a second position: changing the position of the pointer on the touch sensitive display from a pointer first position to a pointer second position such that the change in a horizontal position of the pointer is proportional to the change in a horizontal position of the finger contact and the change in a vertical position of the pointer is proportional to the change in a vertical position of the finger contact.

A mobile computing device, comprising: a touch sensitive display; one or more processors; memory; and one or more programs, wherein the one or more programs are stored in memory and configured to be executed by the one or more processors, the one or more programs including instructions for: displaying a pointer positioning and control icon; displaying a pointer; detecting a finger contact on the pointer positioning and control icon beginning at any position along a horizontal extent of the pointer positioning and control icon; and in response to detecting a change in the position of a finger contact on the pointer positioning and control icon from a first position to a second position: changing the position of the pointer on the touch sensitive display from a pointer first position to a pointer second position such that the change in a horizontal position of the pointer is proportional to the change in a horizontal position of the finger contact and the change in a vertical position of the pointer is proportional to the change in a vertical position of the finger contact.

A computer readable storage medium storing one or more programs, the one or more programs comprising instructions, which when executed by a computing device, cause the device to: display a pointer positioning and control icon; display a pointer; detect a finger contact on the pointer positioning and control icon beginning at any position along a horizontal extent of the pointer positioning and control icon; and in response to detecting a change in the position of a finger contact on the pointer positioning and control icon from a first position to a second position: change the position of the pointer on the touch sensitive display from a pointer first position to a pointer second position such that the change in a horizontal position of the pointer is proportional to the change in a horizontal position of the finger contact and the change in a vertical position of the pointer is proportional to the change in a vertical position of the finger contact.

A graphical user interface on a computing device with a touch sensitive display, memory, and one or more processors to execute one or more programs stored in memory, the graphical user interface comprising: a pointer positioning and control icon is displayed; a pointer is displayed; finger contact on the pointer positioning and control icon beginning at any position along a horizontal extent of the pointer positioning and control icon is detected; and in response to detecting a change in the position of a finger contact on the pointer positioning and control icon from a first position to a second position: the position of the pointer on the touch sensitive display is changed from a pointer first position to a pointer second position such that the change in a horizontal position of the pointer is proportional to the change in a horizontal position of the finger contact and the change in a vertical position of the pointer is proportional to the change in a vertical position of the finger contact.

We begin with a brief description of the drawings.

BRIEF DESCRIPTION OF THE DRAWINGS

For a better understanding of the embodiments of the invention, reference should be made to the Description of Embodiments below, in conjunction with the following drawings in which like reference numerals refer to corresponding parts throughout the figures.

DETAILED DESCRIPTION

Reference will now be made in detail to embodiments, examples of which are illustrated in the included drawings. In the following detailed description, many specific details are set forth in order to provide a thorough understanding of the present invention. However, it will be apparent to one of ordinary skill in the art that the present invention may be practiced without these specific details. In other embodiments, well-known methods, procedures, components, circuits, and networks have not been described in detail so as to not obscure aspects of the embodiments.

The terminology used in the description of the invention is for the purpose of describing particular embodiments only and is not intended to be limiting of the invention. As used in the description, the singular forms "a", "an", and "the" are intended to include the plural forms as well, unless the context clearly indicates otherwise. It will also be understood that the term and/or as used herein refers and encompasses any and all possible combinations of one or more of the associated listed items.

Embodiments of computing devices, user interfaces for such devices, and associated processes for using such devices are described. In some embodiments, the computing device is a handheld mobile computing device such as a smart phone. In some embodiments, the computing device is a handheld mobile computing device such as a pad or tablet. Exemplary embodiments of such handheld mobile computing devices include, without limitation, the iPhone by Apple computer, the Windows phone by Microsoft, the Blackberry by Blackberry, and Galaxy phone by Samsung, the Nexus phone by Google, the iPad by Apple computer, the Surface by Microsoft, and the Galaxy Tab by Samsung, and the Nexus tablet by Google. The device supports a variety of applications including a web browser, an email application, a contacts application, and productivity applications included with the device when sold. The device also supports a variety of applications (apps) developed by third parties that are available for purchase and download from an application store. Typically, an application store makes available applications written to run on a particular mobile operating system. Exemplary operating systems for handheld mobile computing devices include, without limitation, iOS by Apple, Android by Google, and Windows by Microsoft.

In the discussion that follows, a handheld mobile computing device that includes a display and touch-sensitive surface is described. It should be understood, however, that the computing device may include one or more physical user-interface devices, such as a physical keyboard, and mouse, and/or a touchpad.

Attention is now directed towards embodiments of handheld mobile computing devices with touch-sensitive displays.

Figure 1:
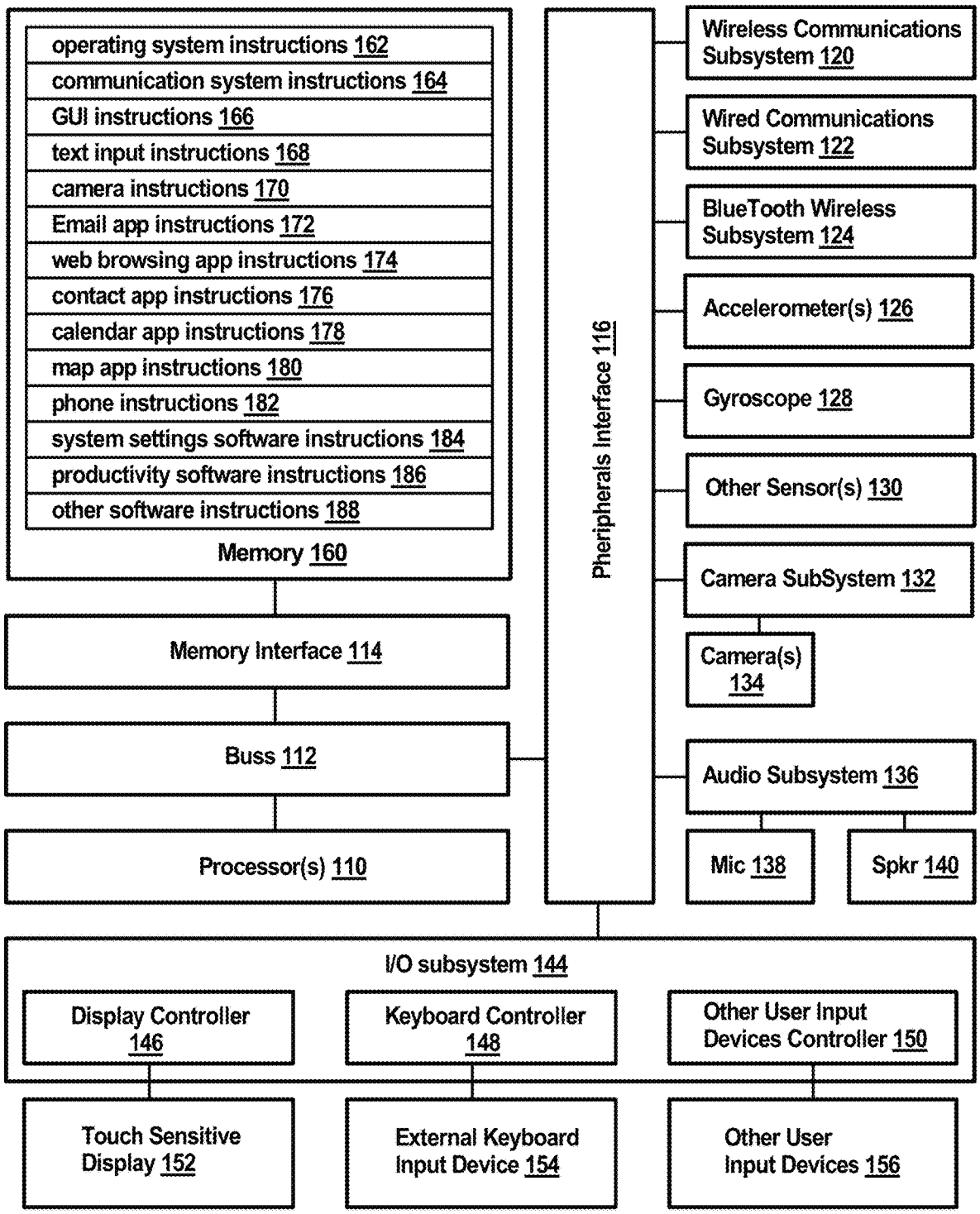
FIG. 1 is a block diagram illustrating a handheld computing device with a touch-sensitive display in accordance with some embodiments.

FIG. 1 is a block diagram illustrating a handheld mobile computing device 100 with a touch-sensitive display in accordance with some embodiments. The device includes processor(s) 110 connected via buss 112 to memory interface 114 to memory 160. The memory will typically contain operating system instructions 162, communication system instructions 164, GUI (graphical user interface) instructions 166, and text input instructions 168. The memory may contain camera instructions 170, email app instructions 172, web browsing app instructions 174, contact app instructions 176, calendar app instructions 178, map app instructions 180, phone app instructions 182, system settings software instructions 184, productivity software instructions 186, and other software instructions 188. The device also includes processors(s) 110 connected via buss 112 to peripherals interface 116. Peripherals interface 116 may be connected to a wireless communications subsystem 120, wired communications subsystem 122, Bluetooth wireless communications subsystem 124, accelerometer(s) 126, gyroscope 128, other sensor(s) 130, camera subsystem 132, and audio subsystem 136. The wireless communication system includes elements for supporting wireless communication via WiFi or cellular or any other wireless networking system. The accelerometers provide information regarding device orientation to the GUI instructions to enable the change of the orientation of the graphical user interface to match the orientation of the device as the device is viewed in portrait or landscape orientation. The camera subsystem is connected to camera(s) 134. These cameras may include one or more cameras for supporting real time video conferencing over a network connection. The audio system may be connected to microphone 138 and speaker 140. The peripherals interface 116 is connected to I/O subsystem 144 comprising display controller 146, keyboard controller 148, and other input devices controller 150. Display controller 146 is connected to touch-sensitive display 152. Keyboard controller 148 may be connected to other physical keyboard input device including external keyboard input device 154. Other user input devices controller may be connected to other user input devices 156, including, but not limited to a mouse, a touchpad, a visual gaze tracking input device, or other input device.

It should be understood that the device 100 is only one example of a handheld mobile computing device 100, and that the device 100 may have more or fewer components than those shown, may combine two or more components, or may have a different configuration or arrangement of components. The components shown in FIG. 1 may be implemented in hardware, software, or a combination of hardware and software.

Figure 2A:
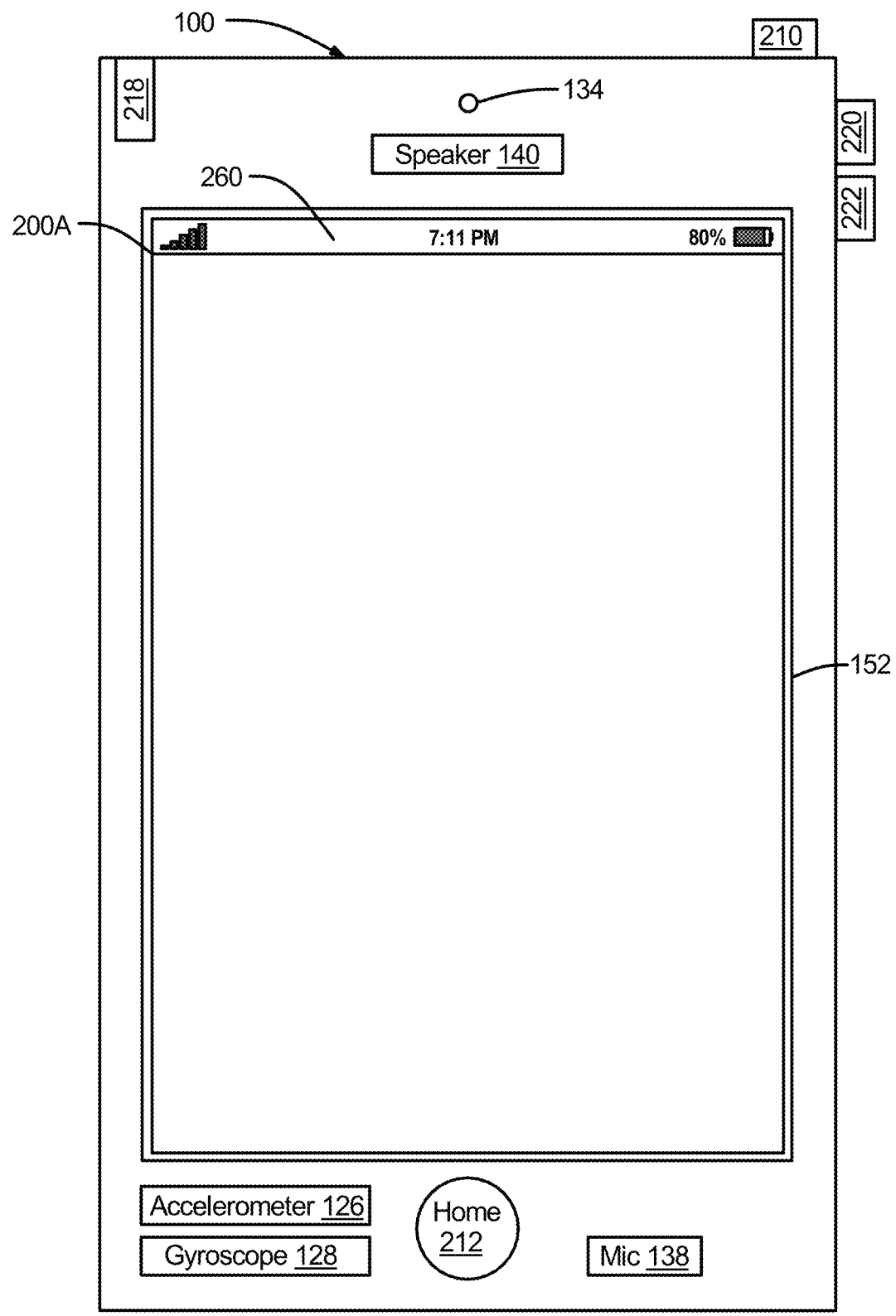
FIGS. 2A-2C illustrate handheld mobile computing devices having a touch-sensitive display in accordance with some embodiments.
Figure 2B:
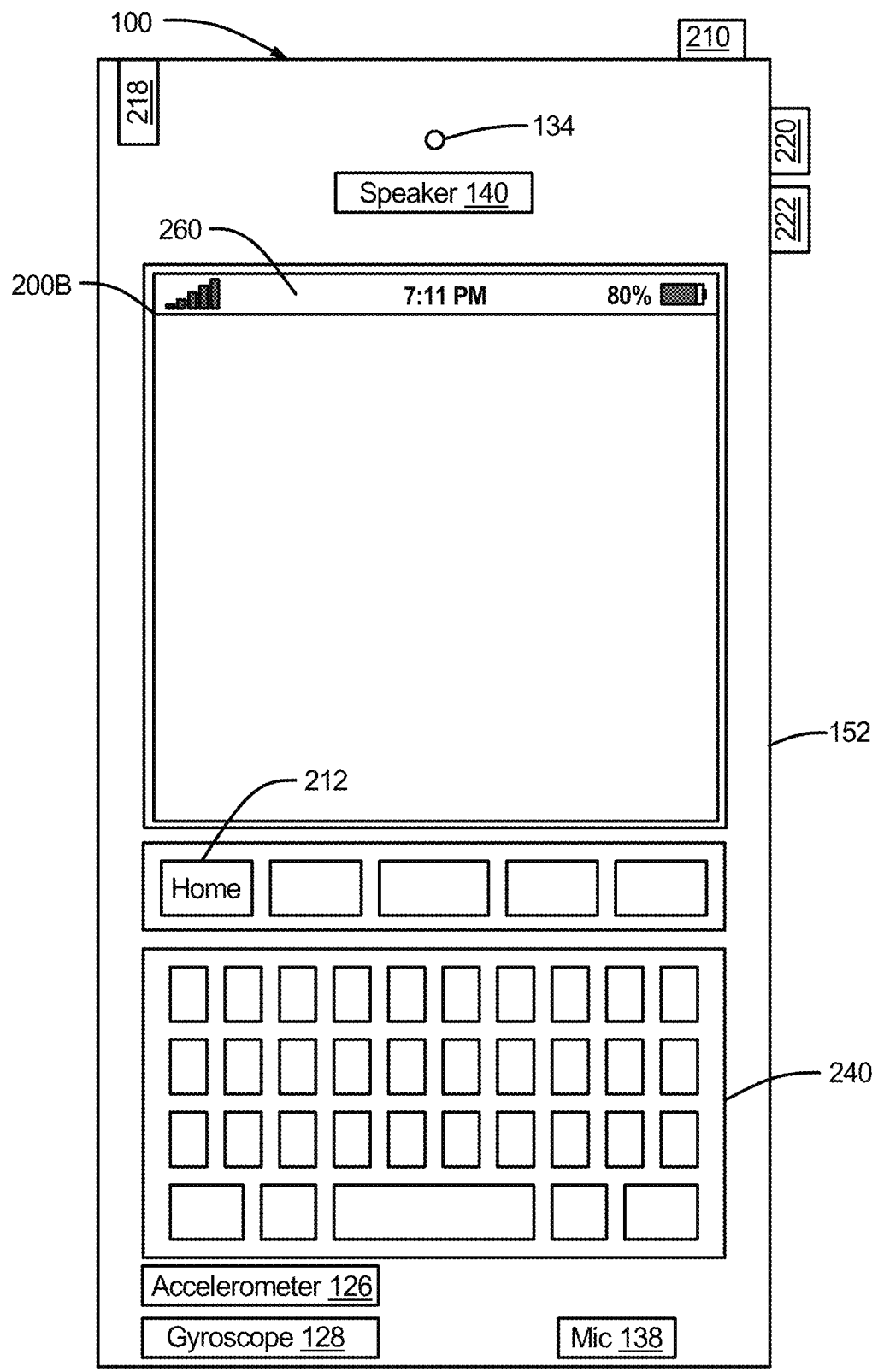
Figure 2C:
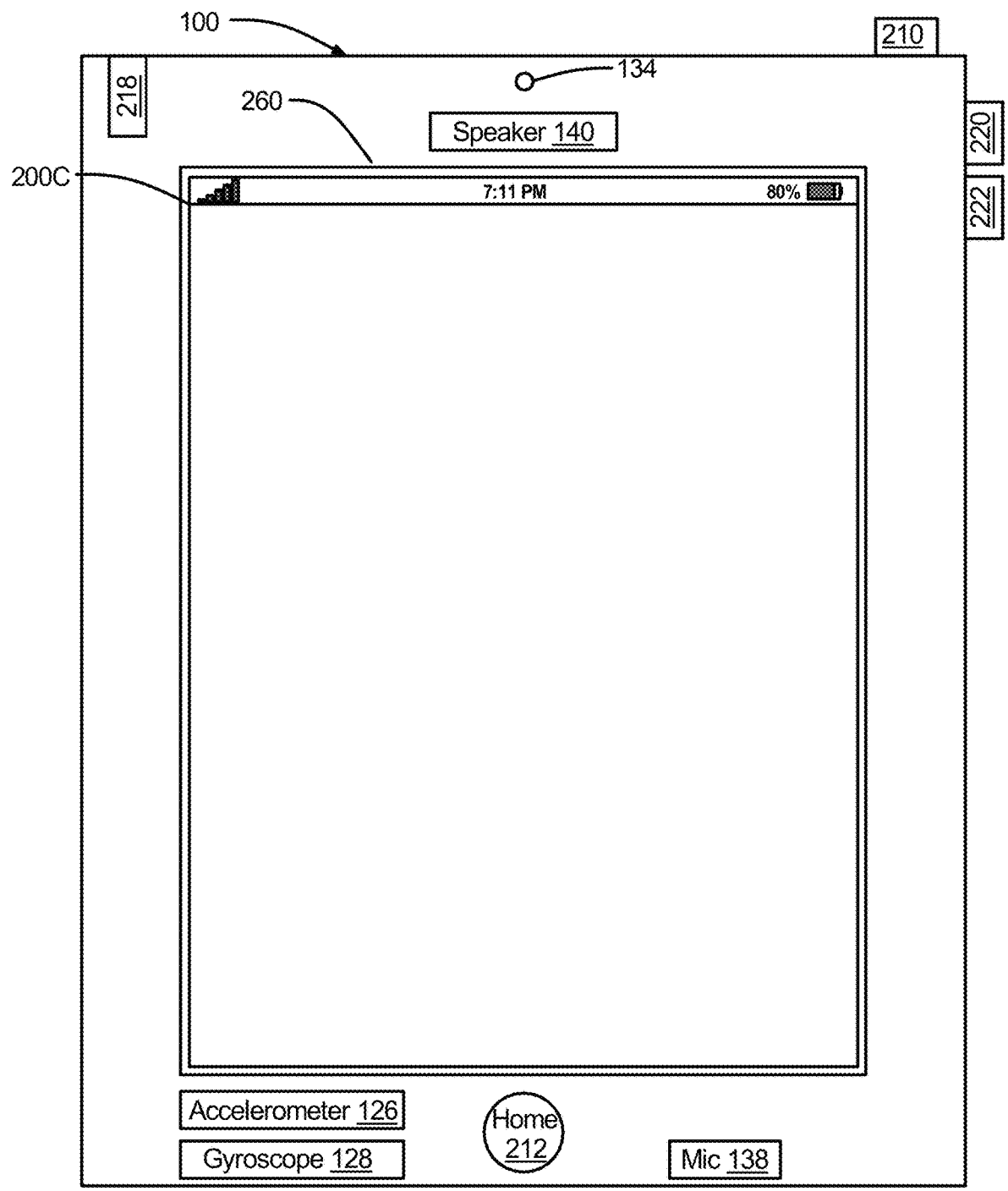

FIGS. 2A-2C illustrate examples of a handheld mobile computing device 100 having a touch-sensitive display 152 in accordance with some embodiments. Handheld computing device 100 may be a smart phone (FIGS. 2A and 2B) or a pad or tablet (FIG. 2C). The touch-sensitive display may display one or more graphics within a user interface on touch-sensitive display 152. In this embodiment, as well as others described below, a user may select one or more graphics (in many instances these graphics are in the form of icons), by making contact with or touching the graphics, for example, with one or more fingers. In some embodiments, selection occurs when a user breaks contact with one or more graphics. In some embodiments, the contact may include a finger gesture, such as one or more taps, or swipes. A swipe finger gesture may be used to drag one icon to the location of another icon, for example. The device 100 may include one or more physical buttons such sleep/wake or power off/on button 210, home button 212, and volume up and down button pair 220 and 222. The device may include one or more accelerometers 126, a gyroscope 128 for sensing the position of the device position in space. The device may include a microphone 138, and speaker 140. The device may include earphone/microphone jack 218 for connection to an external headset. The device may include camera 134, status bar 260, and soft keyboard 240.

Attention is now directed towards embodiments of user interfaces that may be implemented on handheld mobile computing device 100.

The device detects the location of a finger contact and movement of a finger contact across a touch-sensitive display. In some embodiments the finger contact is part of a finger gesture. The device detects the location of a finger gesture and type of finger gesture. Example finger gestures include, but are not limited to, a tap finger gesture (momentary contact of a single finger on the display with no motion across the display), a long-press finger gesture (extended contact of a single finger on the display with no motion across the display, with the duration of the finger contact being approximately 1 or 2 seconds for example), a two-finger-tap finger gesture (momentary and simultaneous contact of two fingers on the display with no motion across the display), a slide finger gesture (extended and uninterrupted contact of a single finger on the display together with motion across the display), and a tap-and-slide finger gesture (momentary contact of a single finger on the display with no motion across the display, followed by extended and uninterrupted contact of a single finger on the display together with motion across the display which begins at the location of the initial tap). The device responds to user gestures and displays a UI based upon the location and type of gesture that the device detects.

FIGS. 3A-3J, FIGS. 4A-4H, FIGS. 5A-5G, FIGS. 6A-6F, FIGS. 7A-7E, FIGS. 8A-8H, FIGS. 9A-9D, FIGS. 10A-10I, FIGS. 11A-11H, FIGS. 12A-12G, and FIGS. 13A-13E illustrate exemplary user interfaces for use in implementing the methods disclosed herein including but not limited to those methods presented in the flow diagrams in FIGS. 14-18. In each case we show a sequence of user interface (UI) drawings to illustrate the use of the UI to implement key elements of the methods.

Figure 3A:
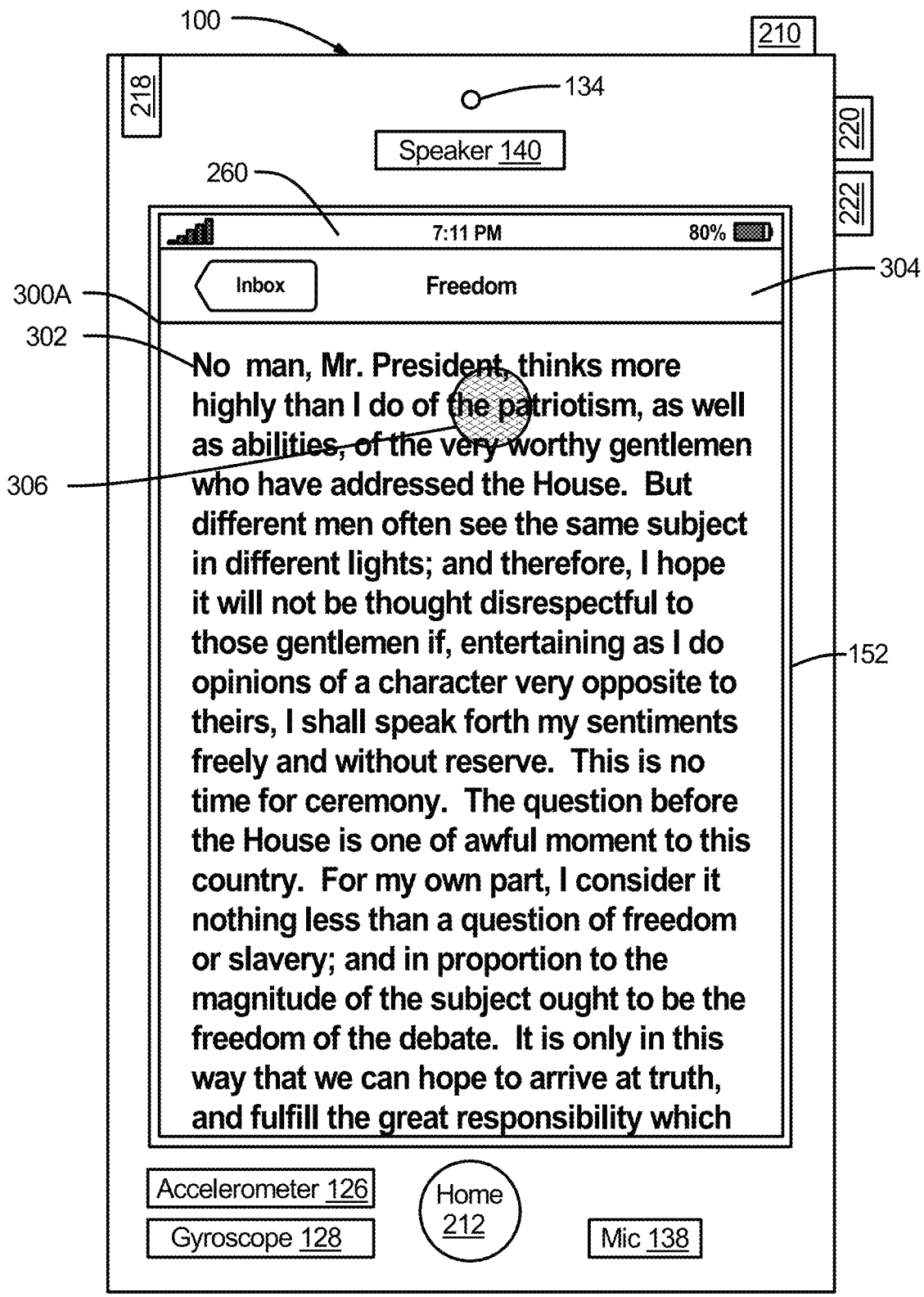
FIGS. 3A-3J illustrate an exemplary user interface for positioning a pointer within read-only content on a handheld mobile computing device with a touch-sensitive display in accordance with some embodiments.
Figure 3B:
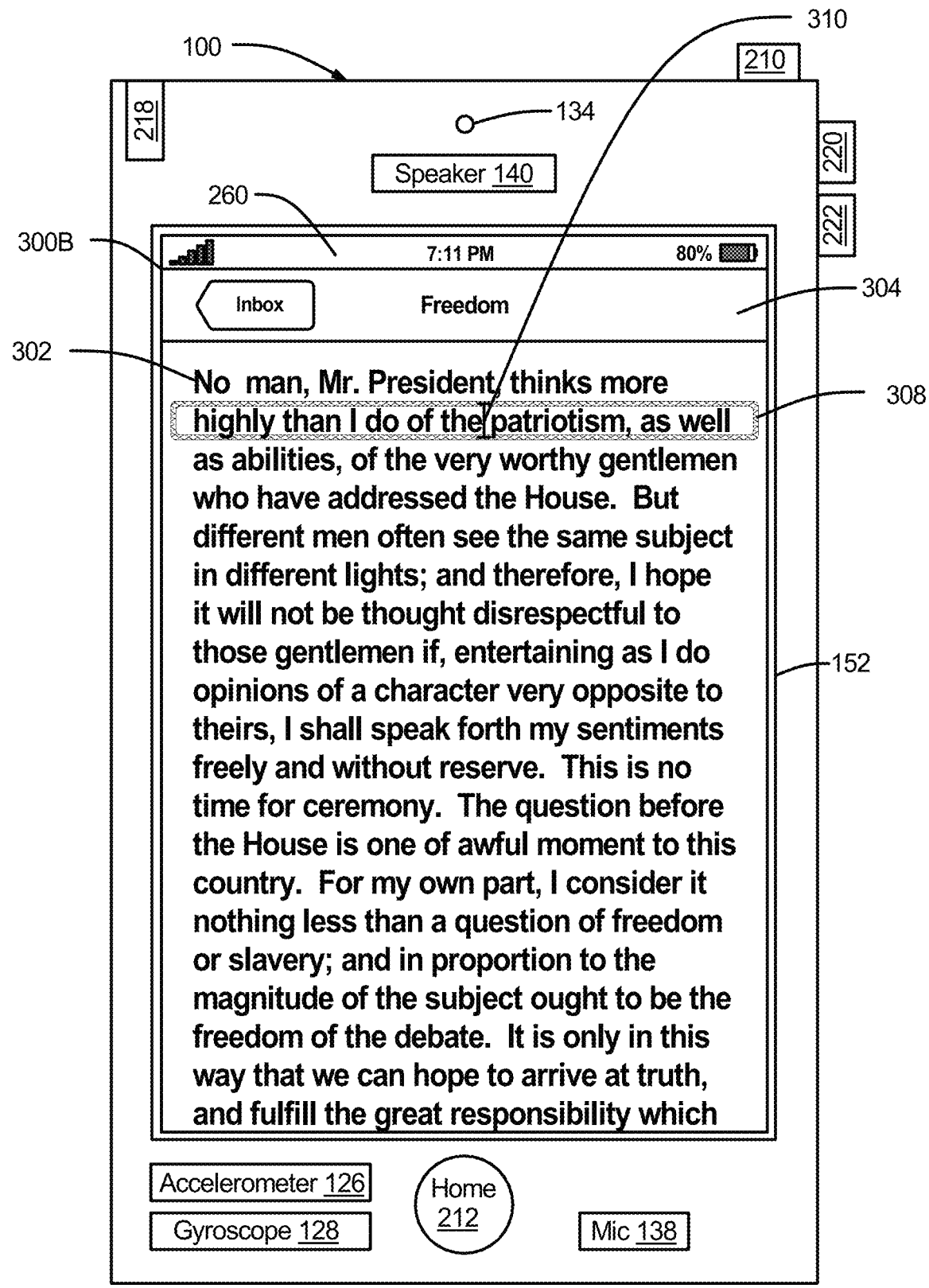
Figure 3C:
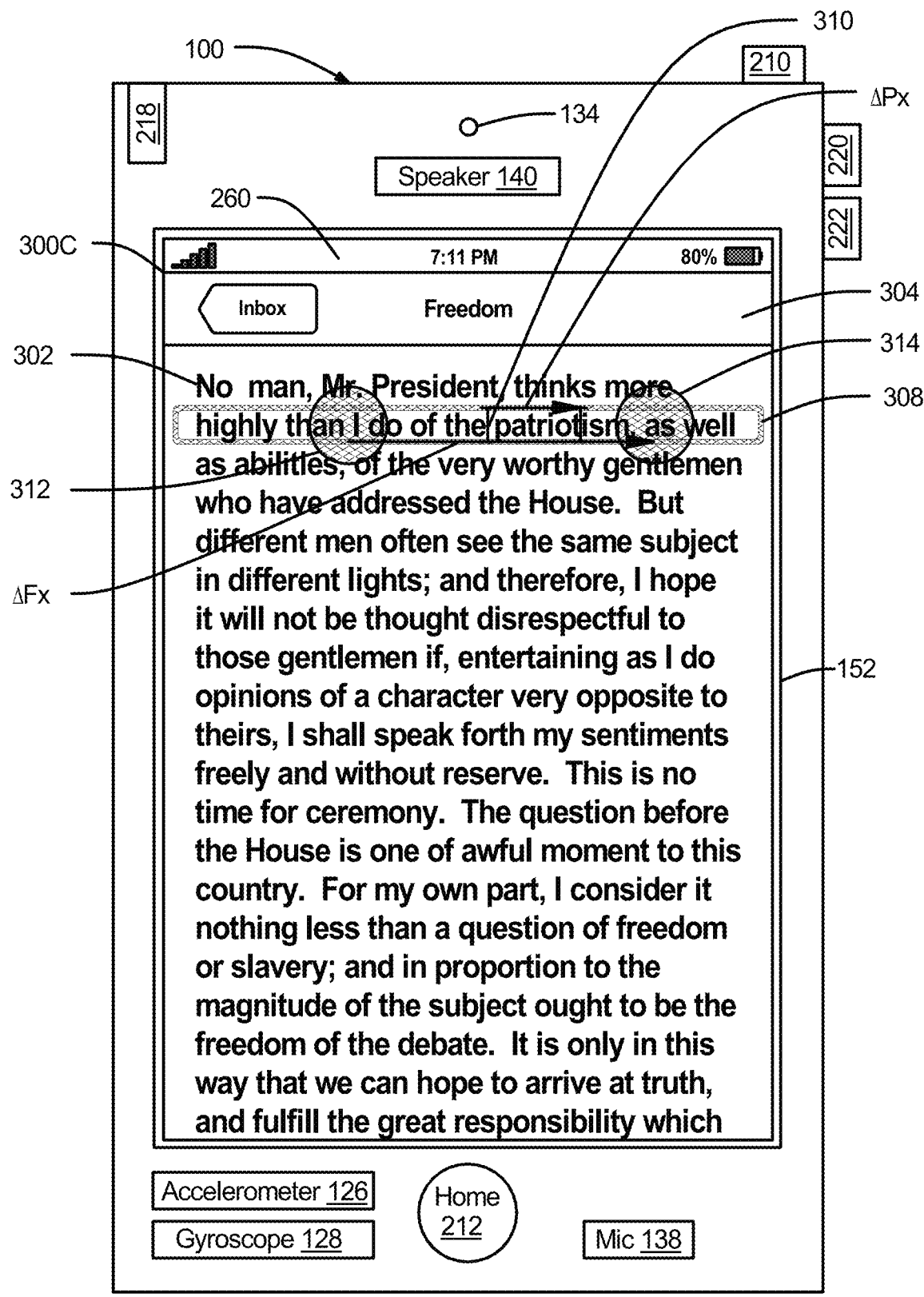
Figure 3D:
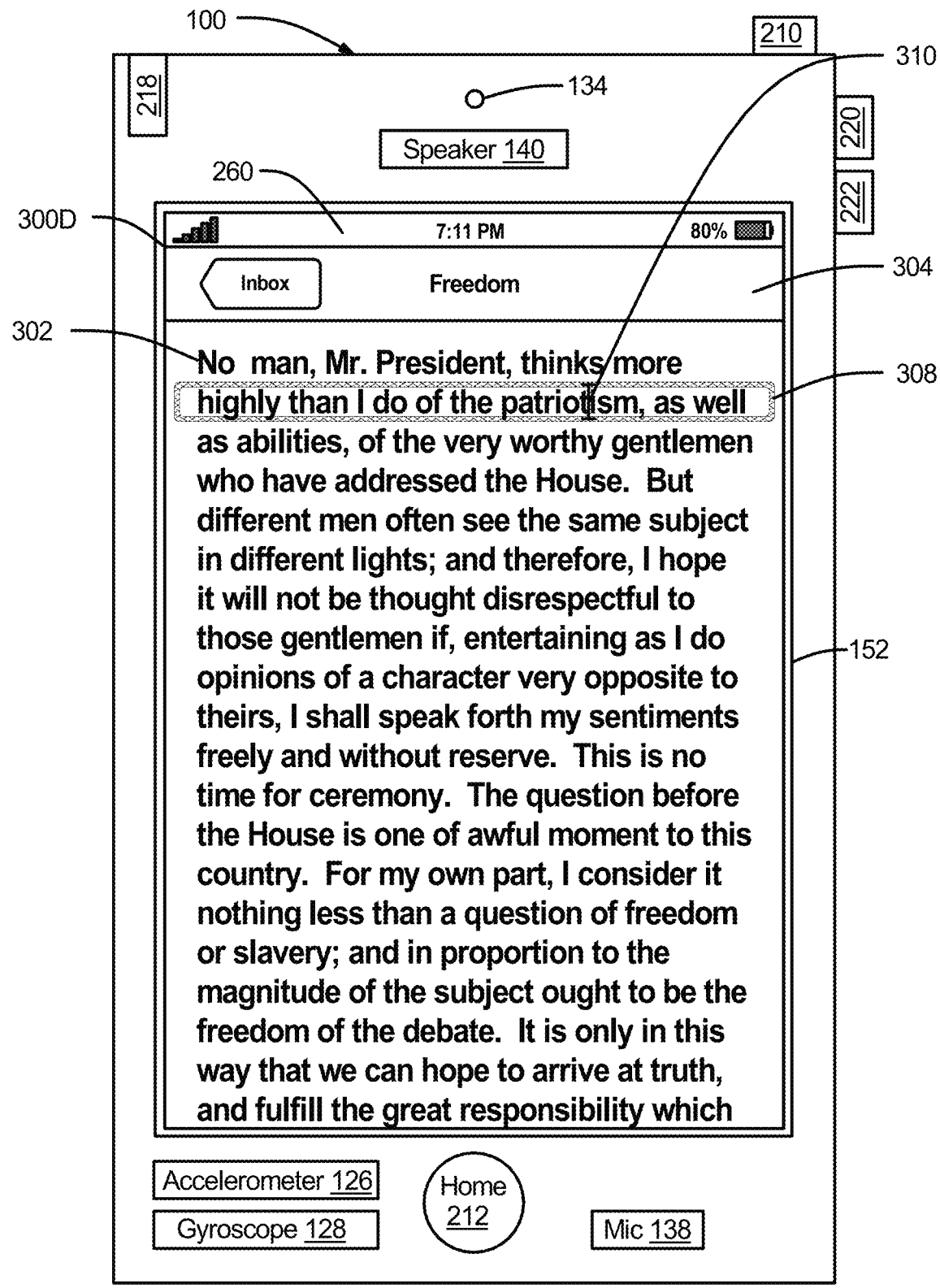
Figure 3E:
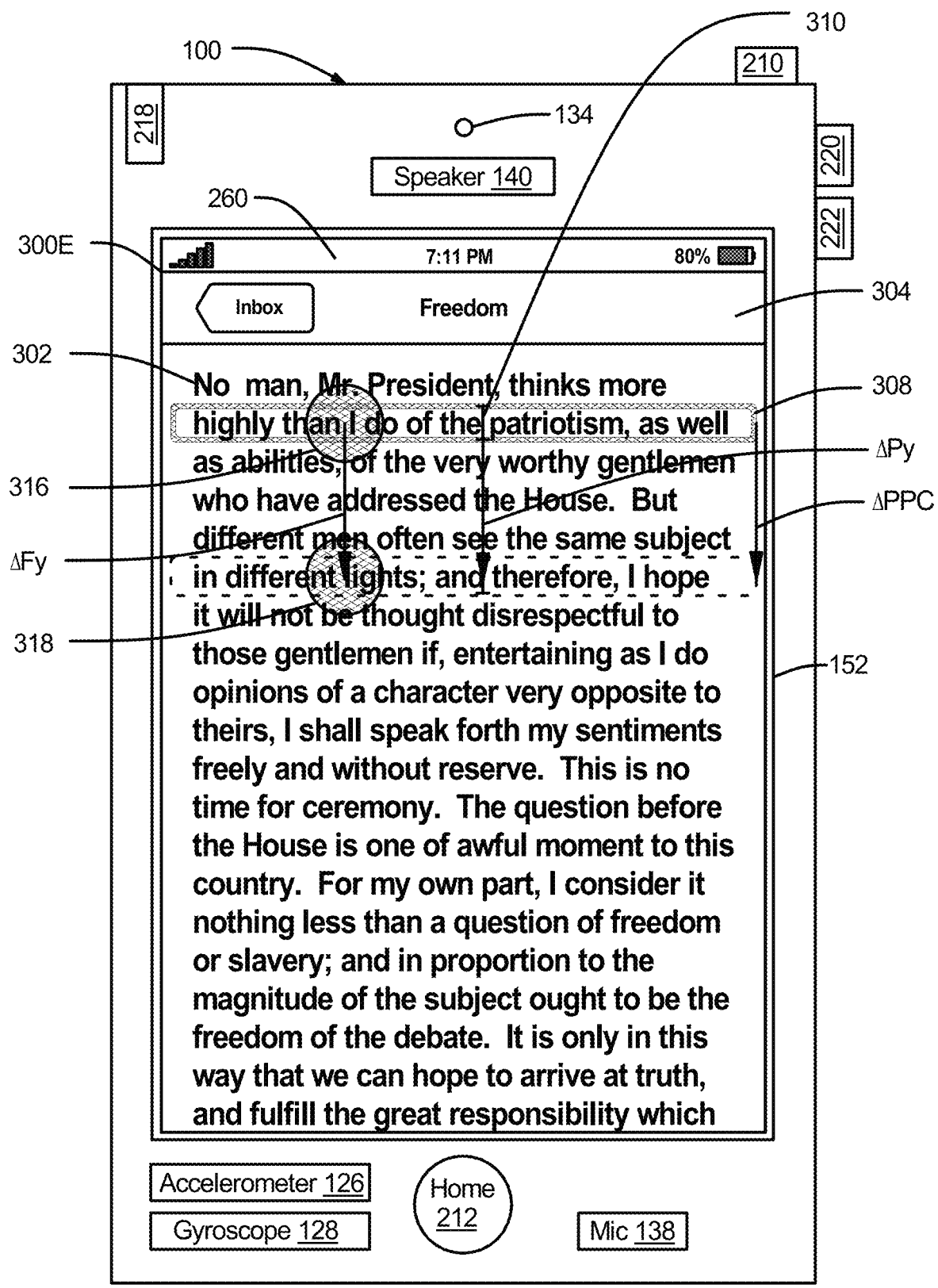
Figure 3F:
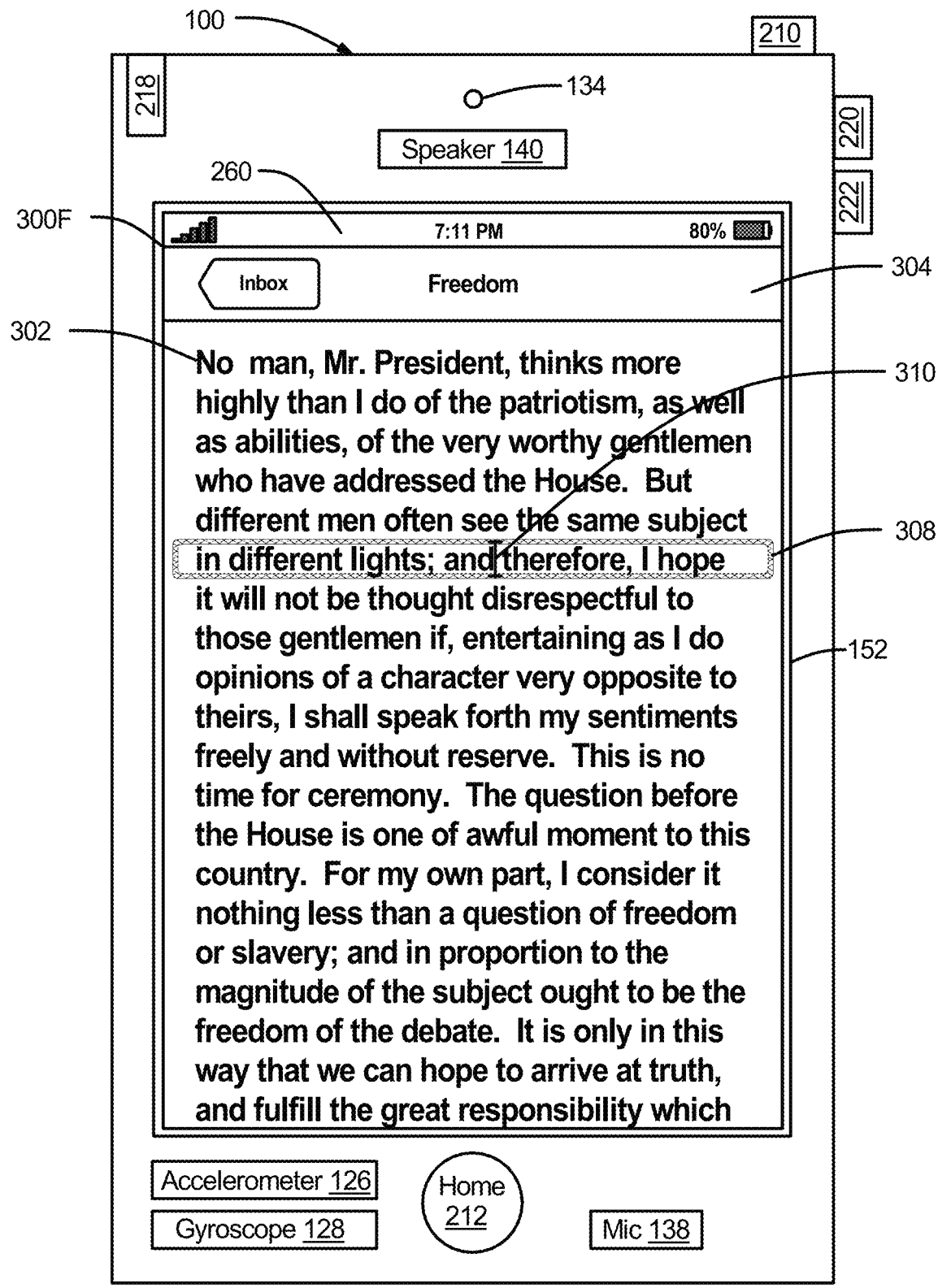
Figure 3G:
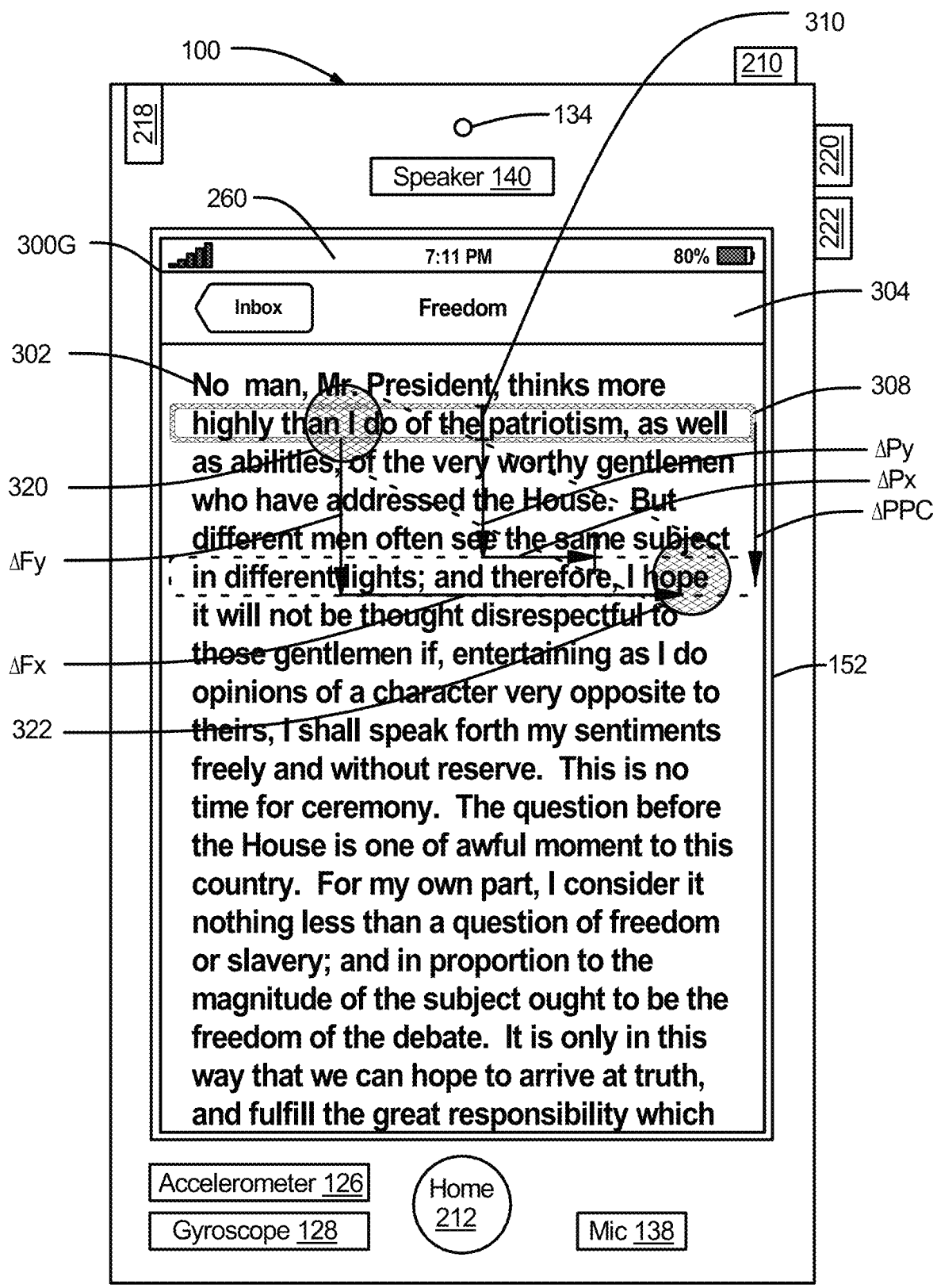
Figure 3H:
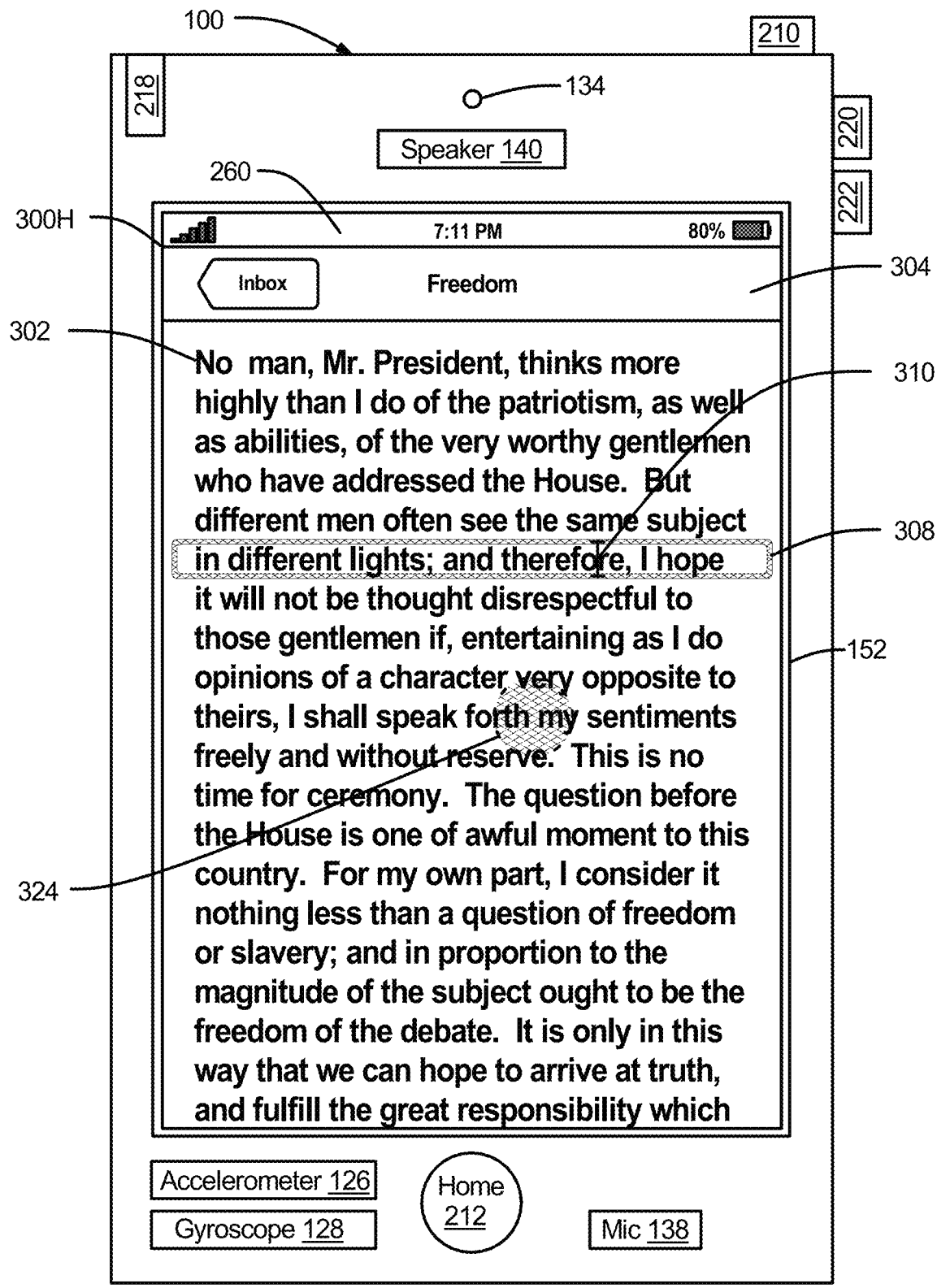
Figure 3I:
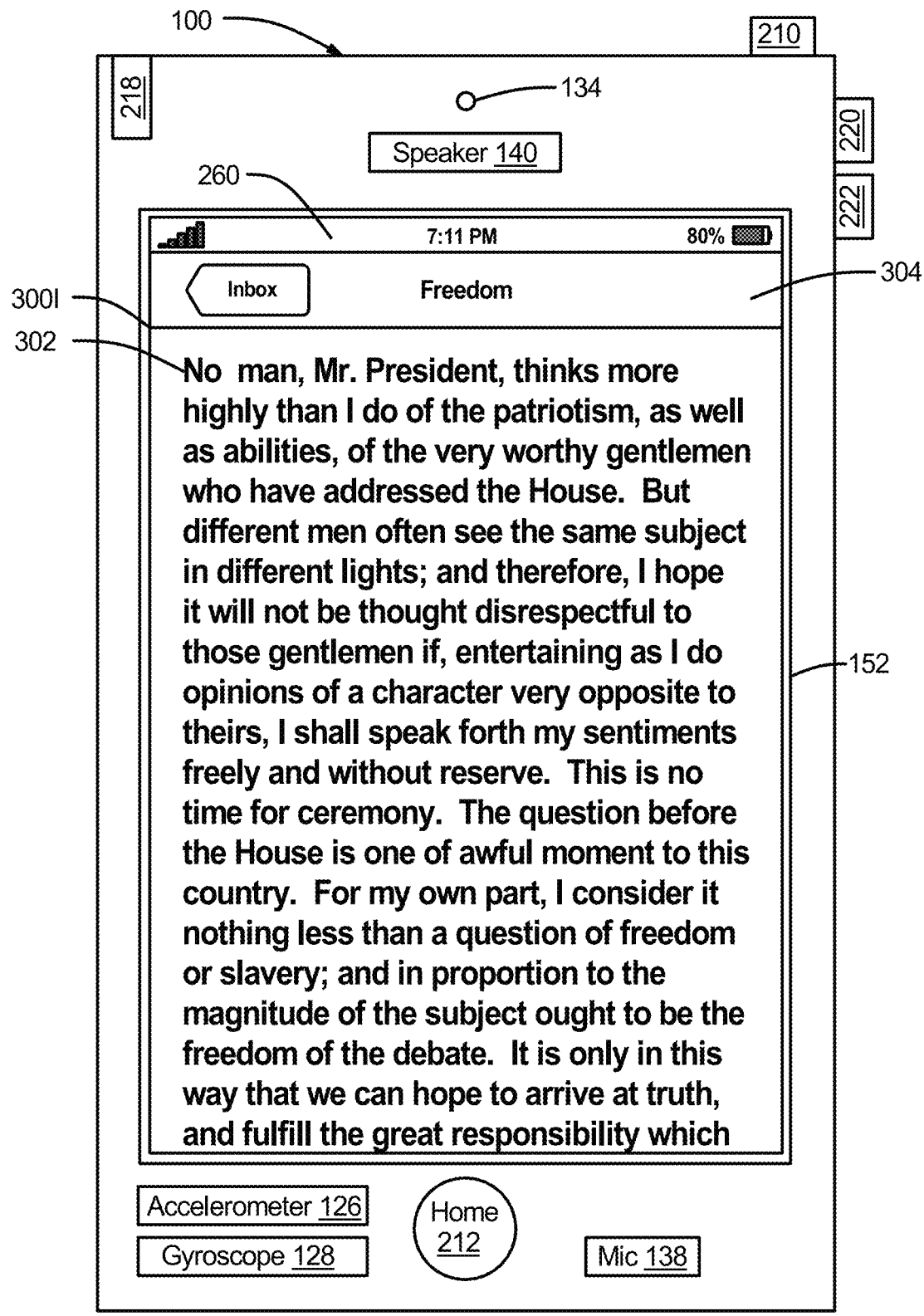
Figure 3J:
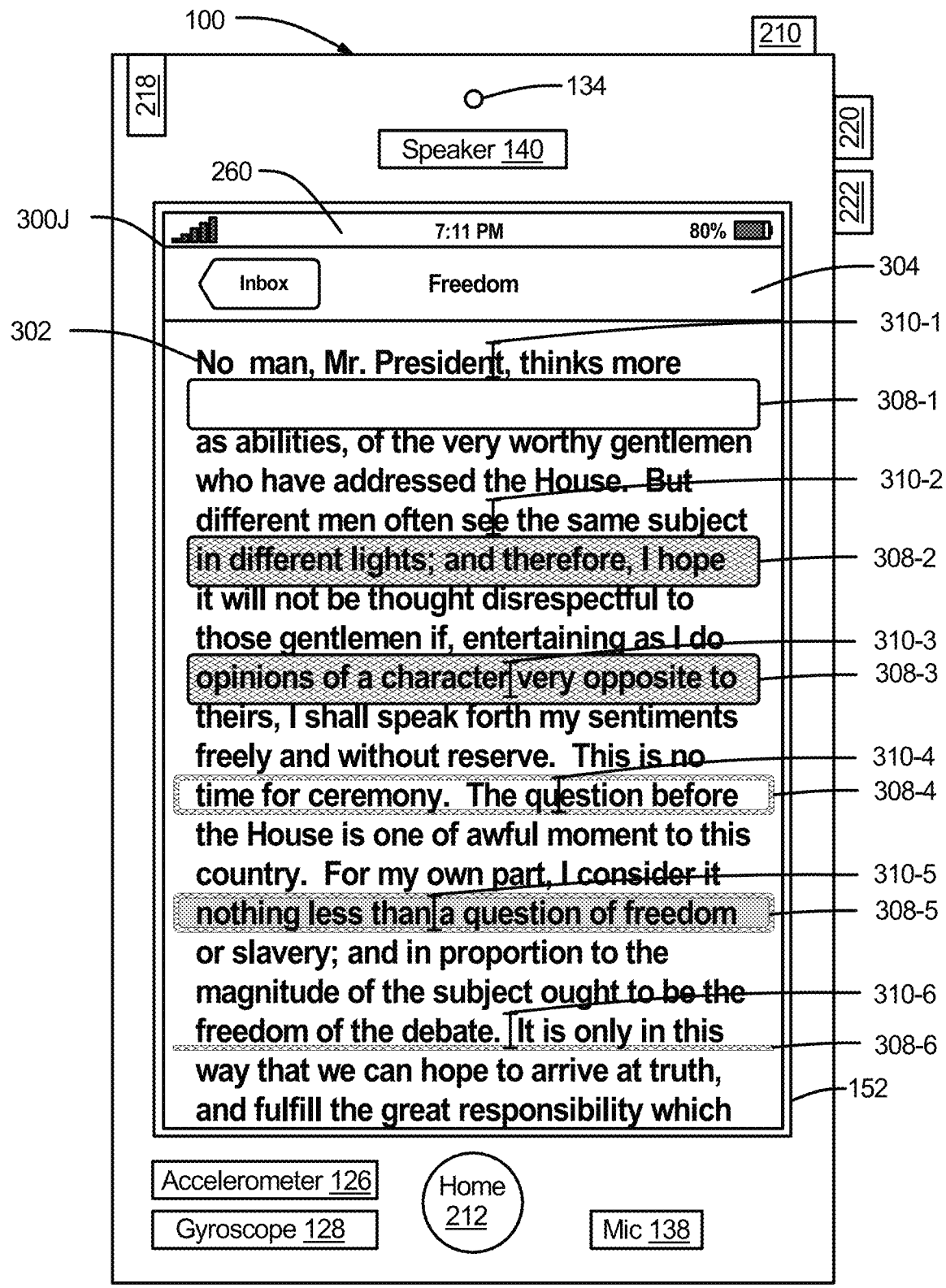

FIGS. 3A-3J illustrate an exemplary user interface for positioning a pointer within read-only content on a handheld mobile computing device with a touch-sensitive display in accordance with some embodiments. FIGS. 3A-3D illustrate an example of displaying a pointer and changing the horizontal position of a pointer. FIGS. 3E-3F illustrate an example of changing the vertical position of a pointer. FIGS. 3G-3I illustrate an example of changing both the horizontal and vertical position of a pointer in one diagonal slide finger gesture. FIG. 3J illustrates examples of alternative embodiments of pointer positioning & control (PPC) icon 308 and pointer 310. In the figures, the pointer appears as the following symbol: I The device displays read-only content 302 in UI 300A (FIG. 3A). The device may also display application navigation bar 304. A user may perform a long-press finger gesture 306 on the read-only content in UI 300A. In response to detecting the finger gesture on the content, the device displays UI 300B (FIG. 3B) with pointer positioning & control (PPC) icon 308 at a PPC icon first position and pointer 310 at a pointer first position. In one exemplary embodiment, the pointer first position is the location of the finger gesture on the content. In UI 300C (FIG. 3C), a user may perform a slide finger gesture 312 to 314 on PPC icon 308. In response to detecting $\Delta F_x$ (a change in the horizontal position of an uninterrupted finger contact on the PPC icon), the device changes the horizontal position of the pointer on the display from the pointer first position to a pointer second position such that $\Delta P_x$ (the change in the horizontal position of pointer 310) is proportional to $\Delta F_x$ as illustrated in FIG. 3C. This can be written as $\Delta P_x = K_x \Delta F_x$ where $K_x$ is a proportionality constant. The device displays UI 300D (FIG. 3D) with pointer 310 at the second pointer position.

The device displays read-only content 302 in UI 300E (FIG. 3E). With the pointer at a first position, a user may perform a slide finger gesture 316 to 318 on PPC icon 308. In response to detecting $\Delta F_y$ (a change in the vertical position of an uninterrupted finger contact on the PPC icon), the device changes the vertical position of pointer 310 and PPC icon 308 such that $\Delta P_y$ (the change in the vertical position of pointer 310) and $\Delta PPC_y$ (the change in the vertical position of PPC icon 308) and are equal and proportional to $\Delta F_y$ as illustrated in FIG. 3E. This can be written as $\Delta P_y = \Delta PPC_y = K_y \Delta F_y$ where $K_y$ is a proportionality constant. The device displays UI 300F (FIG. 3F) with pointer 310 at a second position. In this exemplary embodiment $K_y = 1$.

A user may move both the horizontal and vertical position of pointer 310 with a single diagonal-slide finger gesture as illustrated in FIGS. 3G-3H. The device displays read-only content 302 in UI 300G (FIG. 3G). With pointer 310 at a first position, a user may perform a diagonal-slide finger gesture 320 to 322 on PPC icon 308. In response to detecting $\Delta F_x$ (a change in the horizontal position) and $\Delta F_y$ (a change in the vertical position) of an uninterrupted finger contact on the PPC icon, the device changes the position of pointer 310 on the display from a first position to a second position such that $\Delta P_x$ (the change in the horizontal position of pointer 310) is proportional to $\Delta F_x$, and such that $\Delta P_y$ (the change in the vertical position of pointer 310) and $\Delta PPC_y$ (the change in the vertical position of PPC icon 308) are equal and are proportional $\Delta F_y$, as illustrated in FIG. 3G. This can be written as $\Delta P_x = K_x \Delta F_x$ where $K_x$ is a proportionality constant and $\Delta P_y = \Delta PPC_y = K_y \Delta F_y$ where $K_y$ is a proportionality constant. Again, in this exemplary embodiment $K_y = 1$. The device displays UI 300H (FIG. 3H) with pointer 310 at a second position.

A user may hide the pointer and PPC at any time. A user may perform tap finger gesture 324 at any location on the display screen that is not on the PPC icon. In response, the device displays UI 300I (FIG. 3I) in which both the pointer and PPC icon are no longer displayed.

In this description, we have shown one exemplary embodiment for a PPC icon for use in the exemplary UI. There are many different possible approaches to the design of the UI comprising a PPC icon 308 and a pointer 310. In reference to FIG. 3J we show several example embodiments. The PPC icon may be rectangular in shape with a horizontal extent substantially equal to the horizontal extent of the display in its viewing orientation. The PPC icon may be opaque and displayed at a position offset below the pointer as illustrated by PPC icon 308-1 and pointer 310-1. The PPC icon may be semitransparent and displayed at a position offset below the pointer as illustrated by PPC icon 308-2 and pointer 310-2. The PPC icon may be semitransparent and displayed at a positioned collinear to the pointer as illustrated by PPC icon 308-3 and pointer 310-3. The PPC icon may comprise a semitransparent frame around a clear central region displayed at a position collinear to the pointer as illustrated by PPC icon 308-4 and pointer 310-4. The PPC icon may comprise a semitransparent frame around a nearly transparent central region displayed at a position collinear to the pointer as illustrated by PPC icon 308-5 and pointer 310-5. The PPC icon may comprise a very narrow semitransparent rectangular region displayed at a position collinear to the pointer as illustrated by PPC icon 308-6 and pointer 310-6. In this last example, the exemplary PPC icon is the region that remains after removing one long side and the two short sides of the semitransparent frame PPC icon 308-5. There are other PPC icon designs that may be employed in user interfaces for use in implementing the methods of this disclosure.

Figure 4A:
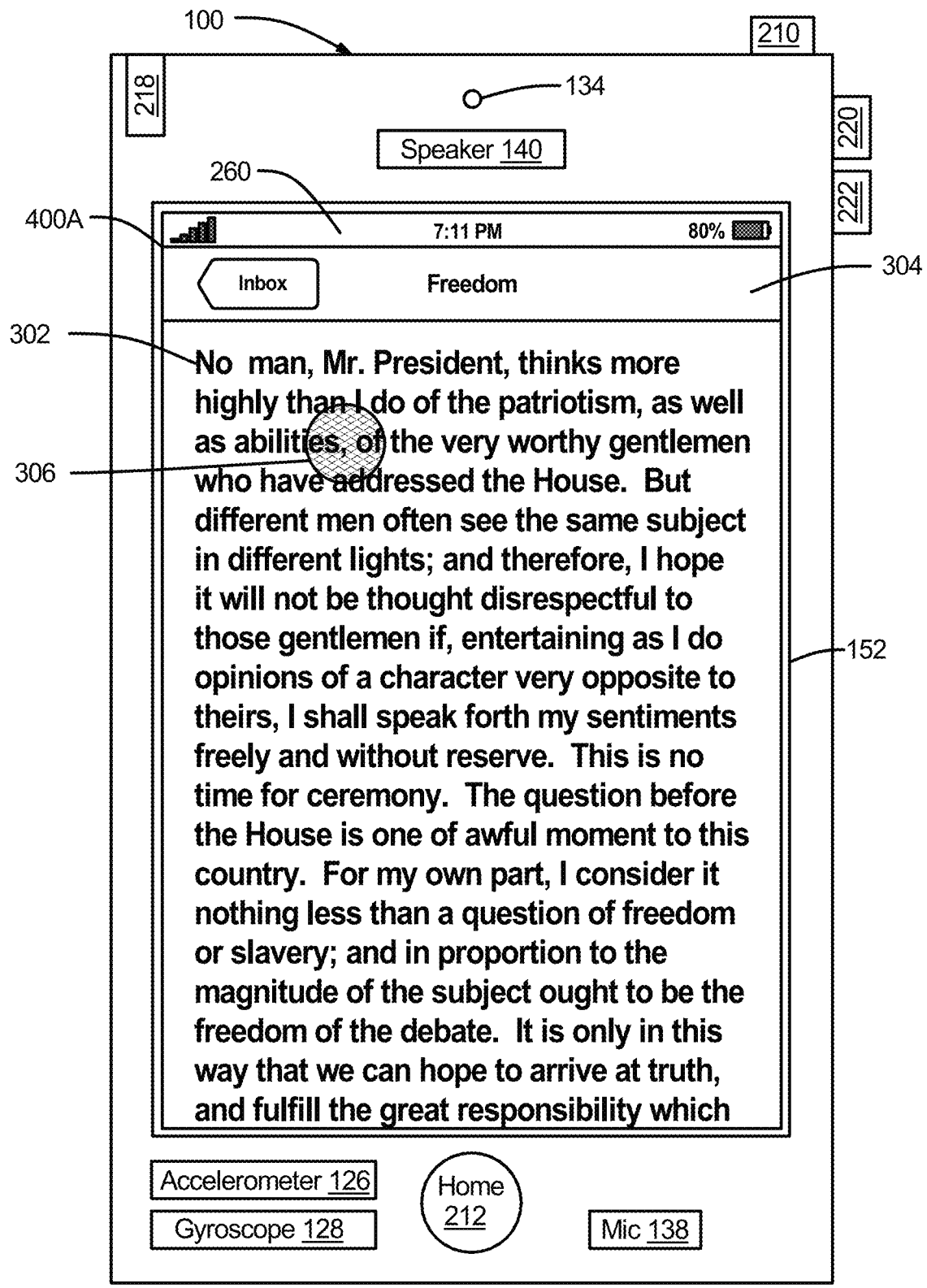
FIGS. 4A-4H illustrate an exemplary user interface for positioning a pointer and selecting within read-only content on a handheld mobile computing device with a touch-sensitive display in accordance with some embodiments.
Figure 4B:
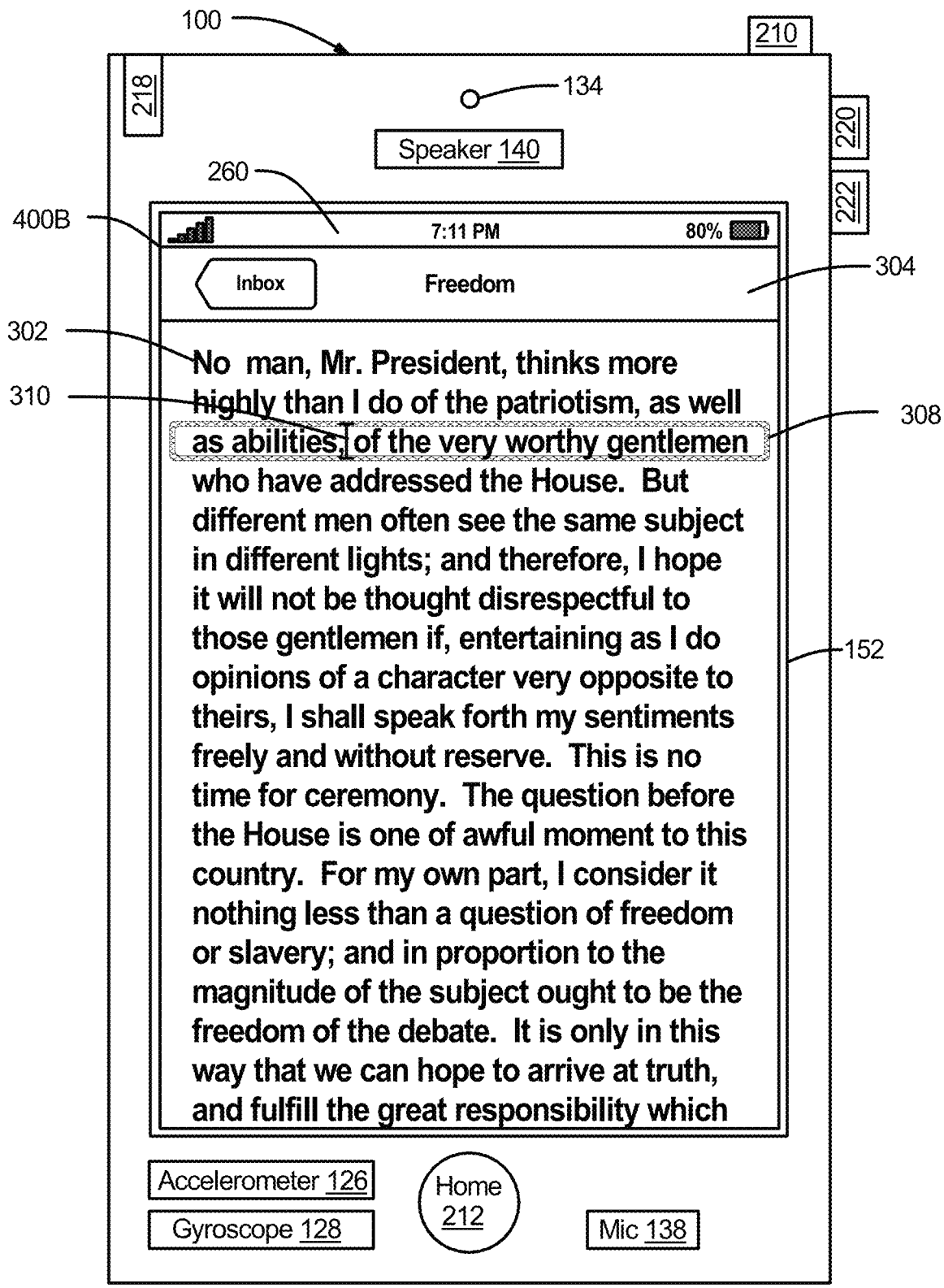
Figure 4C:
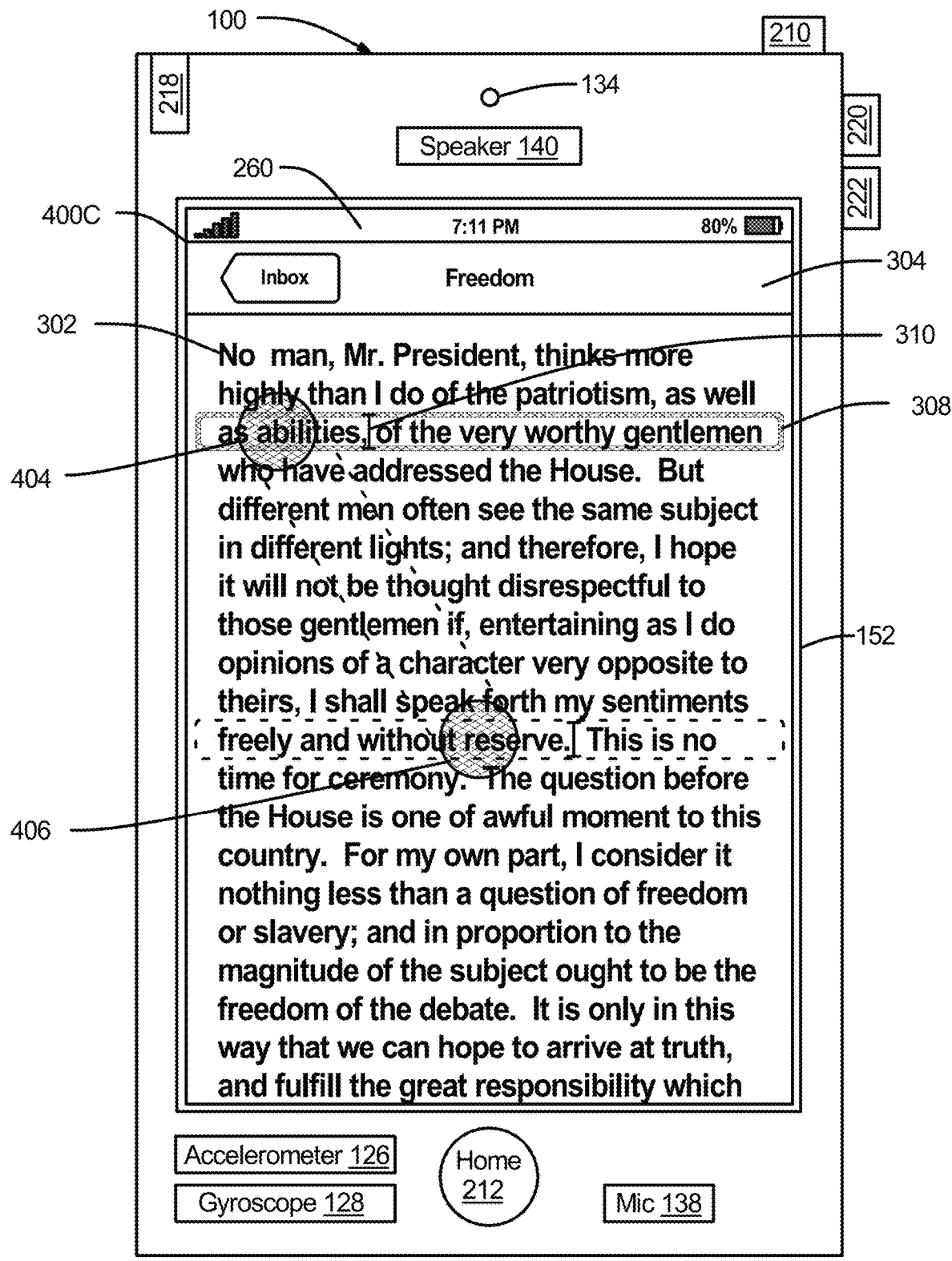
Figure 4D:
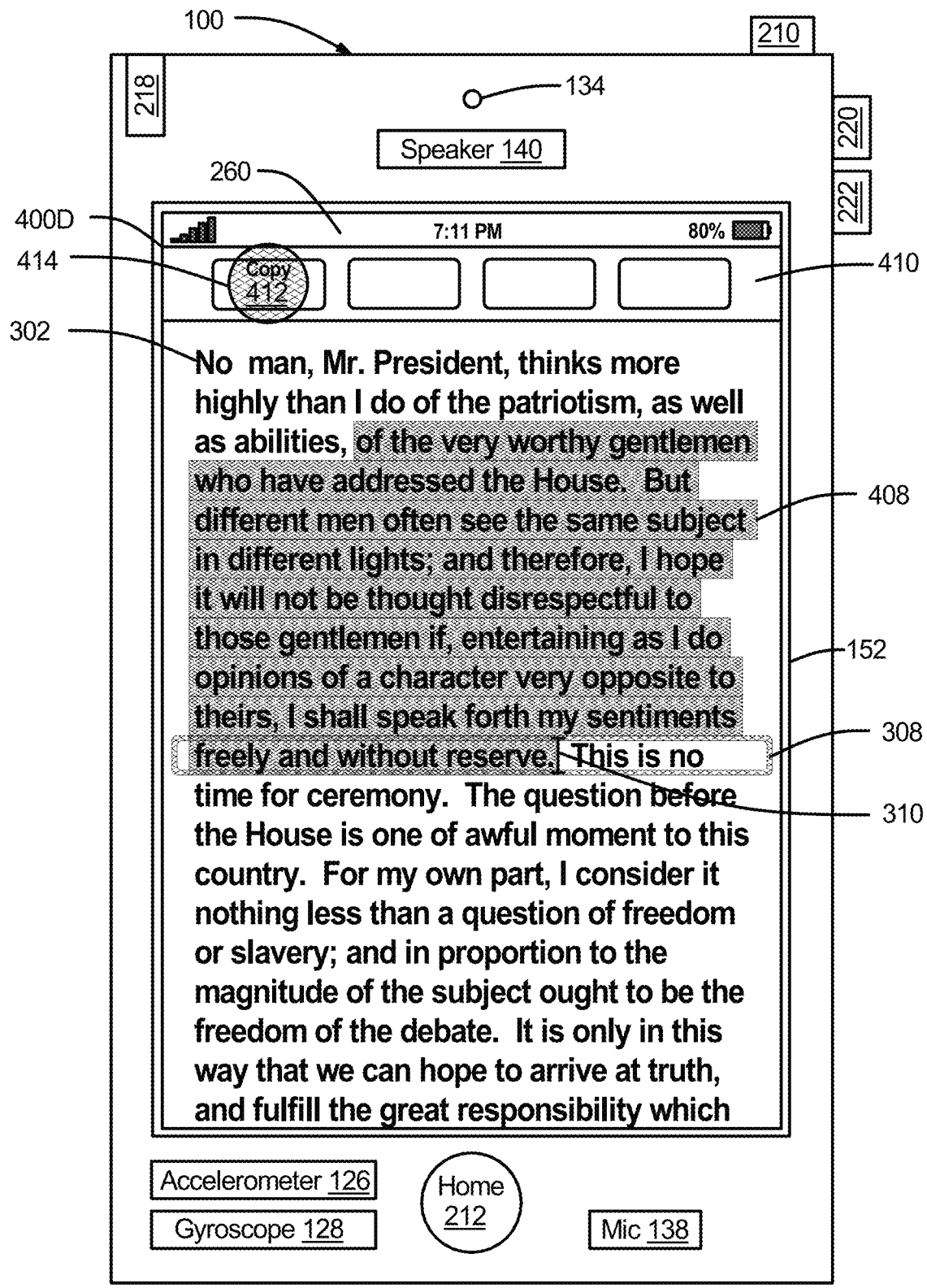
Figure 4E:
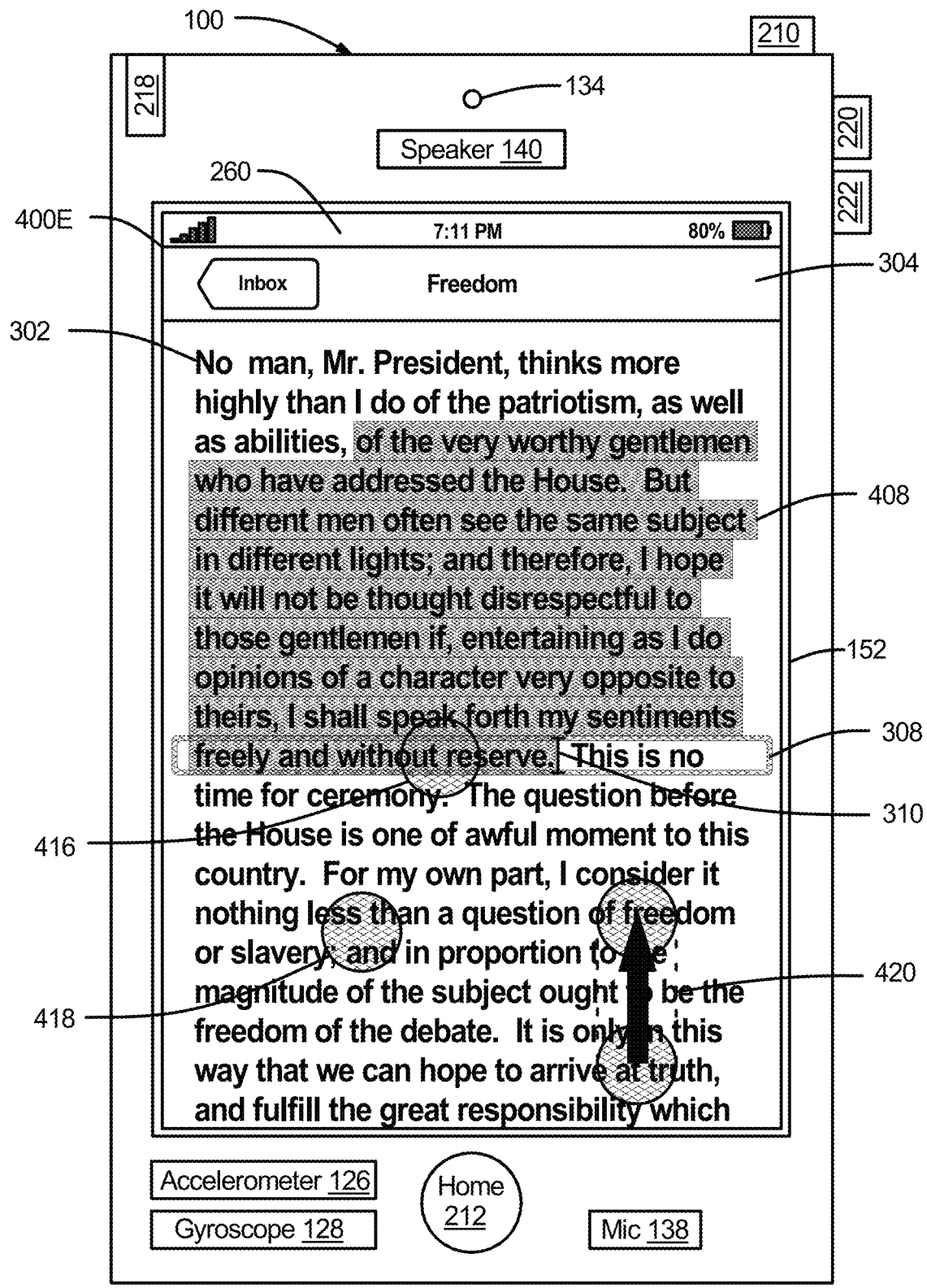
Figure 4F:
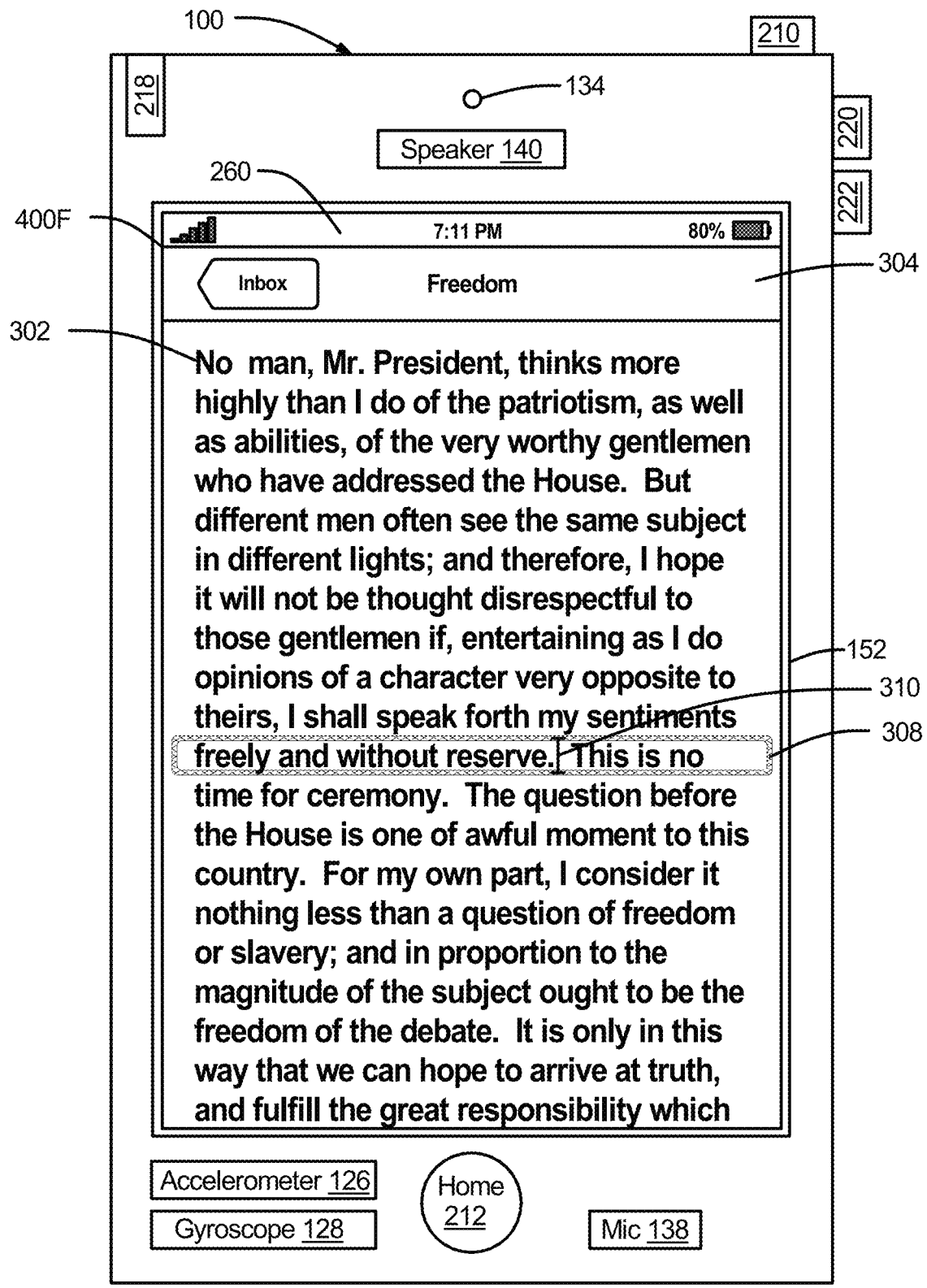
Figure 4G:
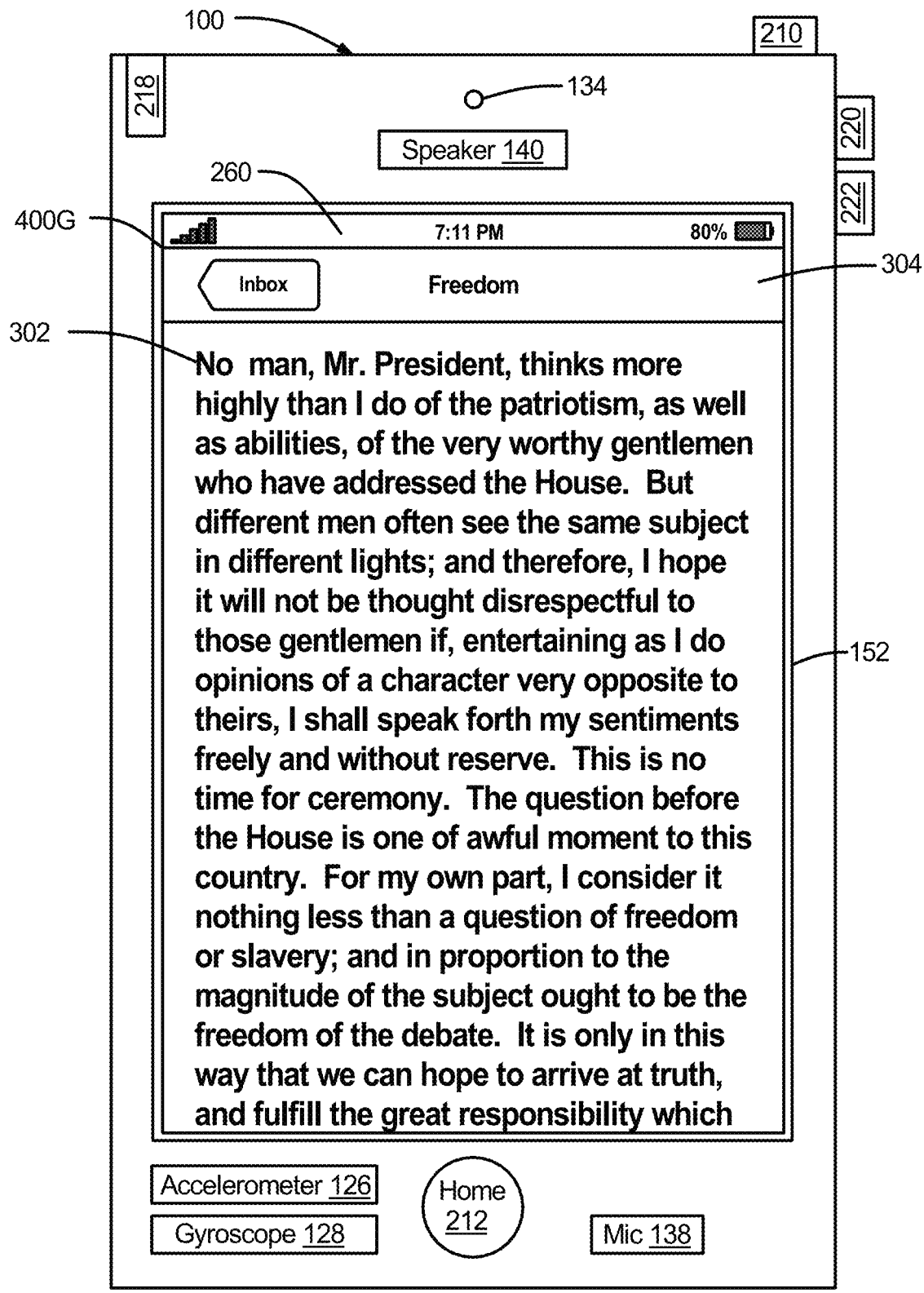
Figure 4H:
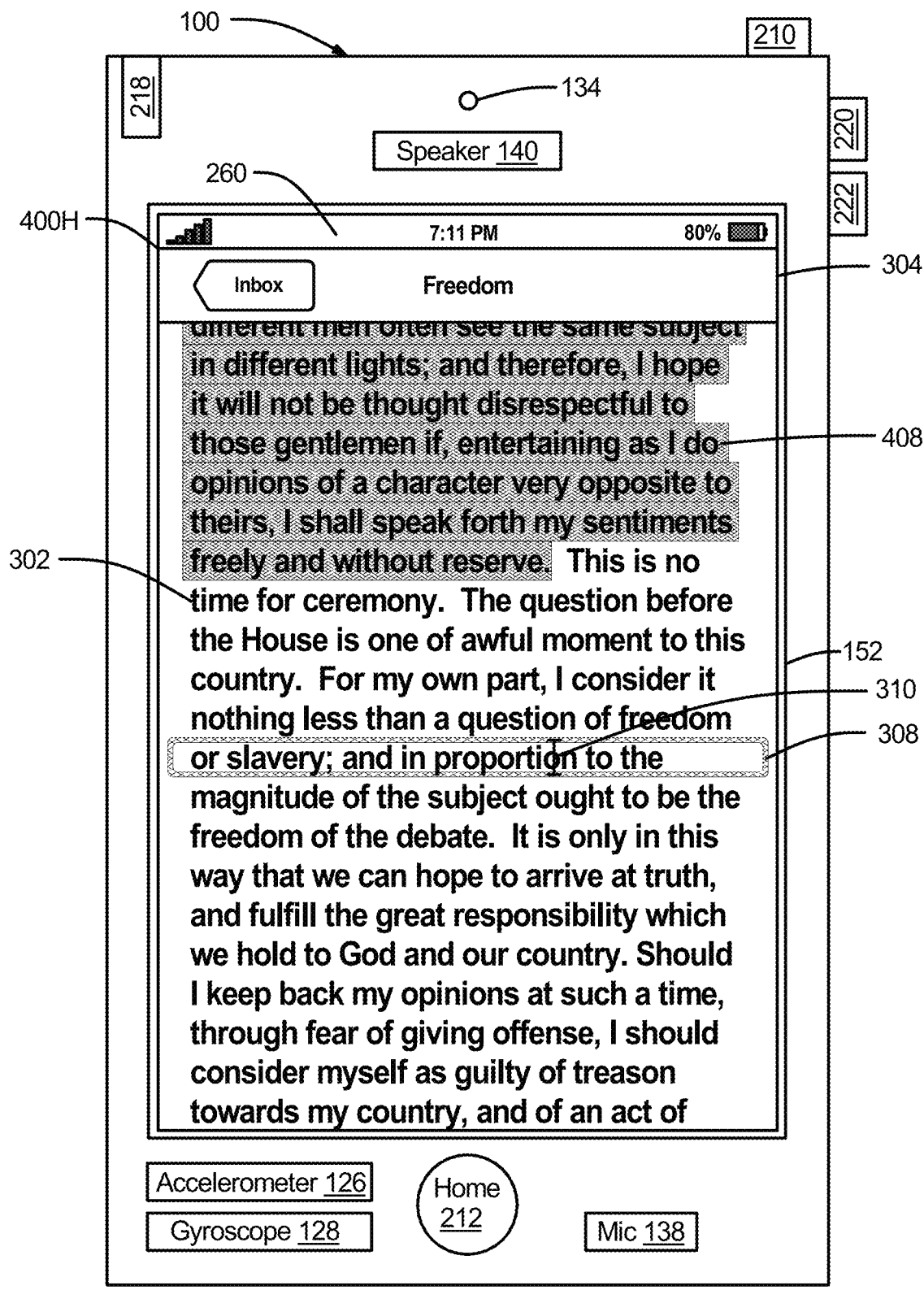

FIGS. 4A-4H illustrate an exemplary user interface for positioning a pointer and selecting within read-only content on a handheld mobile computing device with a touch-sensitive display in accordance with some embodiments. The device displays read-only content 302 in UI 400A (FIG. 4A). The device may also display application navigation bar 304. A user may perform long-press finger gesture 306 on the read-only content in UI 400A (FIG. 4A). In response, the device displays UI 400B (FIG. 4B) with pointer positioning & control (PPC) icon 308 at a first position and pointer 310 at a first position. In one exemplary embodiment, the pointer first position is the location of the finger gesture on the content. In another exemplary embodiment, the pointer first position is offset from the location of the finger gesture on the content. A user may perform tap-and-slide finger gesture 404 to 406 on PPC icon 308, as shown in FIG. 4C. In response, the device displays UI 400D (FIG. 4D) with selected text 408 displayed from a first position to a second position where the first position is located at the pointer first position and the second position is located at the pointer second position. The device may also display toolbar 410 with "Copy" icon 412. A user may perform tap finger gesture 414 on "Copy" icon 412 as shown in FIG. 4D. In response, the device displays UI 400E (FIG. 4E). Upon detection of tap finger gesture 416 on PPC icon 308 in UI 400E (FIG. 4E), the device displays UI 400F (FIG. 4F) with selected text 408 cancelled and no longer displayed and with pointer 310 positioned at the pointer second position. Upon detection of tap finger gesture 418 at a location not on PPC icon 308 on UI 400E (FIG. 4E), the device displays UI 400G (FIG. 4G), with text selection 408 cancelled and no longer displayed and with PPC icon 308 and pointer 310 no longer displayed. Upon detection of a page-scroll-up slide finger gesture 420 on content 302 on UI 400E (FIG. 4E), the device displays UI 400H (FIG. 4H) with both content 302 and selected text 408 scrolled up by an amount equal to the length of page-scroll-up slide finger gesture 420. Moving the content by page scrolling or other means does not move the pointer as illustrated in FIG. 4H.

Figure 5A:
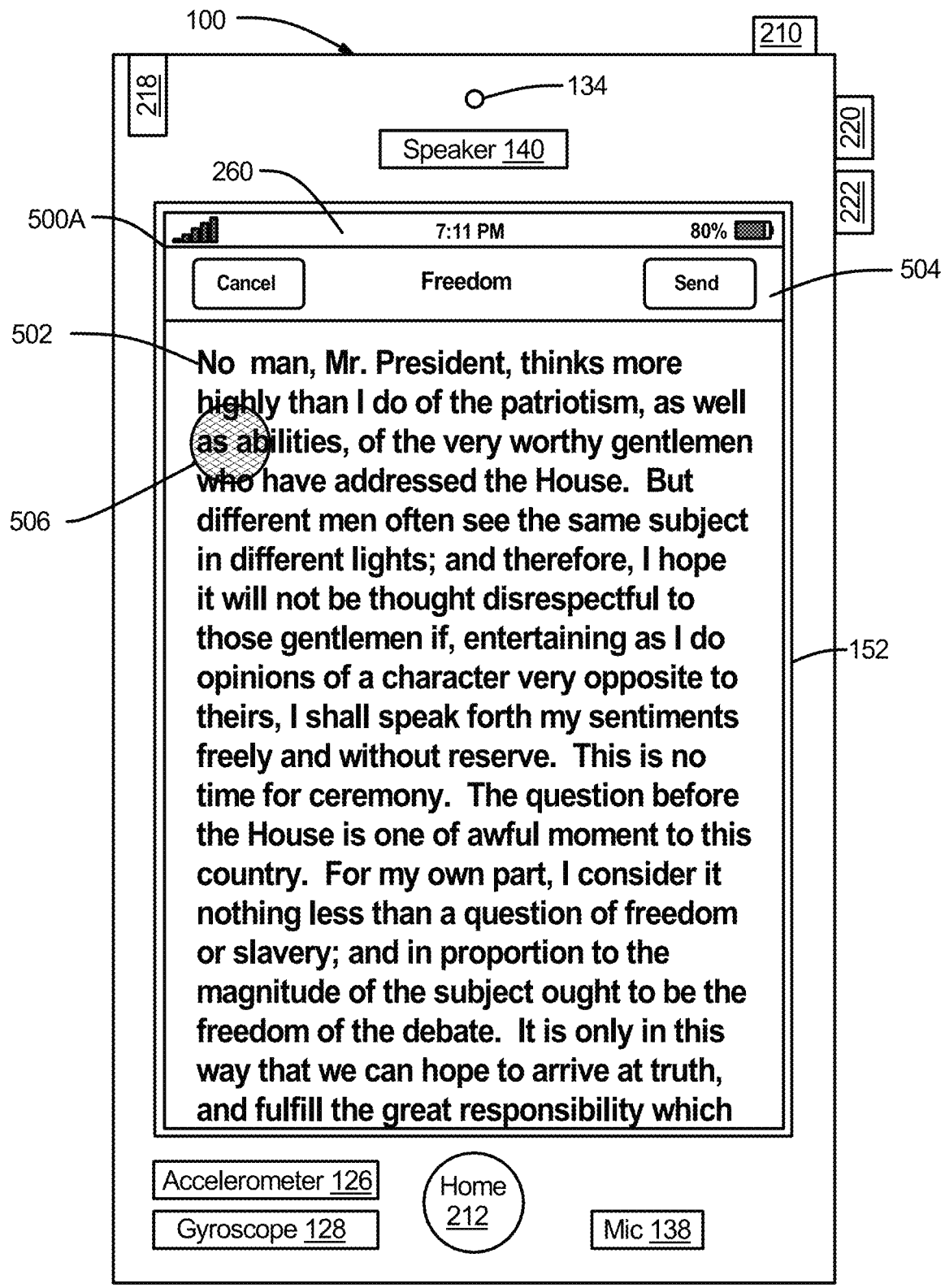
FIGS. 5A-5G illustrate an exemplary user interface for positioning a pointer and a cursor within editable content on a handheld mobile computing device with a touch-sensitive display in accordance with some embodiments.
Figure 5B:
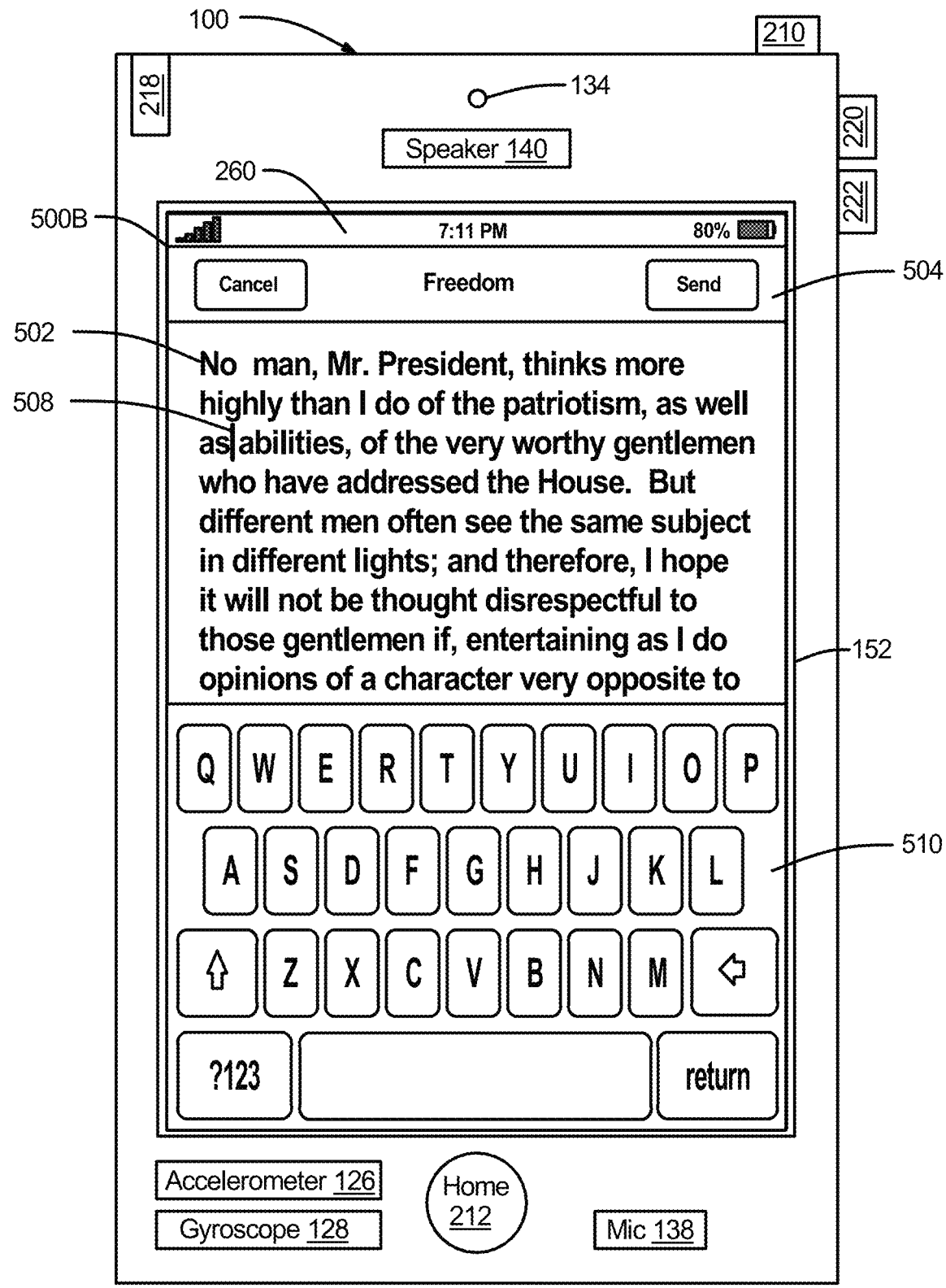
Figure 5C:
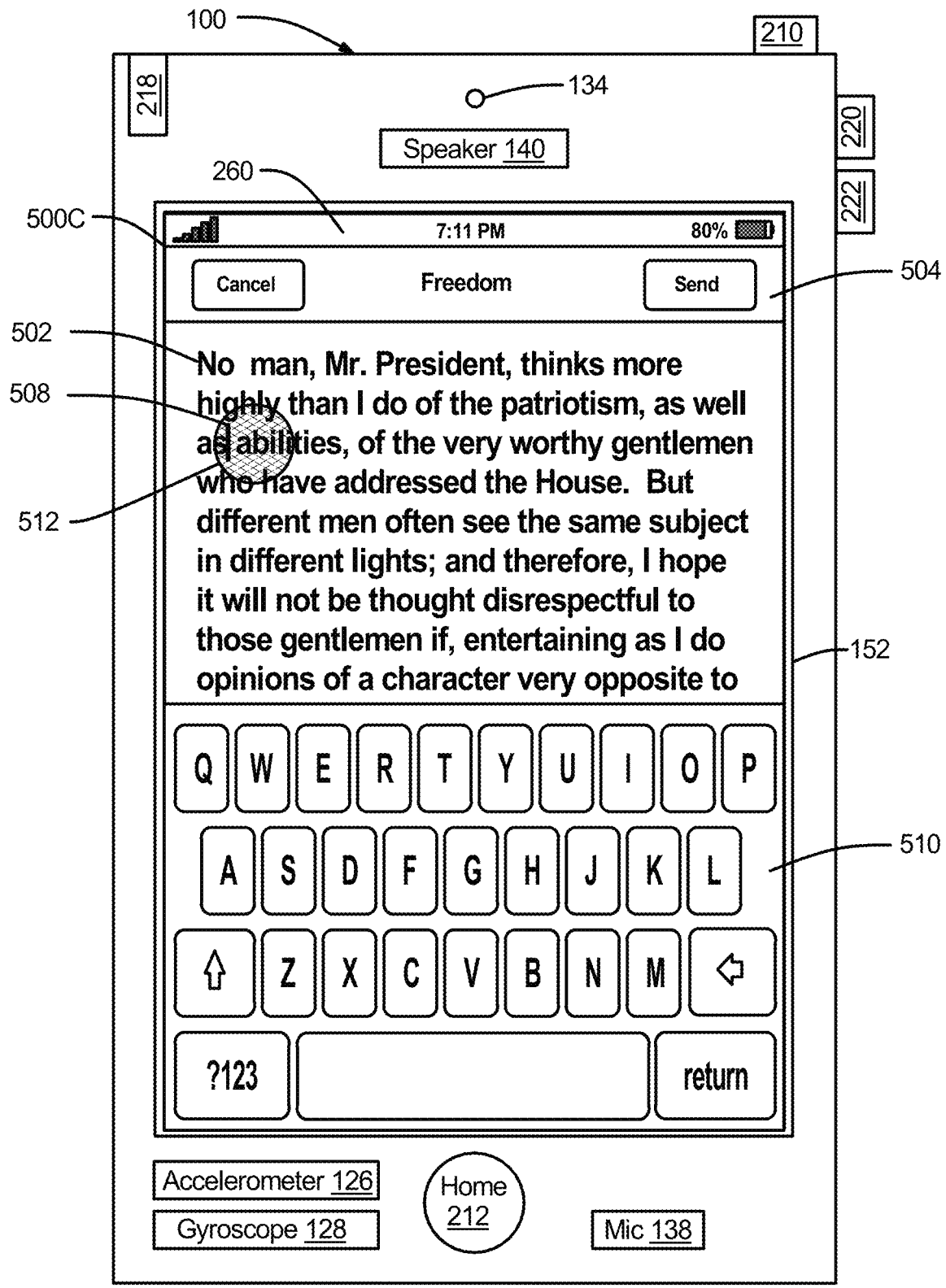
Figure 5D:
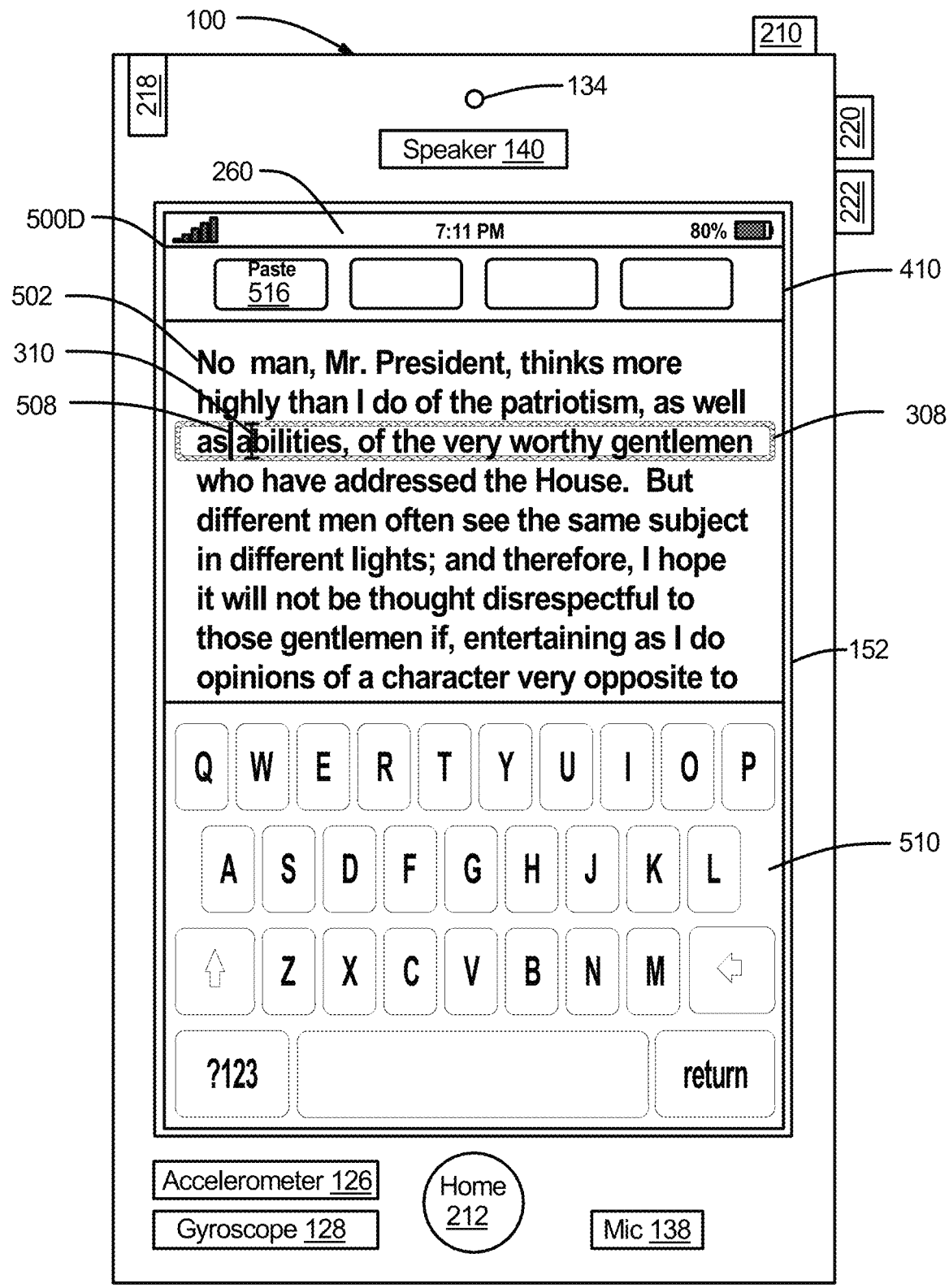

FIGS. 5A-5I illustrate an exemplary user interface for positioning a pointer and a cursor within editable content on a handheld mobile computing device with a touch-sensitive display in accordance with some embodiments. In the figures, the cursor appears as the following symbol: I. The device displays editable content 502 in UI 500A (FIG. 5A). The device may also display application navigation bar 504. A user may perform tap finger gesture 506 on editable content 502 in UI 500A. In response, the device displays UI 500B (FIG. 5B) with cursor 508 at the location of tap finger gesture 506. In the case of devices having a soft keyboard in lieu of, or in addition to, a physical keyboard, the device may also display soft keyboard 510. A user may perform finger gesture 512 on the editable content in UI 500C (FIG. 5C). In one example embodiment, finger gesture 512 is a long-press finger gesture. In response to detecting the finger gesture on the content, the device displays UI 500D (FIG. 5D) with pointer positioning & control (PPC) icon 308 at a first position and pointer 310 at a first position. In one exemplary embodiment, the pointer first position is the location of finger gesture 512. The device may also display toolbar 410 with "Paste" icon 516.

Figure 5E:
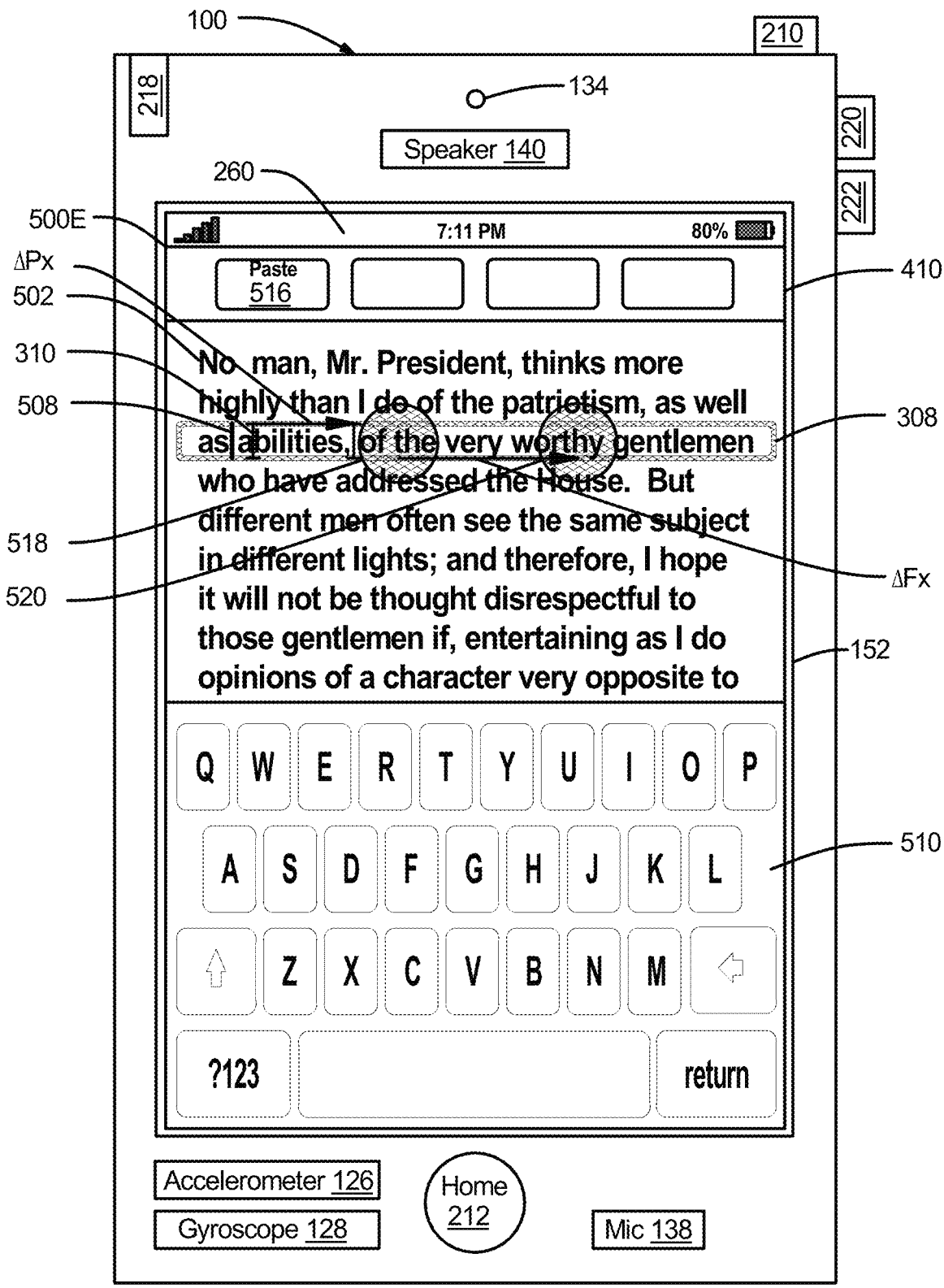
Figure 5F:
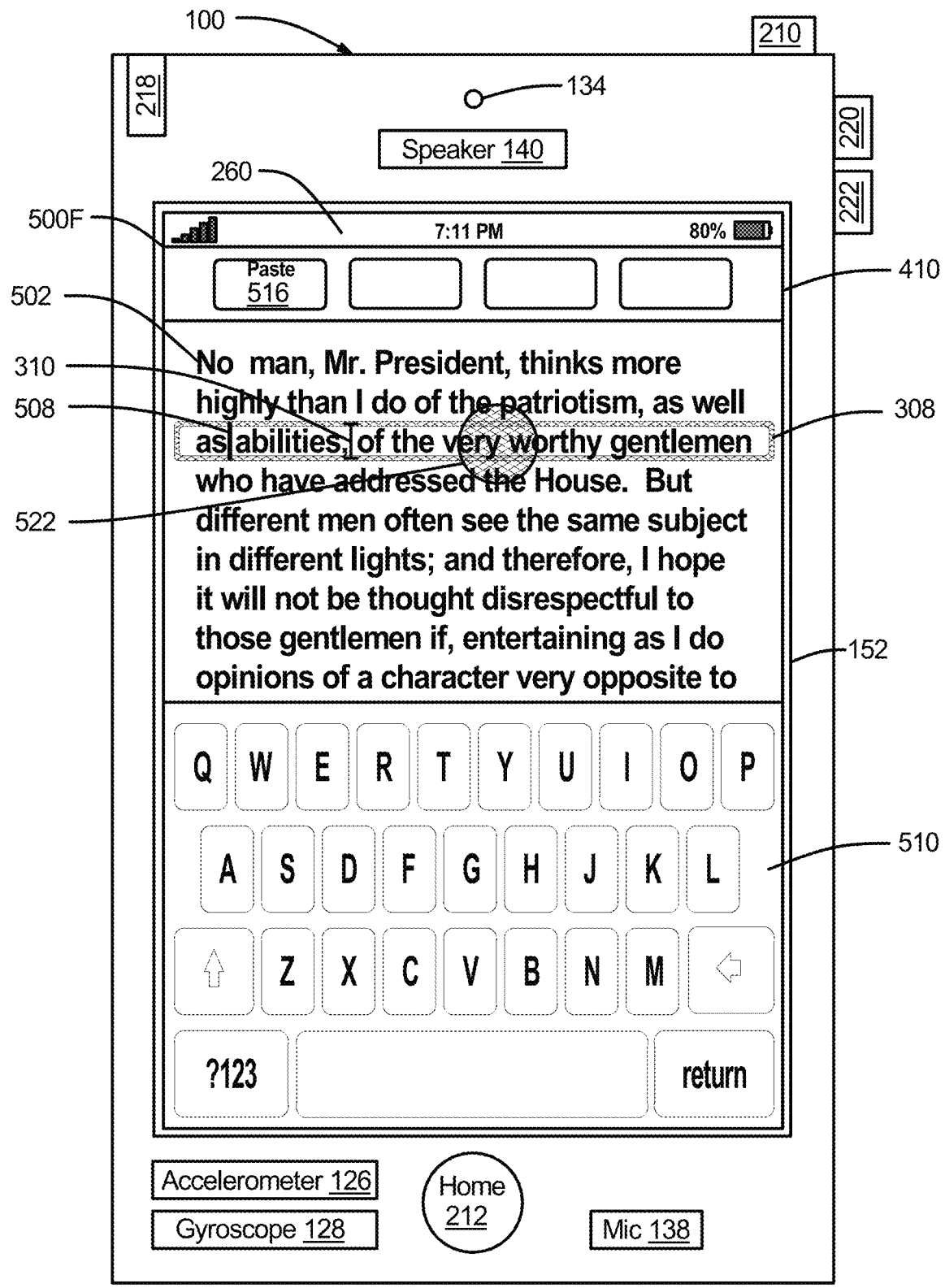
Figure 5G:
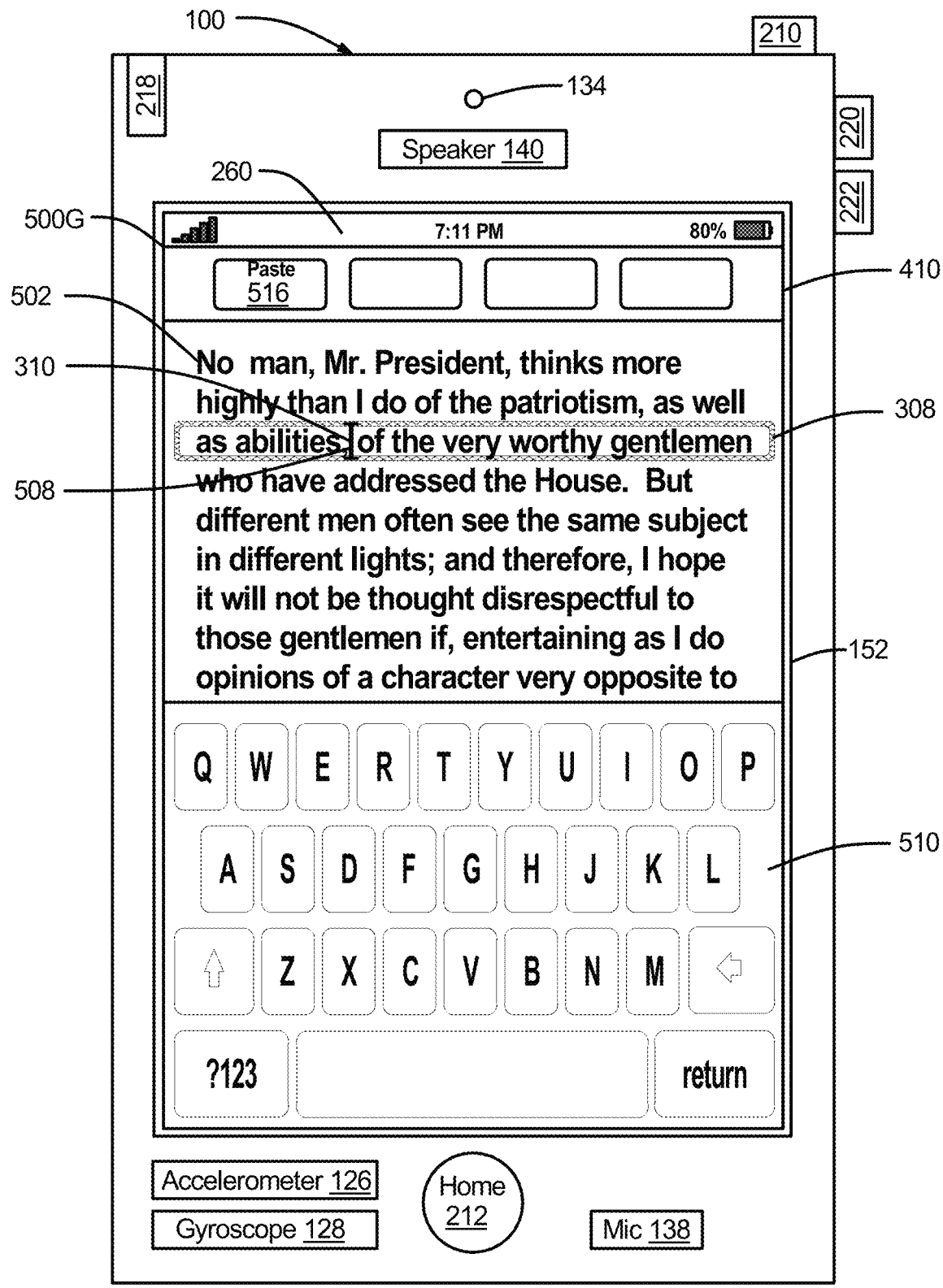

With pointer 310 at a first position, a user may perform a slide finger gesture 518 to 520 on PPC icon 308 as shown in UI 500E (FIG. 5E). In response to detecting $\Delta F_x$ (a change in the horizontal position) and $\Delta F_y$ (a change in the vertical position) of an uninterrupted finger contact on the PPC icon, the device changes the position of the pointer on the display from a first position to a second position such that $\Delta P_x$ (the change in the horizontal position of pointer 310) is proportional to $\Delta F_x$, and such that $\Delta P_y$ (the change in the vertical position of pointer 310) and $\Delta PPC_y$ (the change in the vertical position of PPC icon 308) are equal and are proportional $\Delta F_y$, as illustrated in FIG. 5E. This can be written as $\Delta P_x = K_x \Delta F_x$ where $K_x$ is a proportionality constant and $\Delta P_y = \Delta PPC_y = K_y \Delta F_y$ where $K_y$ is a proportionality constant. Again, in this exemplary embodiment $K_y = 1$. In this example, slide finger gesture 518 to 520 is a horizontal-slide finger gesture and $\Delta F_y$ is equal to zero (0). The device displays UI 500F (FIG. 5F) with pointer 310 at a second position. The positioning of the pointer on editable content is the same as that described above for positioning a pointer on read-only content. A user may perform tap finger gesture 522 at any location on PPC icon 308 as illustrated in FIG. 5F. In response, the device displays UI 500G (FIG. 5G) with cursor 508 at the position of pointer 310.

Figure 6A:
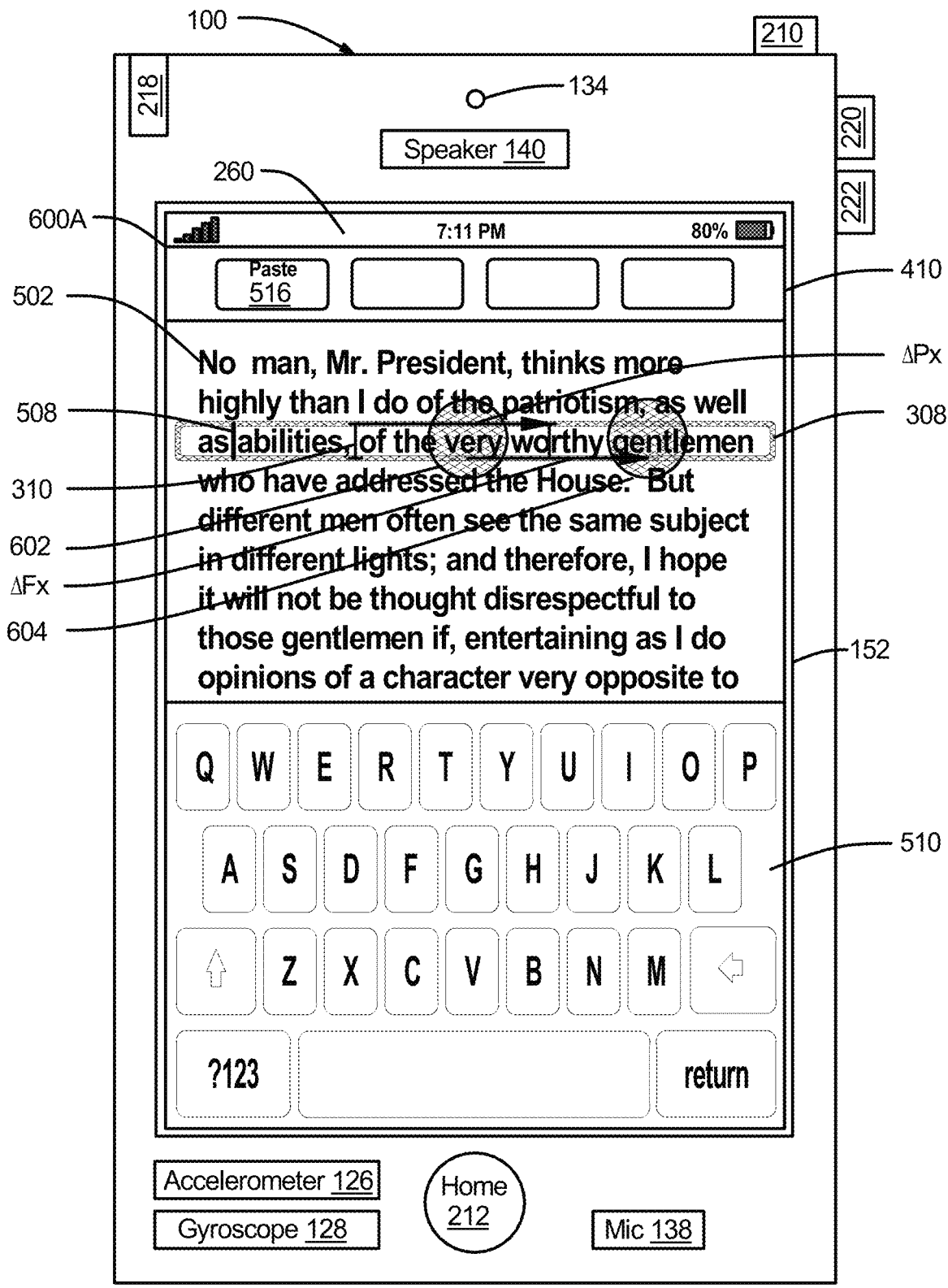
FIGS. 6A-6F illustrate an exemplary user interface for positioning a pointer and selecting within editable content on a handheld mobile computing device with a touch-sensitive display in accordance with some embodiments.
Figure 6B:
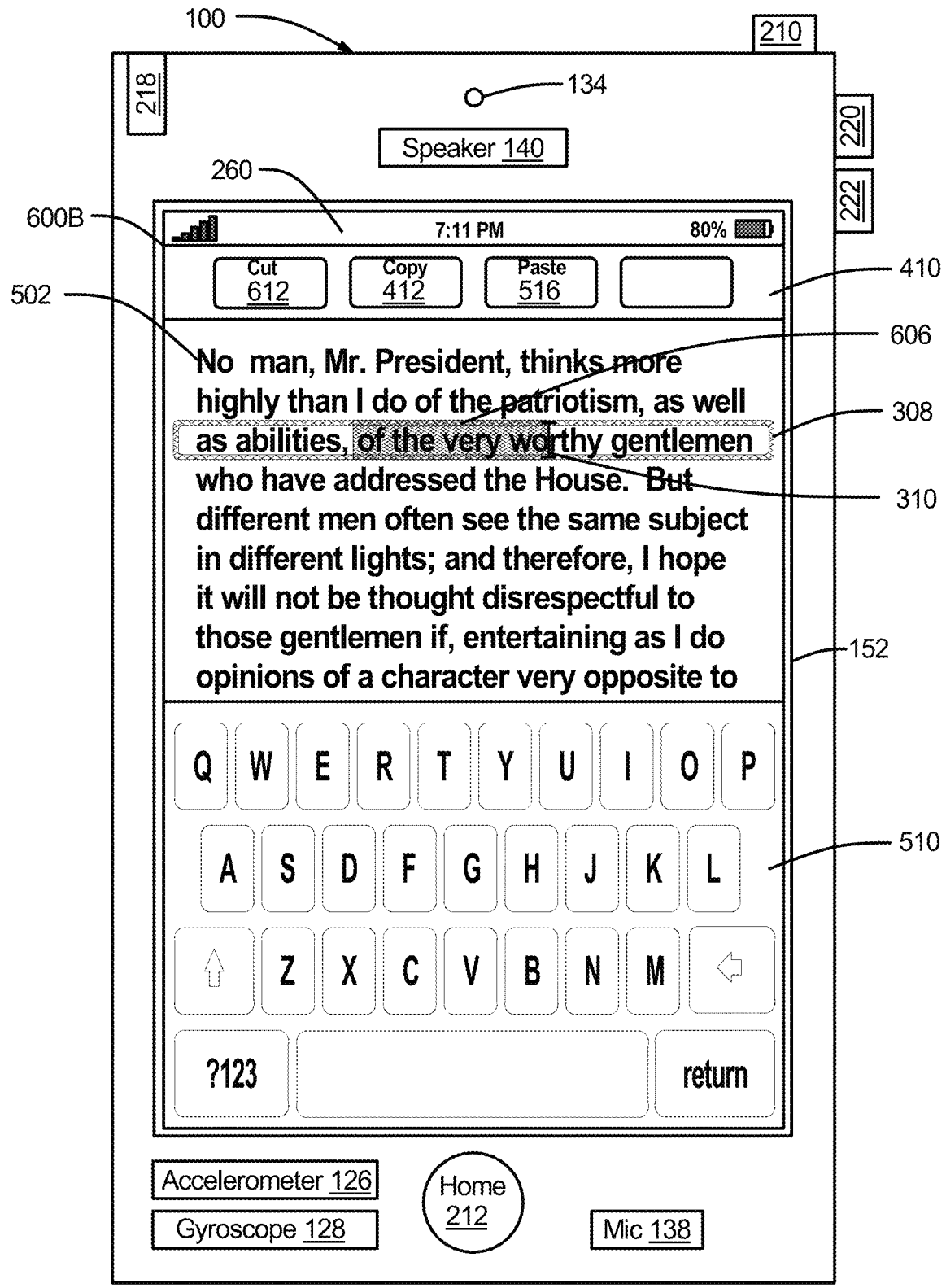
Figure 6C:
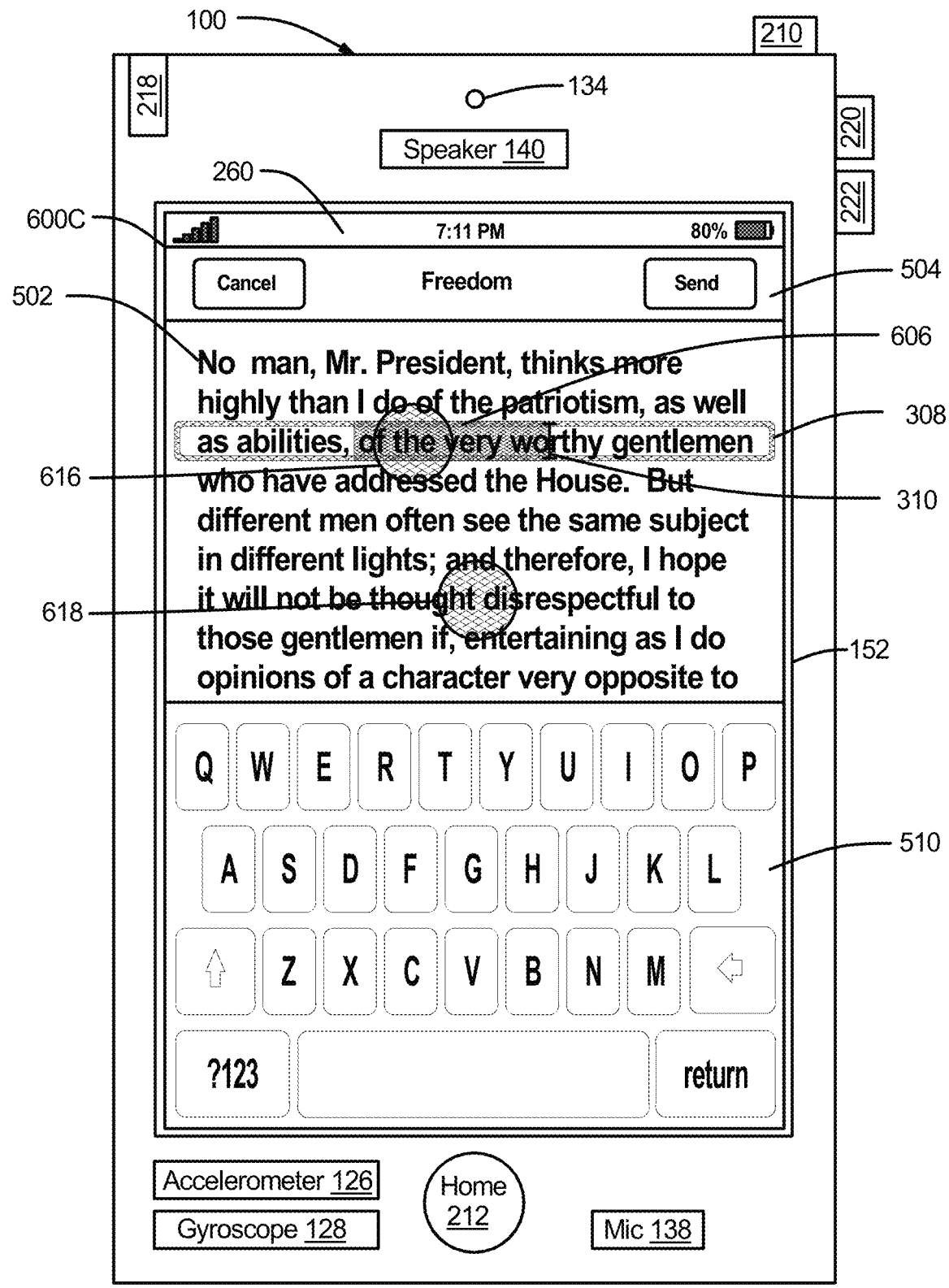
Figure 6D:
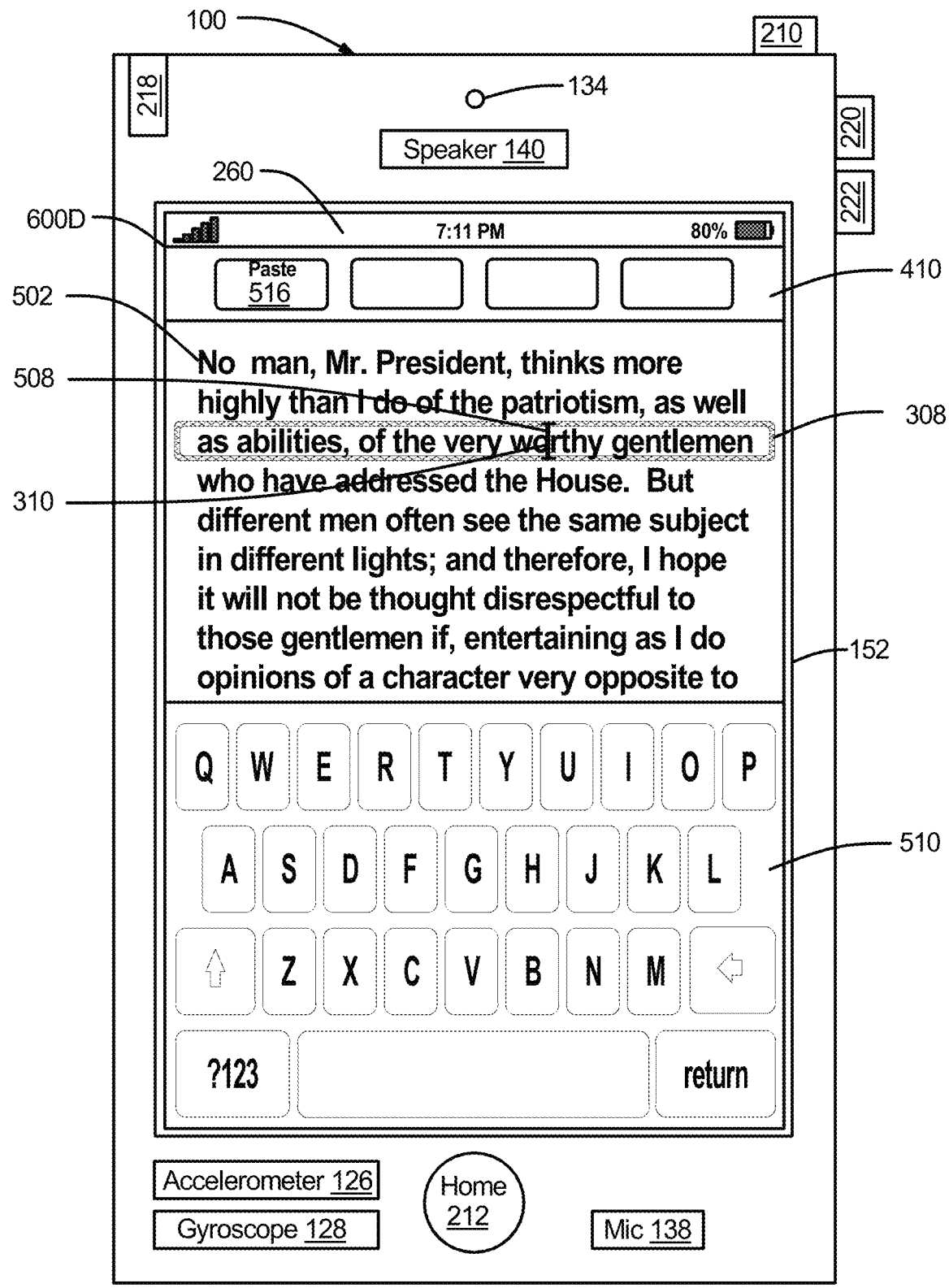
Figure 6E:
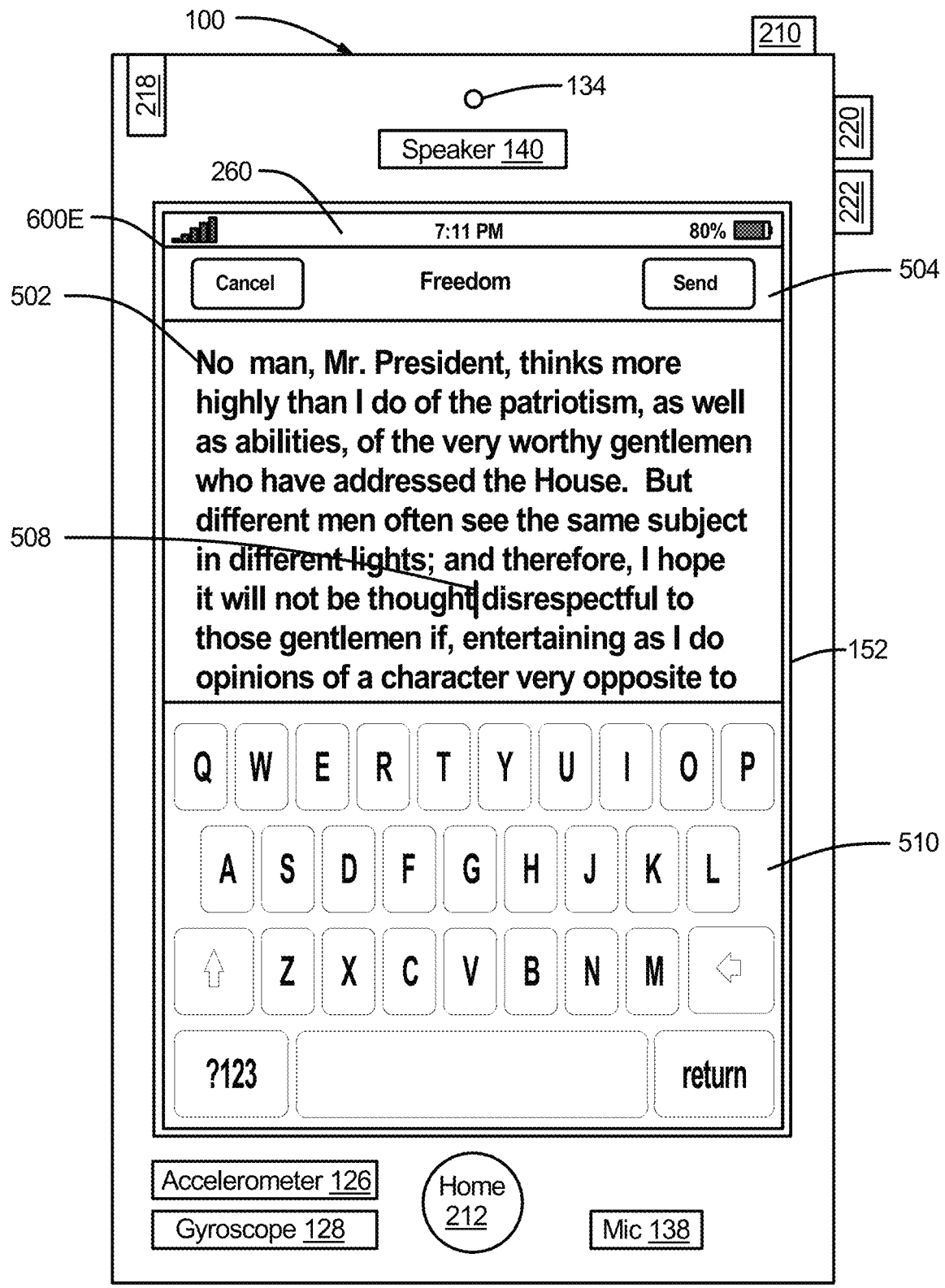

FIGS. 6A-6F illustrate an exemplary user interface for positioning a pointer and selecting within editable content on a handheld mobile computing device with a touch-sensitive display in accordance with some embodiments. The device displays UI 600A (FIG. 6A) with pointer positioning & control (PPC) icon 308 at a first position, pointer 310 at a first position, and cursor 508 at a first position. The device may also display toolbar 410 with "Paste" icon 516. A user may perform tap-and-slide finger gesture 602 to 604 on PPC icon 308, as shown in FIG. 6A. In response to detecting a tap finger gesture followed by $\Delta F_x$ (a change in the horizontal position of an uninterrupted finger contact on the PPC icon), the device changes the horizontal position of the pointer on the display from a first position to a second position such that $\Delta P_x$ (the change in the horizontal position of pointer 310) is proportional to $\Delta F_x$ as illustrated in FIG. 6A. This can be written as $\Delta P_x = K_x \Delta F_x$ where $K_x$ is a proportionality constant. The device displays UI 600B (FIG. 6B) with selected text 606 displayed from the pointer first position to the pointer second position, and with pointer 310 displayed at the pointer second position. The device may also display toolbar 410 with "Cut" icon 612, "Copy" icon 412, and "Paste" icon 516. A user may tap "Copy" icon 412. In response", the device displays UI 600C (FIG. 6C) with toolbar 410 no longer displayed. A user may perform tap finger gesture 616 on PPC icon 308 on UI 600C (FIG. 6C). In response, the device displays UI 600D (FIG. 6D) with the selected text 606 cancelled and no longer displayed and with the pointer 310 positioned at the second pointer position. A user may perform tap finger gesture 618 at a location not on PPC icon 308 on the content on UI 600C (FIG. 6C). In response, the device displays UI 600E (FIG. 6E), with cursor 508 displayed at the location of tap finger gesture 618, and with PPC icon 308 and pointer 310 no longer displayed.

Figure 6F:
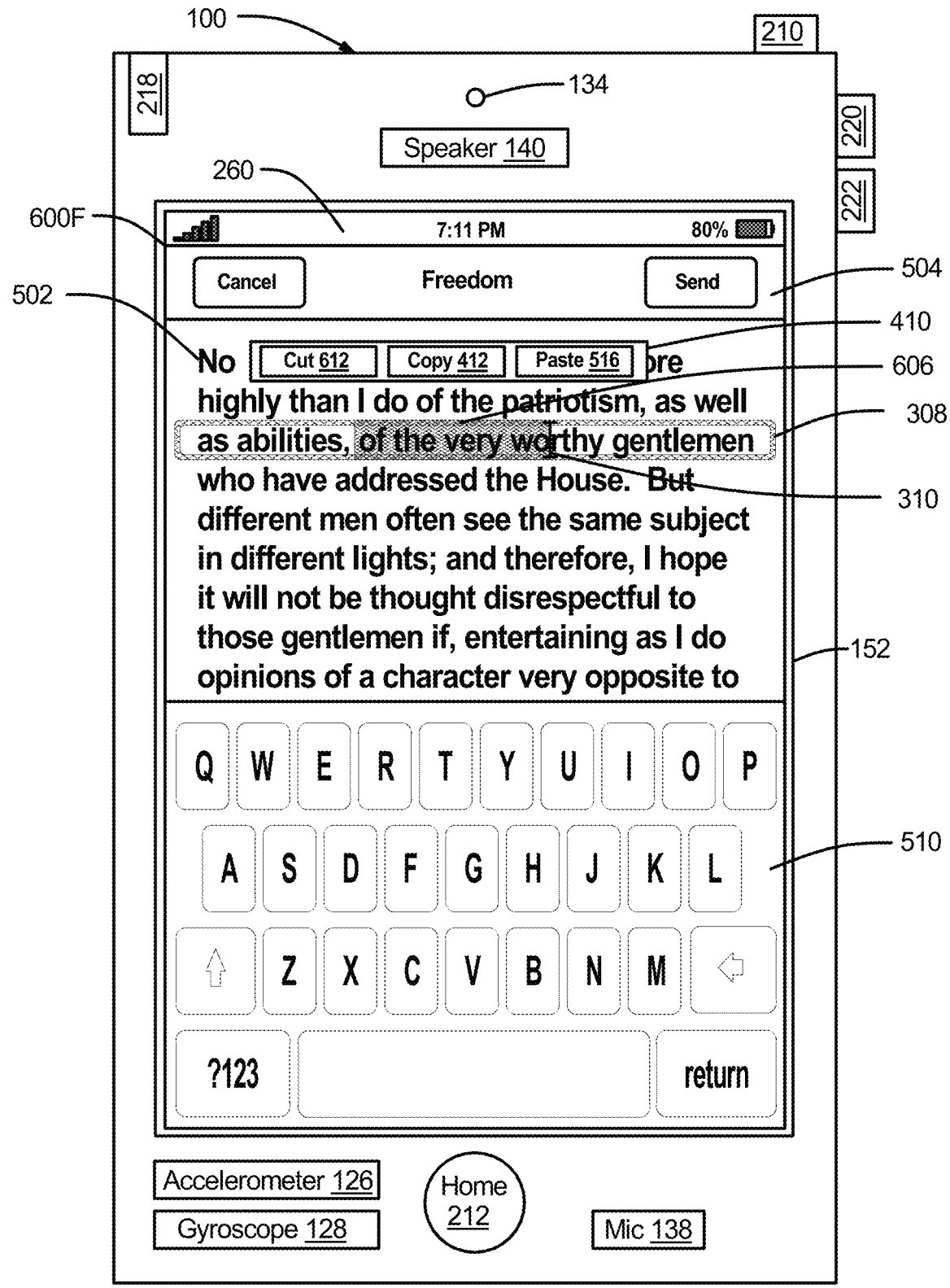

Toolbar 410 comprising "Cut", "Copy", and "Paste" icons may be displayed at the top of the UI as illustrated in FIG. 6B and in prior figures. However, a toolbar comprising "Cut", "Copy", and "Paste" icons may be displayed in the content area adjacent to the selected text in lieu of being displayed at the top of the UI. This is illustrated in UI 600F (FIG. 6F). A toolbar comprising, for example, a single copy icon or paste icon may also be similarly displayed in the content area in lieu of being displayed at the top of the UI.

Figure 7A:
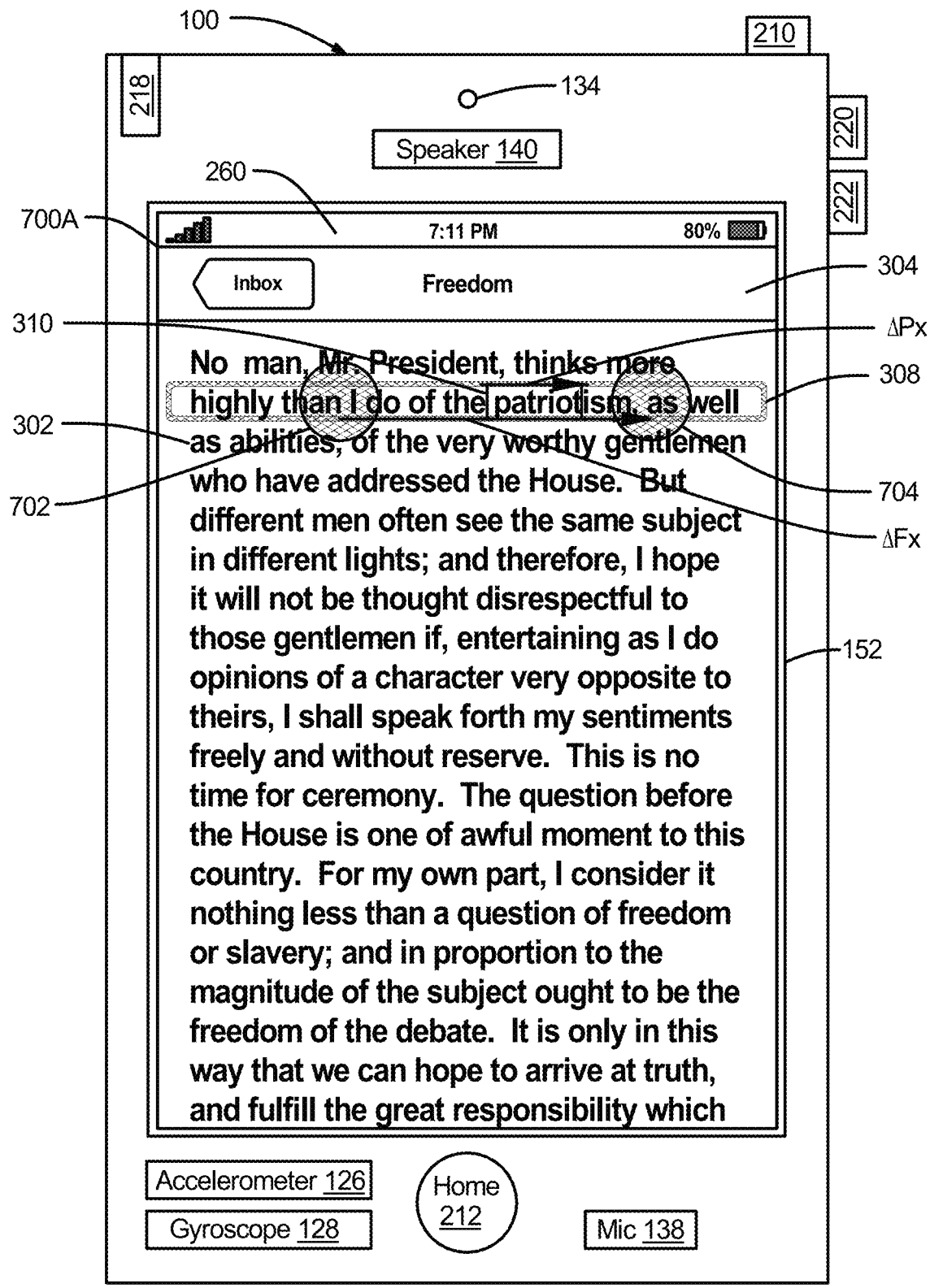
FIGS. 7A-7E illustrate an exemplary user interface for precisely positioning a pointer horizontally within content on a handheld mobile computing device with a touch-sensitive display in accordance with some embodiments.
Figure 7B:
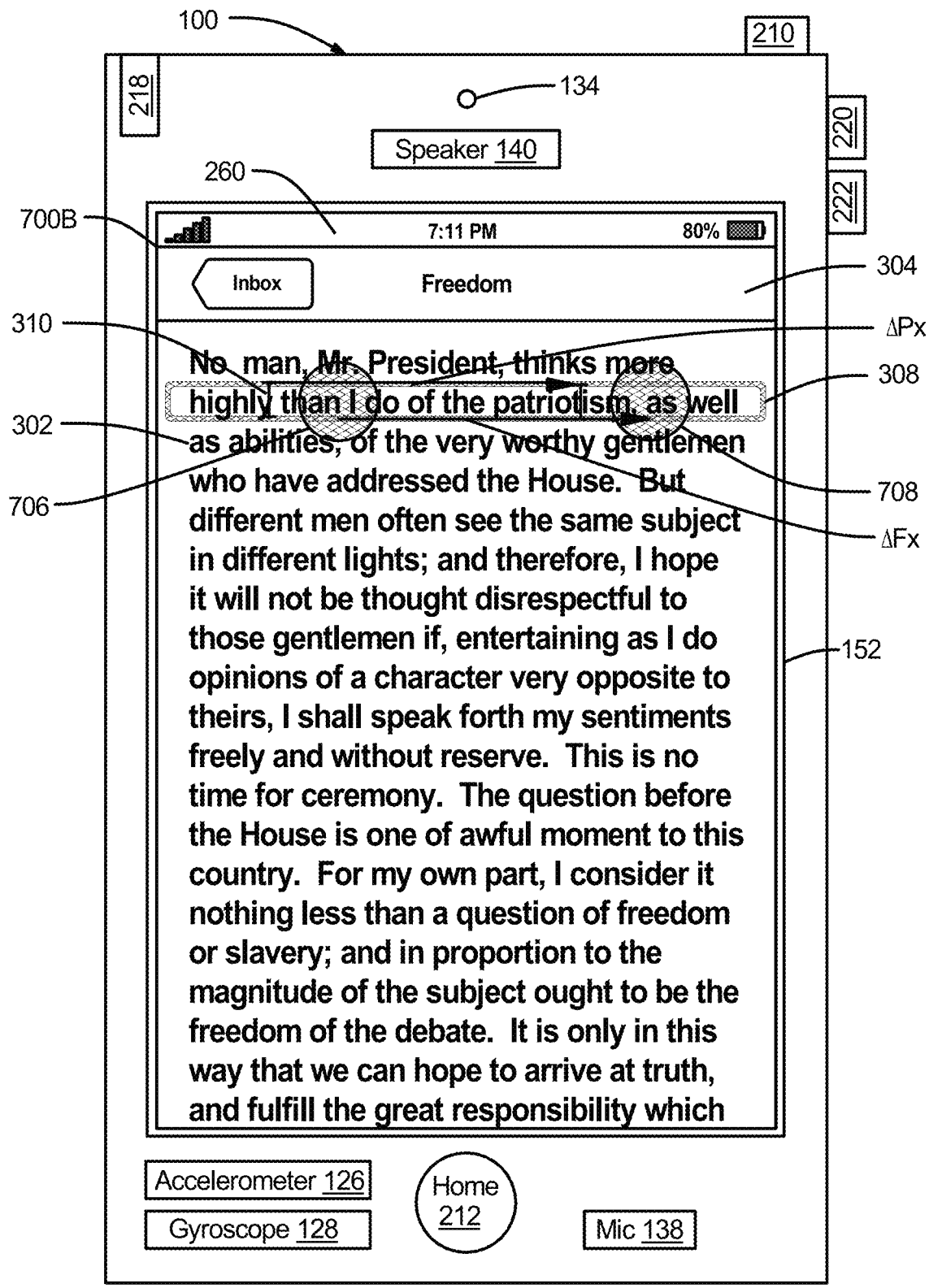
Figure 7C:
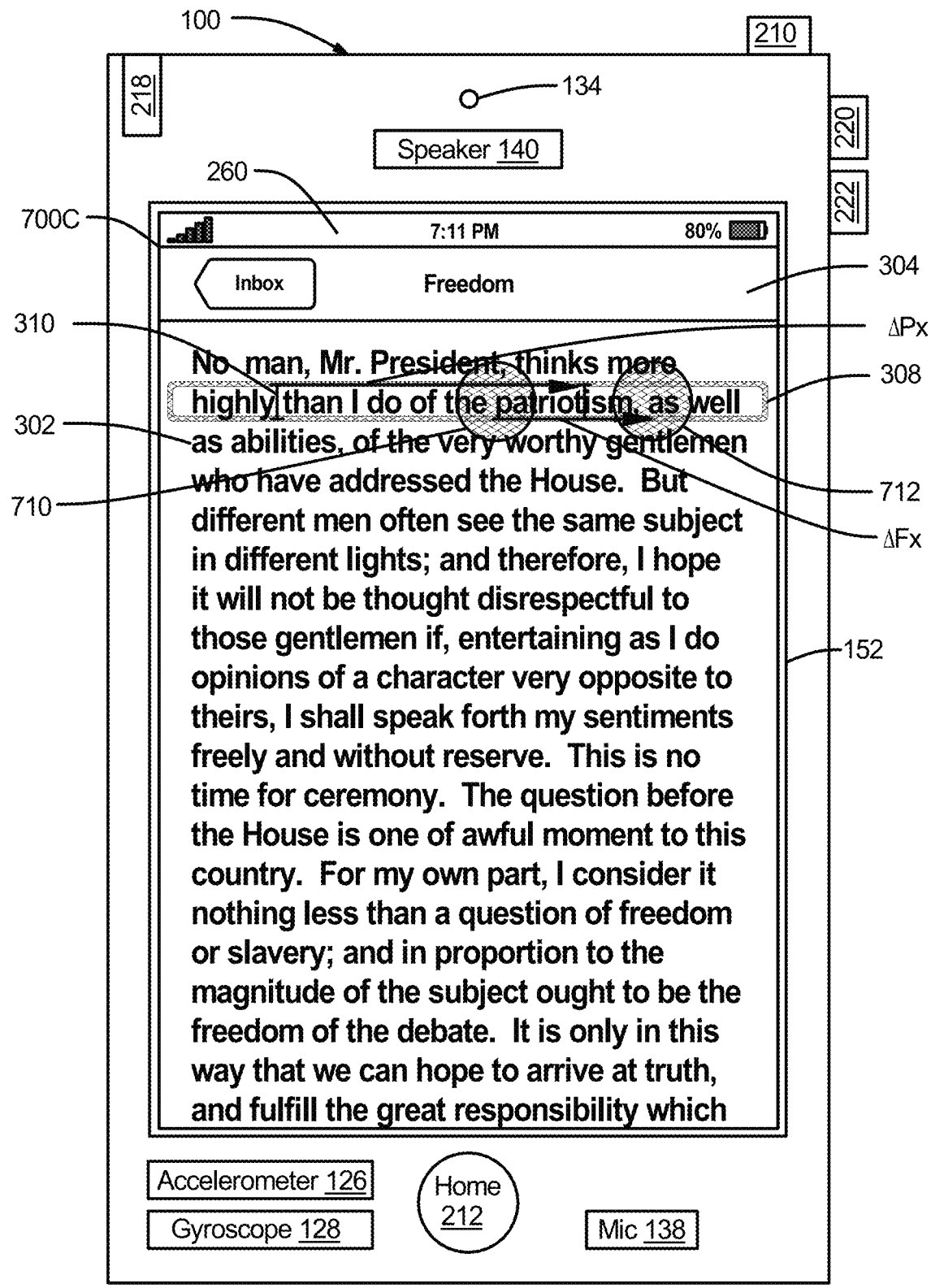
Figure 7D:
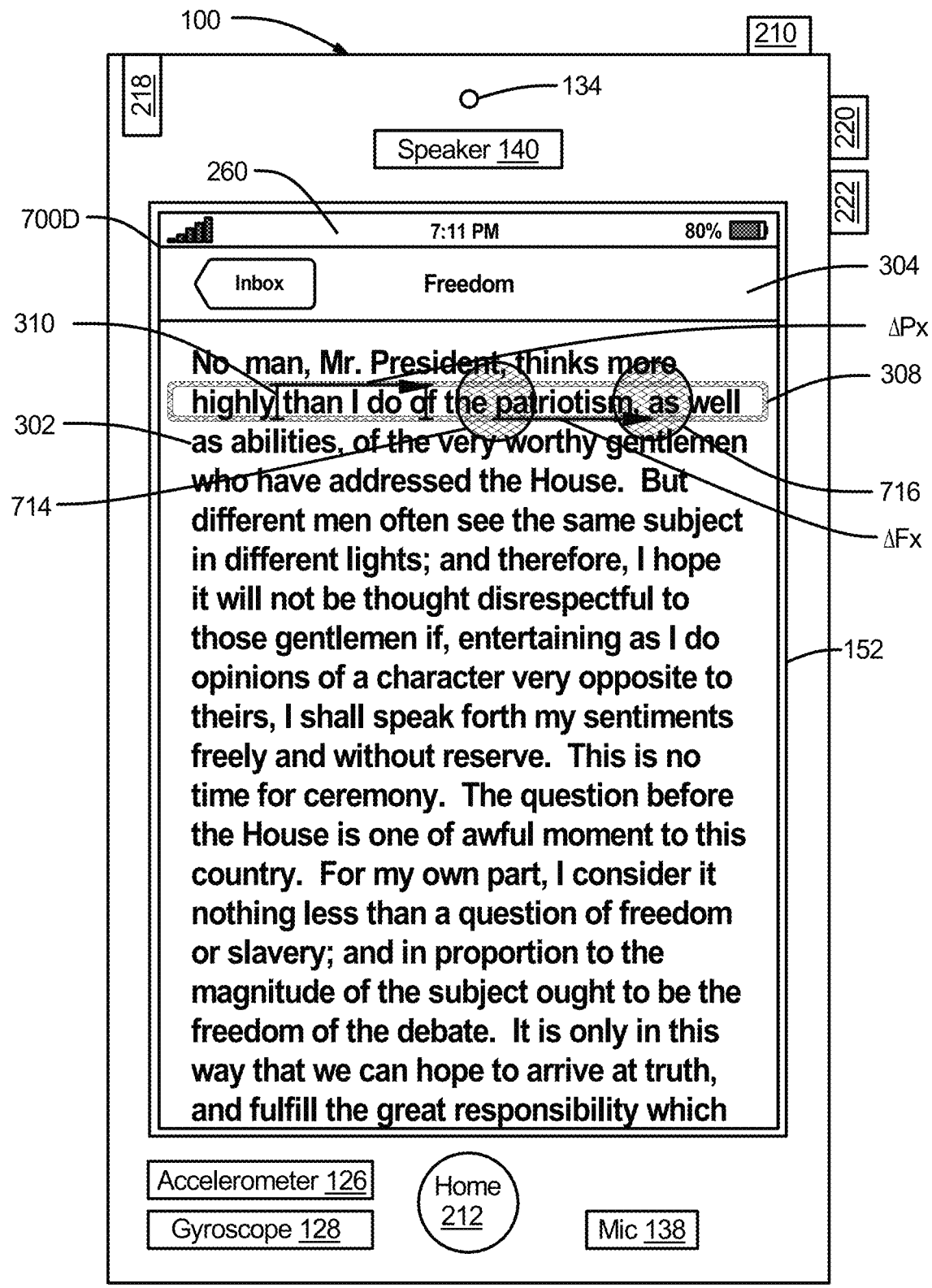
Figure 7E:
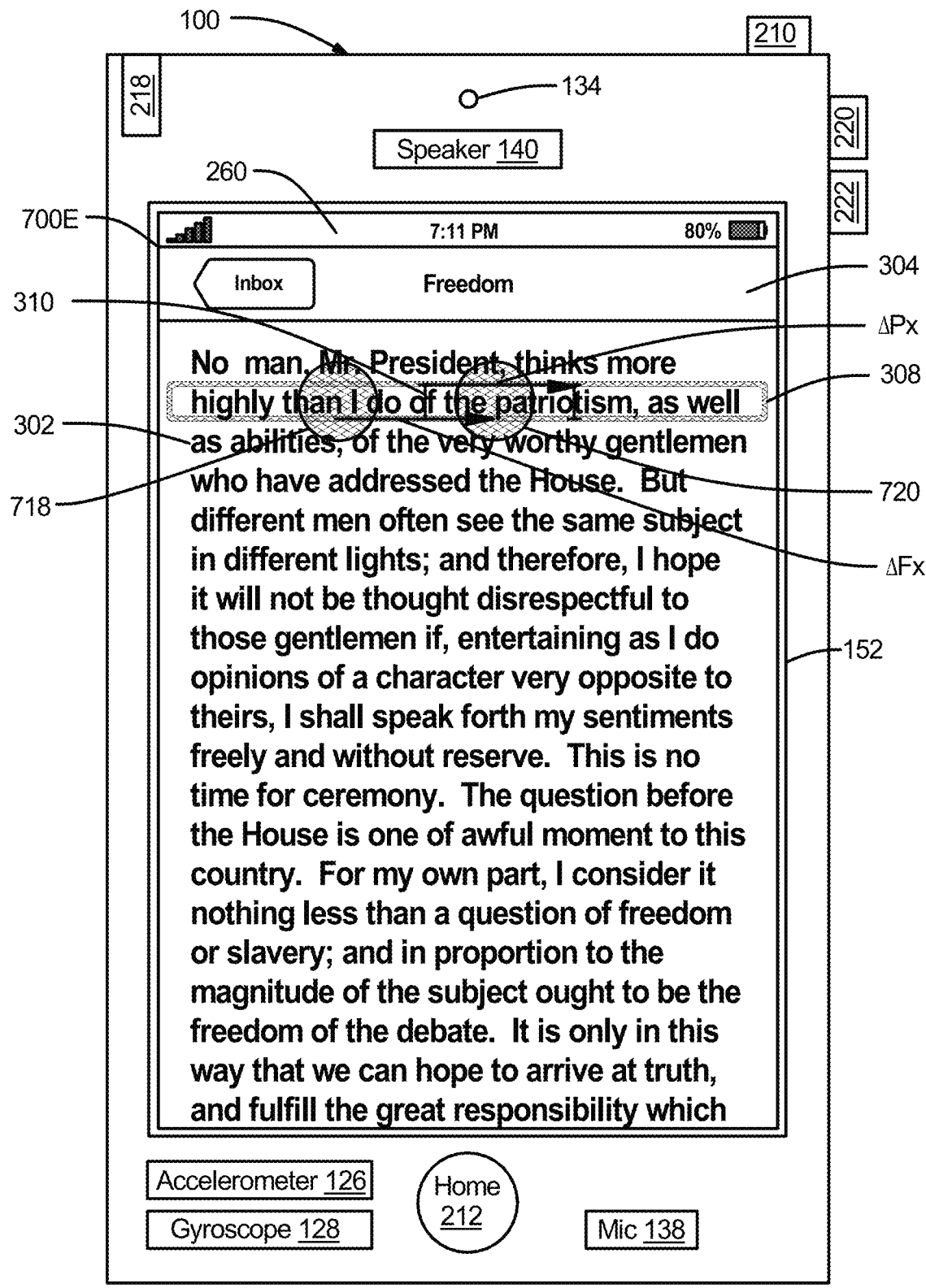

FIGS. 7A-7E illustrate an exemplary user interface for precisely positioning a pointer horizontally within content on a handheld mobile computing device with a touch-sensitive display in accordance with some embodiments. FIGS. 7A-7C illustrate positioning a pointer the cases of $K_x < 1$, $K_x = 1$, and $K_x > 1$. FIGS. 7D-7E, illustrate an example of positioning a pointer with two successive slide finger gestures. In the example shown in FIG. 7A, a user positions the pointer with $K_x < 1$. The device displays UI 700A (FIG. 7A) with read-only content 302, pointer positioning & control (PPC) icon 308 at a first position and pointer 310 at a first position. A user may perform horizontal-slide finger gesture 702 to 704 on PPC icon 308. In response to detecting $\Delta F_x$ (a change in the horizontal position of an uninterrupted finger contact on the PPC icon), the device changes the horizontal position of the pointer on the display from a first position to a second position such that $\Delta P_x$ (the change in the horizontal position of pointer 310) is proportional to $\Delta F_x$ as illustrated in FIG. 7A. This can be written as $\Delta P_x = K_x \Delta F_x$ where $K_x$ is a proportionality constant and where $K_x < 1$ for this example.

In the example shown in FIG. 7B, a user positions the pointer with $K_x \sim 1$. The device displays UI 700B (FIG. 7B) with read-only content 302, pointer positioning & control (PPC) icon 308 at a first position and pointer 310 at a first position. A user may perform horizontal-slide finger gesture 706 to 708 on PPC icon 308. In response to detecting $\Delta F_x$ (a change in the horizontal position of an uninterrupted finger contact on the PPC icon), the device changes the horizontal position of the pointer on the display from a first position to a second position such that $\Delta P_x$ (the change in the horizontal position of pointer 310) is proportional to $\Delta F_x$ as illustrated in FIG. 7B. This can be written as $\Delta P_x = K_x \Delta F_x$ where $K_x$ is a proportionality constant and where $K_x \sim 1$ for this example.

In the example shown in FIG. 7C, a user positions the pointer with $K_x > 1$. The device displays UI 700C (FIG. 7C) with read-only content 302, pointer positioning & control (PPC) icon 308 at a first position and pointer 310 at a first position. A user may perform horizontal-slide finger gesture 710 to 712 on PPC icon 308. In response to detecting $\Delta F_x$ (a change in the horizontal position of an uninterrupted finger contact on the PPC icon), the device changes the horizontal position of the pointer on the display from a first position to a second position such that $\Delta P_x$ (the change in the horizontal position of pointer 310) is proportional to $\Delta F_x$ as illustrated in FIG. 7C. This can be written as $\Delta P_x = K_x \Delta F_x$ where $K_x$ is a proportionality constant and where $K_x > 1$ for this example.

In the example shown in FIGS. 7D-7E, a user positions the pointer using two successive slide finger gestures on the PPC. The device displays UI 700D (FIG. 7D) with read-only content 302, pointer positioning & control (PPC) icon 308 at a first position and pointer 310 at a first position. A user may perform horizontal-slide finger gesture 714 to 716 on PPC icon 308. In response to detecting $\Delta F_x$ (a change in the horizontal position of an uninterrupted finger contact on the PPC icon), the device changes the horizontal position of the pointer on the display from a first position to a second position such that $\Delta P_x$ (the change in the horizontal position of pointer 310) is proportional to $\Delta F_x$ as illustrated in FIG. 7D. This can be written as $\Delta P_x = K_x \rightarrow F_x$ where $K_x$ is a proportionality constant. The device displays UI 700E (FIG. 7E) with pointer 310 at a second position. A user may perform a second horizontal-slide finger gesture 718 to 720 on PPC icon 308. In response to detecting $\Delta F_x$ (a change in the horizontal position of an uninterrupted finger contact on the PPC icon), the device changes the horizontal position of the pointer on the display from a first position to a second position such that $\Delta P_x$ (the change in the horizontal position of pointer 310) is proportional to $\Delta F_x$ as illustrated in FIG. 7E. This can be written as $\Delta P_x = K_x \Delta F_x$ where $K_x$ is a proportionality constant.

In one exemplary embodiment, the value of proportionality constant $K_x$ may be selected by a user in a settings menu. In another exemplary embodiment, the value of proportionality constant $K_x$ may be a function of the rate of change in the horizontal position of an uninterrupted finger contact on the PPC icon. In another exemplary embodiment, the parameters defining the functional dependence of $K_x$ on the rate of change in the horizontal position of an uninterrupted contact on the PPC icon may be set by a user in a settings menu.

Figure 8A:
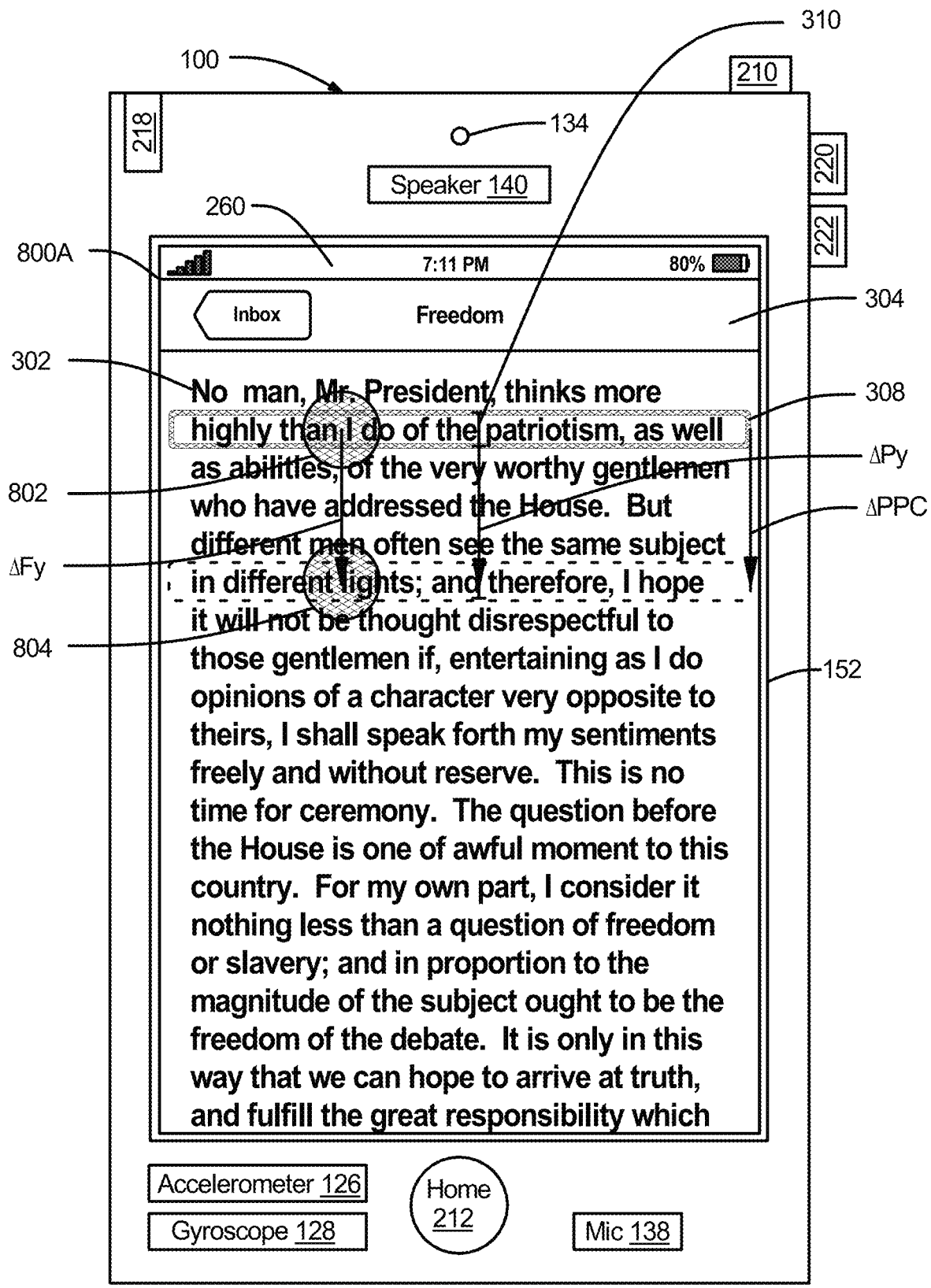
FIGS. 8A-8H illustrate an exemplary user interface for precisely positioning a pointer vertically within content on a handheld mobile computing device with a touch-sensitive display in accordance with some embodiments.

FIGS. 8A-8H illustrate an exemplary user interface for precisely positioning a pointer vertically within content on a handheld mobile computing device with a touch-sensitive display in accordance with some embodiments. The device displays UI 800A (FIG. 8A) with read-only content 302, pointer positioning & control (PPC) icon 308 at a first position and pointer 310 at a first position. A user may perform vertical-slide finger gesture 802 to 804 on PPC icon 308. In response to detecting $\Delta F_y$ (a change in the vertical position of an uninterrupted finger contact on the PPC icon), the device changes the vertical position of pointer 310 and PPC icon 308 such that $\Delta P_y$ (the change in the vertical position pointer 310) and $\Delta PPC_y$ (the change in the vertical position of PPC icon 308) are equal and are proportional to $\Delta F_y$ as illustrated in FIG. 8A. This can be written as $\Delta P_y = \Delta PPC_y = K_y \Delta F_y$ where $K_y$ is a proportionality constant. In this exemplary embodiment $K_y = 1$. The device displays UI 800B (FIG. 8B) with pointer 310 and PPC icon 308 at a second position.

Figure 8B:
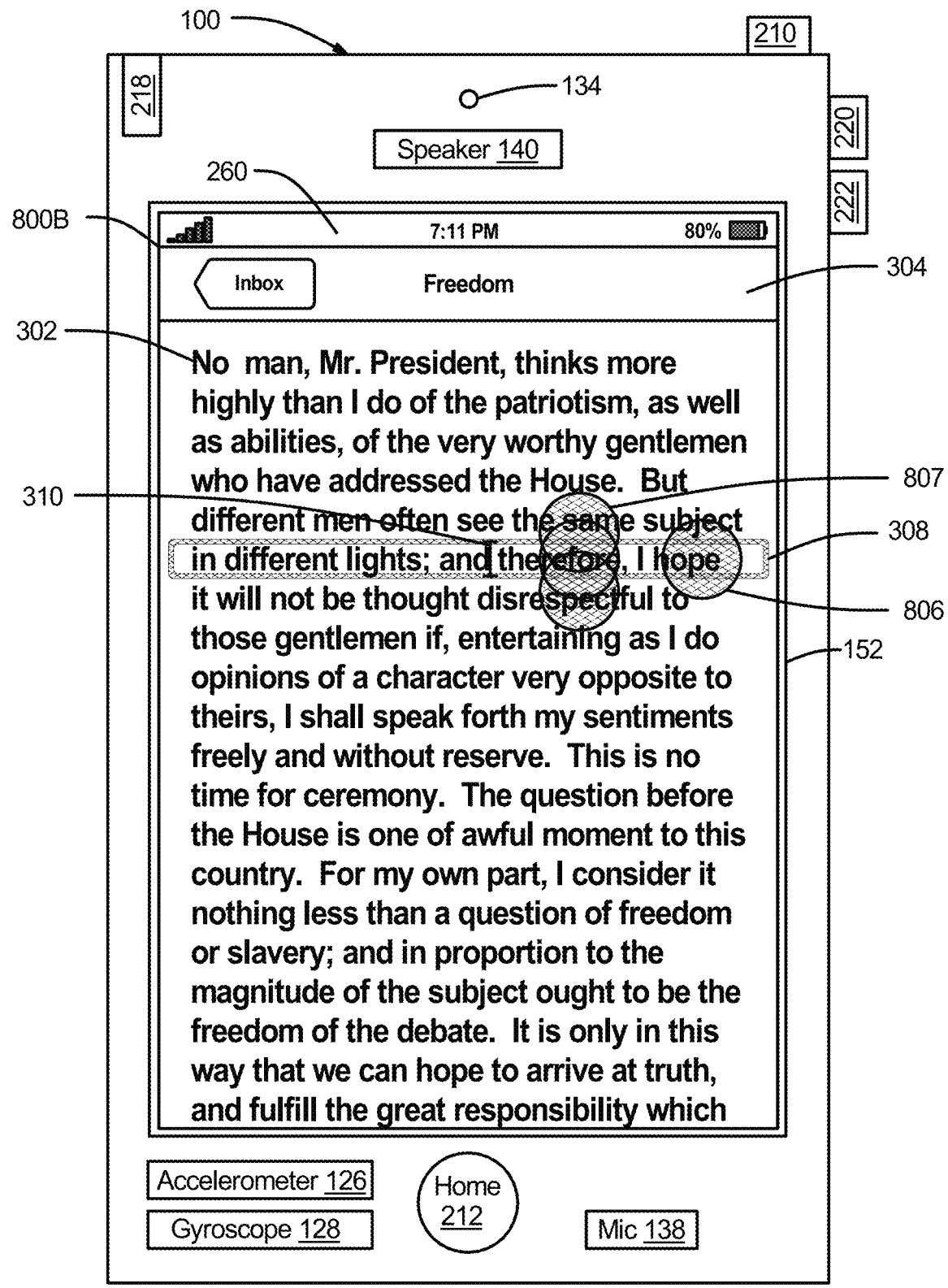

To more finely position pointer 310 in the vertical direction, the user may perform a finger gesture on PPC icon 308. In one embodiment the finger gesture may be long-press finger gesture 806 as illustrated in FIG. 8B. In another embodiment, the finger gesture may be short distance UP DN UP or DN UP DN slide finger gesture 807 as illustrated in FIG. 8B.

In response to detecting the finger gesture on the PPC icon, the device may display UI 800C (FIG. 8C) with vertical fine-adjustment icon 808 that is relatively narrow in width. With pointer 310 and PPC icon 308 at the second position, a user may perform vertical-slide finger gesture 810 to 812 on fine-adjustment icon 808 as illustrated in UI 800D (FIG. 8D). In response to detecting $\Delta FF_y$ (a change in the vertical position of an uninterrupted finger contact on fine-adjustment icon 808), the device changes the vertical position of pointer 310 and PPC icon 308 such that $\Delta P_y$ (the change in the vertical position of pointer 310) and $\Delta PPC_y$ (the change in the vertical position of PPC icon 308) are equal and are proportional to $\Delta FF_y$ as illustrated in FIG. 8D. This can be written as $\Delta P_y = \Delta PPC_y = KF_y \Delta FF_y$ where $KF_y < 1$. The device displays UI 800E (FIG. 8E) with pointer 310 and PPC icon 308 at a third position a short distance from the second position.

In another embodiment, in response to detecting the finger gesture on the PPC icon, the device may display UI 800F (FIG. 8F) with vertical fine-adjustment icon 808 with a substantially equal to the width of PPC icon 308. With pointer 310 and PPC icon 308 at the second position, a user may perform diagonal-slide finger gesture 814 to 816 on fine-adjustment icon 808 as illustrated in UI 800G (FIG. 8G). In response to detecting $\Delta FF_y$ (a change in the vertical position of an uninterrupted finger contact on fine-adjustment icon 808), the device changes the vertical position of pointer 310 and PPC icon 308 such that $\Delta P_y$ (the change in the vertical position of pointer 310) and $\Delta PPC_y$ (the change in the vertical position of PPC icon 308) are equal and are proportional to $\Delta FF_y$ as illustrated in FIG. 8G. This can be written as $\Delta P_y = \Delta PPC_y = KF_y \Delta FF_y$ where $KF_y < 1$. The device displays UI 800H (FIG. 8H) with pointer 310 and PPC icon 308 at a third position a short distance from the second position.

In one exemplary embodiment, vertical fine-adjustment icon 808 may be displayed until a user ends the vertical-slide finger gesture on fine-adjustment icon 808 as illustrated in FIG. 8D and FIG. 8G. In this embodiment, the fine-adjustment icon is no longer displayed when the user ends the vertical-slide finger gesture and lifts finger contact from fine adjustment icon 808. In another exemplary embodiment (not shown), fine-adjustment icon 808 may always be displayed whenever the PPC icon is displayed. In another exemplary embodiment, fine-adjustment icon 808 may be displayed until a user cancels the PPC icon. In another embodiment, the user may cancel fine-adjustment icon 808, by performing a tap finger gesture on fine adjustment icon 808. In another embodiment, the user may cancel fine-adjustment icon 808, by performing a fine-adjustment icon cancel gesture of another type.

FIGS. 9A-9D illustrate an exemplary user interface for positioning a pointer and selecting within content on a handheld mobile computing device with a touch-sensitive display with the device in portrait and landscape orientation in accordance with some embodiments.

Figure 9A:
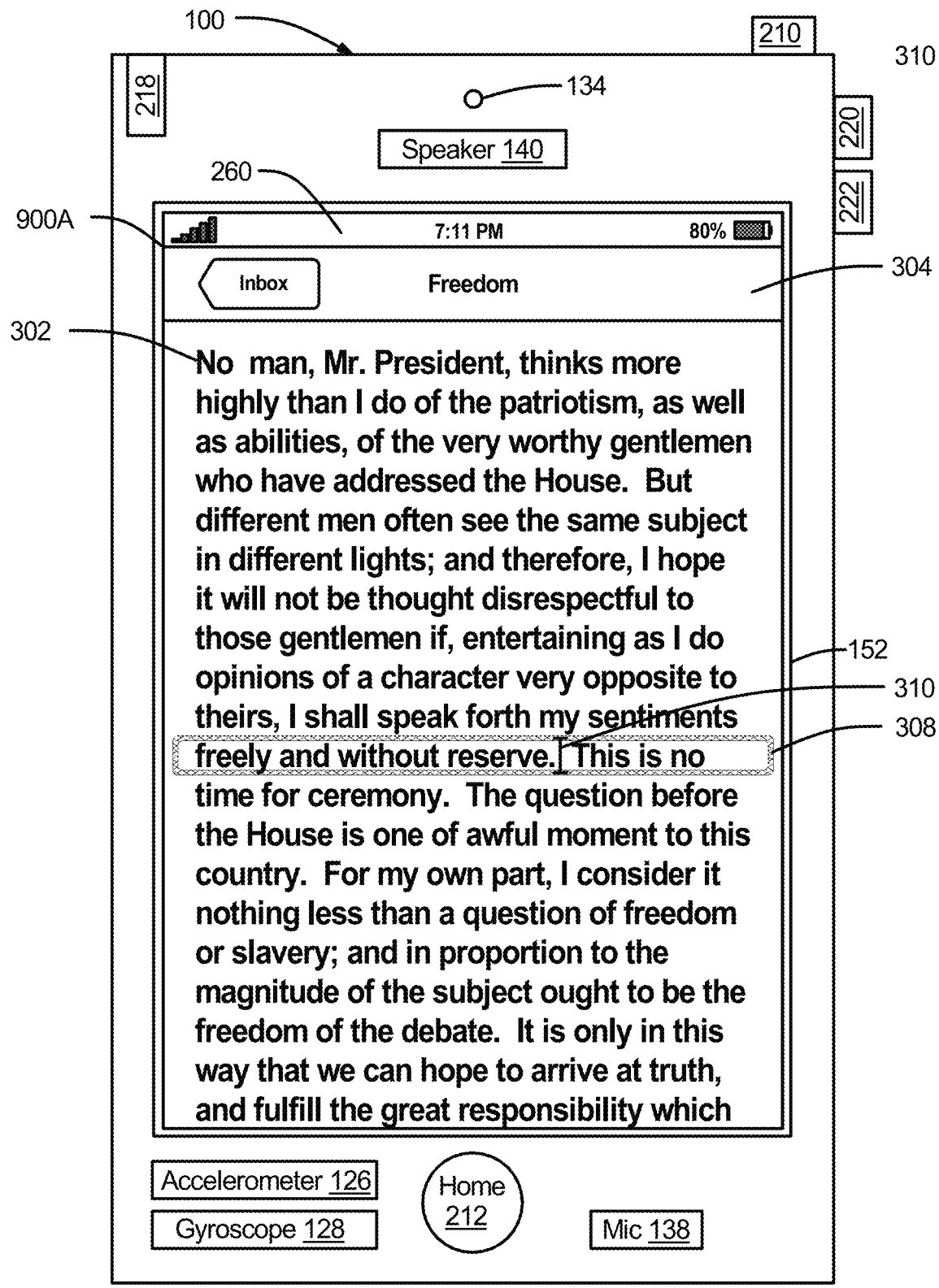
FIGS. 9A-9D illustrate an exemplary user interface for positioning a pointer and selecting within content on a handheld mobile computing device with a touch-sensitive display with the device in portrait and landscape orientation in accordance with some embodiments.
Figure 9B:
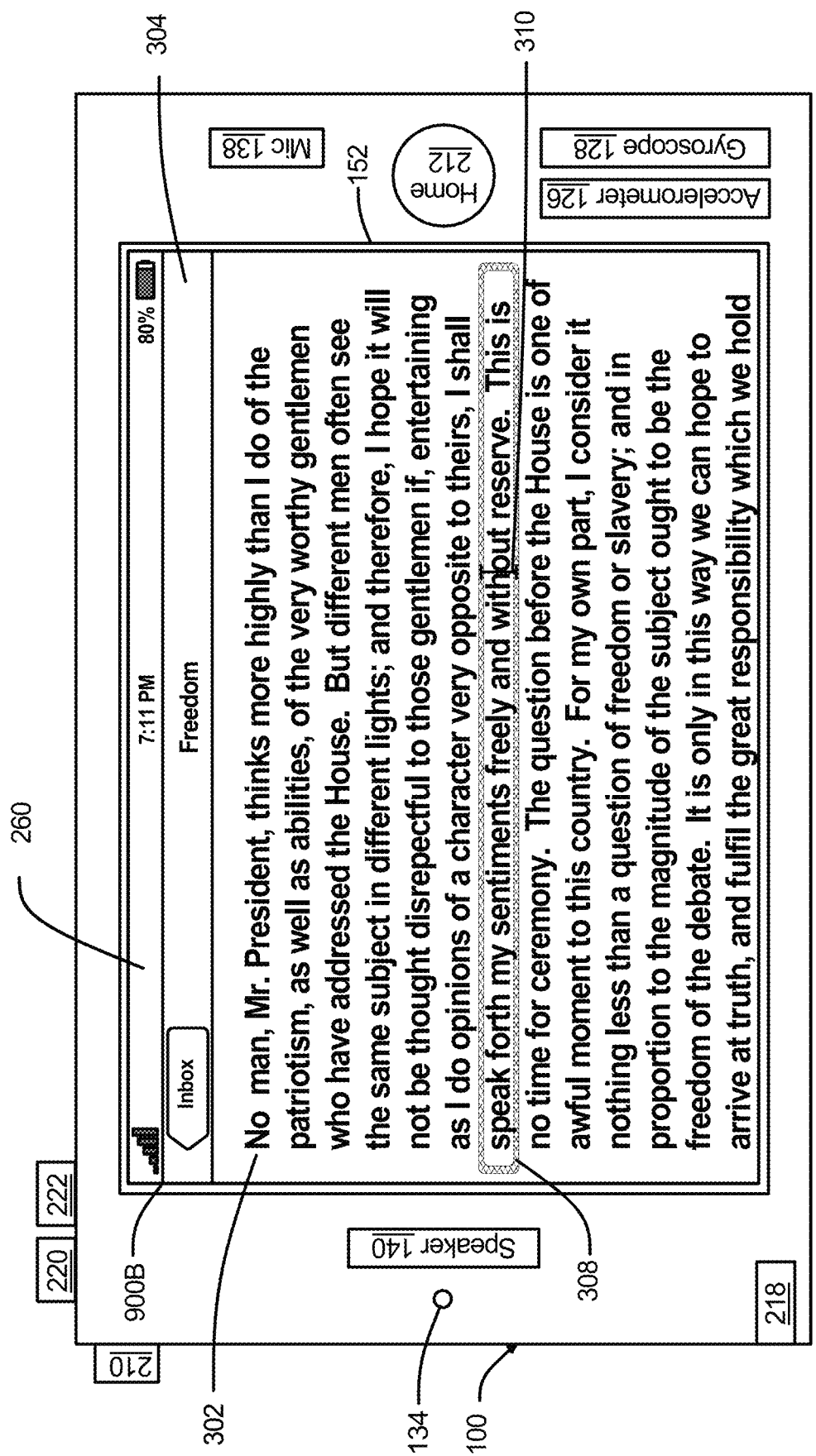

The device displays UI 900A (FIG. 9A) with read-only content 302, pointer positioning & control (PPC) icon 308 and pointer 310. A user may change the device orientation from portrait to landscape orientation. The device detects the change in device orientation using data read from accelerometer 126 and displays UI 900B (FIG. 9B) with read-only content 302 in landscape orientation. The position of the pointer positioning & control (PPC) icon 308 and pointer 310 relative to content 302 may change when the device orientation is changed as illustrated in FIGS. 9A-9B. The position of the pointer 310 and the position of the pointer positioning and control (PPC) icon 308 is independent of the position of any displayed content. The position of the pointer 310 and the position of the PPC icon 308, relative to the top and bottom and left and right boundaries of the display may be preserved when the display orientation is changed as illustrated in the example embodiment of FIGS. 9A-9B.

Figure 9C:
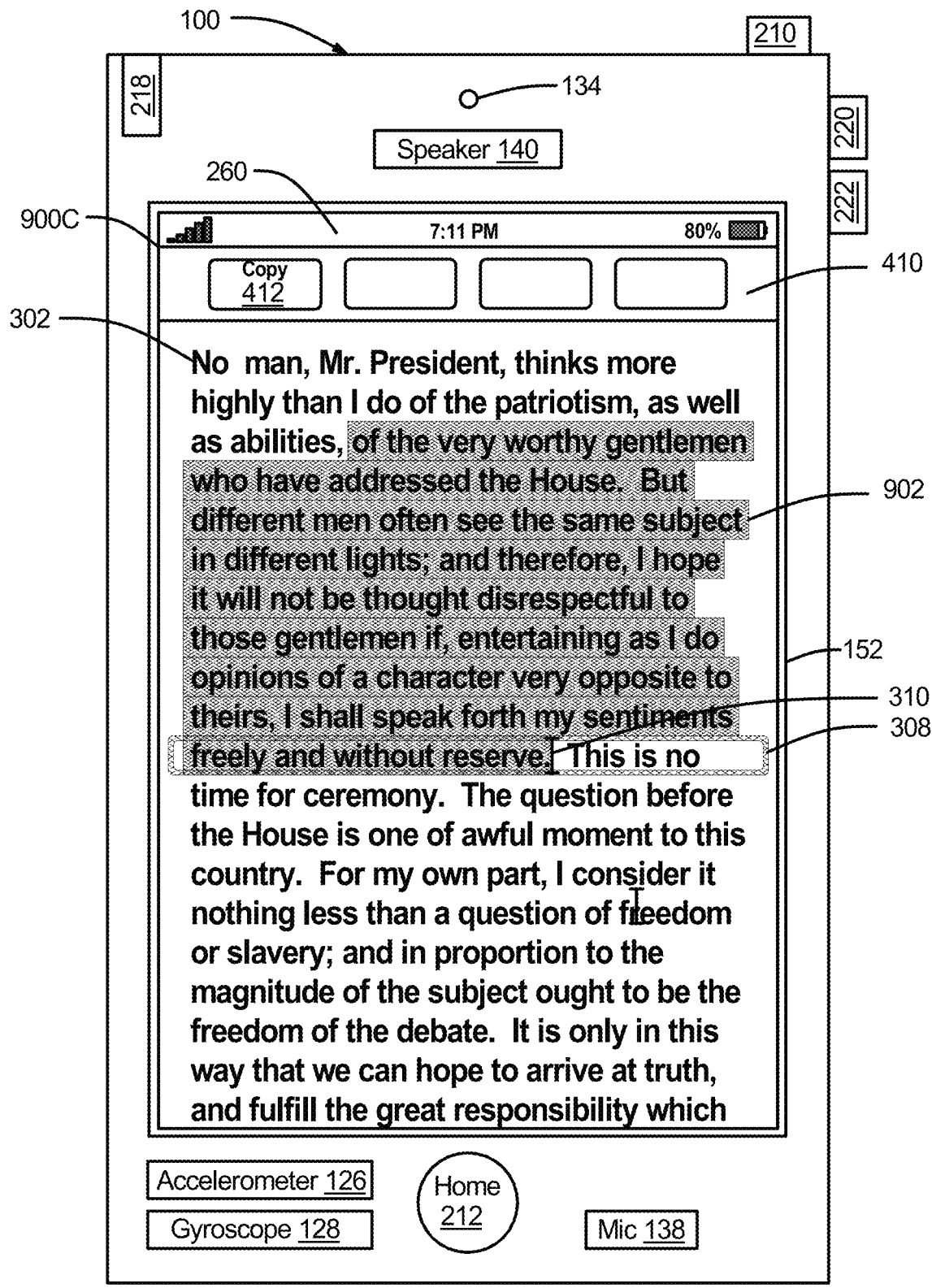
Figure 9D:
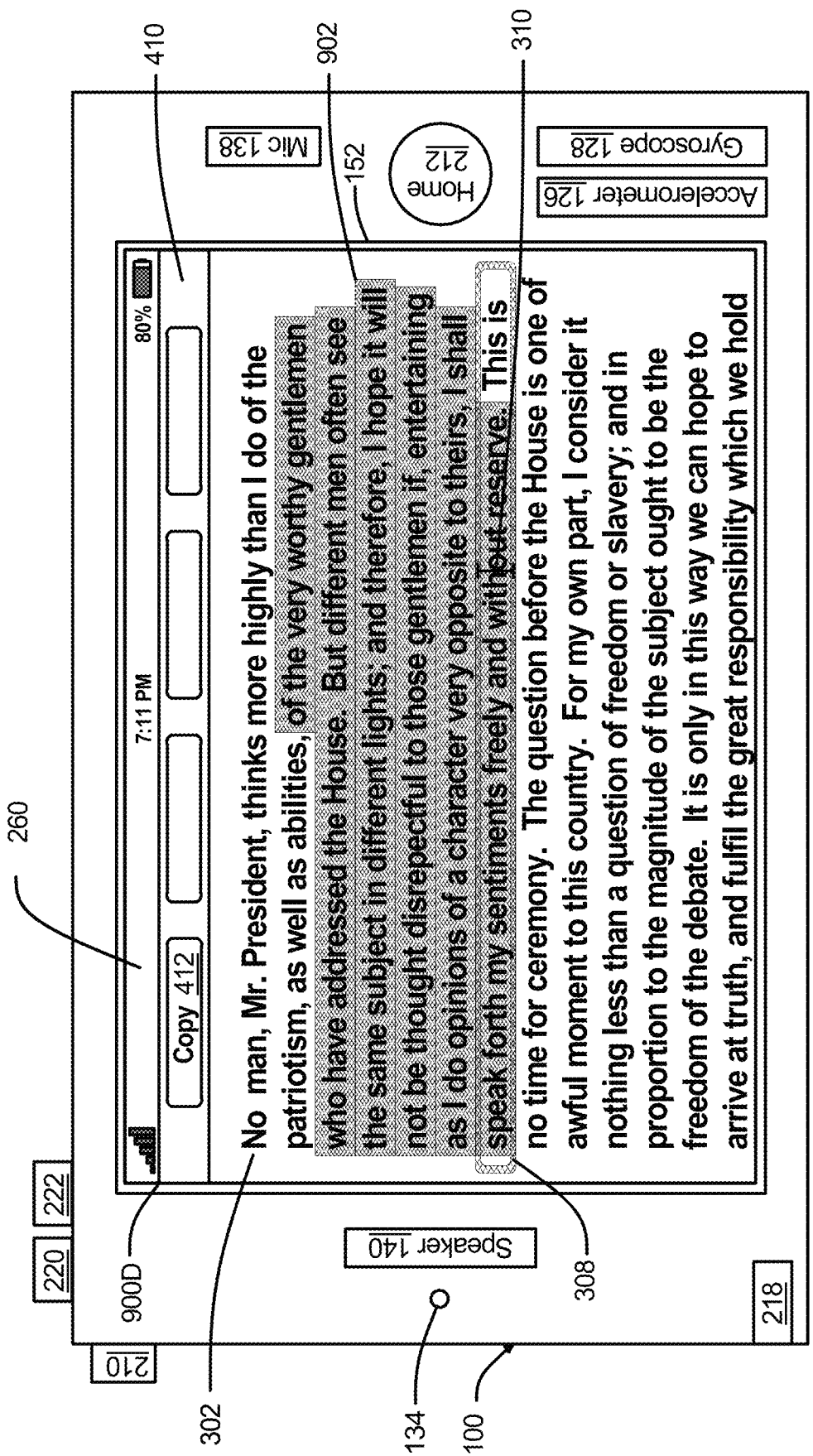

The device displays UI 900C (FIG. 9C) with read-only content 302, selected text 902 displayed selected from a first position to a second position within the text. The device UI 900C also includes pointer positioning & control (PPC) icon 308 and pointer 310. A user may change the device orientation from portrait to landscape orientation. The device detects the change in device orientation using data read from accelerometer 126 and displays UI 900D (FIG. 9D) with read-only content 302 in landscape orientation. The selected text 902 is associated with the text content and accordingly moves with the text content when the display orientation is changed as illustrated in FIGS. 9C-9D. The position of the pointer positioning & control (PPC) icon 308 and pointer 310 relative to content 302 may change when the device orientation is changed as illustrated in FIGS. 9C-9D. The position of the pointer 310 and the position of the pointer positioning and control (PPC) icon 308 is independent of the position of any displayed content. The position of the pointer 310 and the position of the PPC icon 308, relative to the top and bottom and left and right boundaries of the display may be preserved when the display orientation is changed as illustrated in the example embodiment of FIGS. 9C-9D.

FIGS. 10A-10D illustrate an exemplary user interface for positioning a pointer and selecting within read-only content on a handheld mobile computing device with a touch-sensitive display in accordance with some embodiments when the pointer reaches a limit of travel in the vertical direction.

Figure 10A:
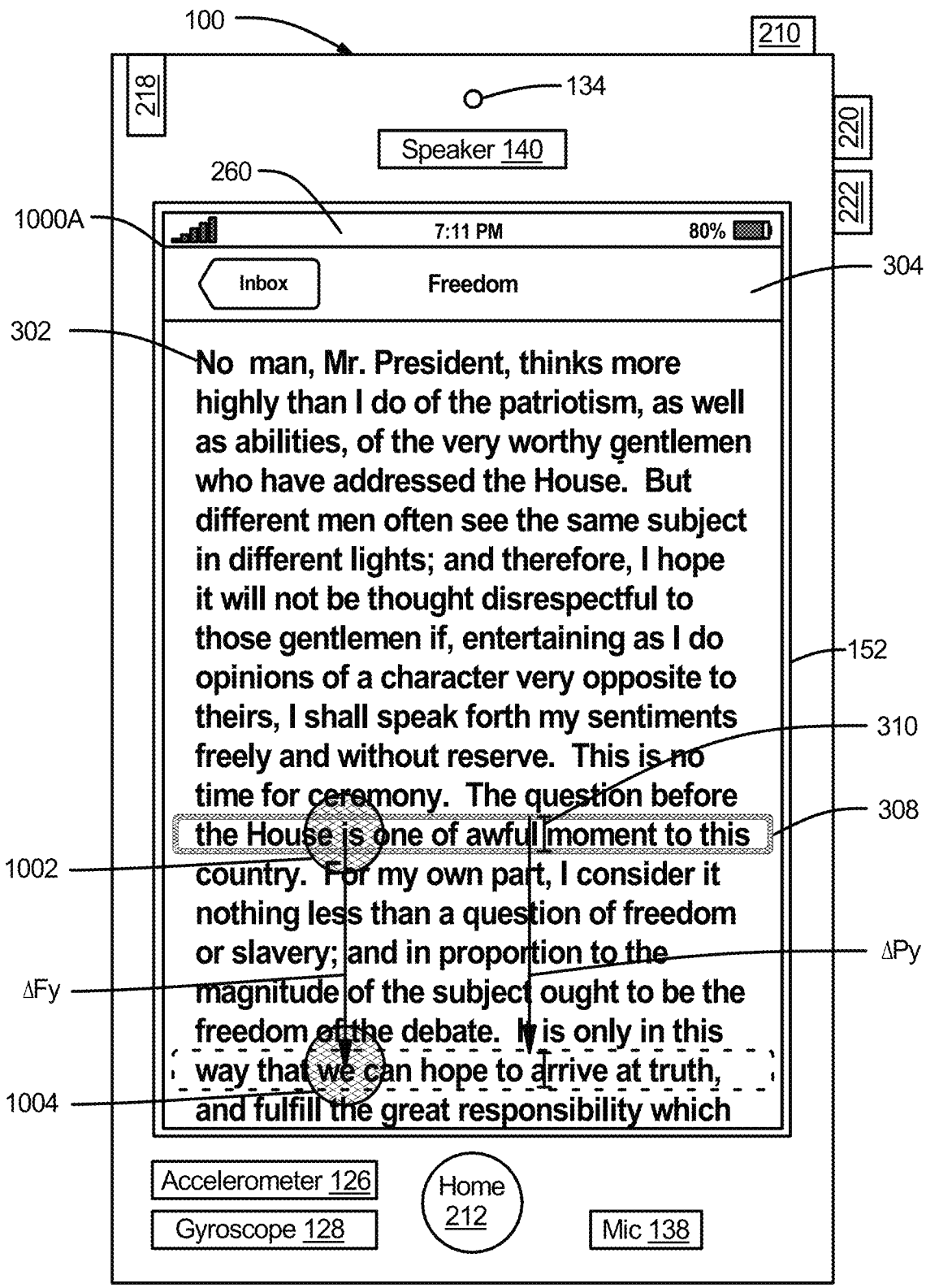
FIGS. 10A-10D illustrate an exemplary user interface for positioning a pointer and selecting within read-only content on a handheld mobile computing device with a touch-sensitive display in accordance with some embodiments when the pointer reaches a limit of travel in the vertical direction.
Figure 10B:
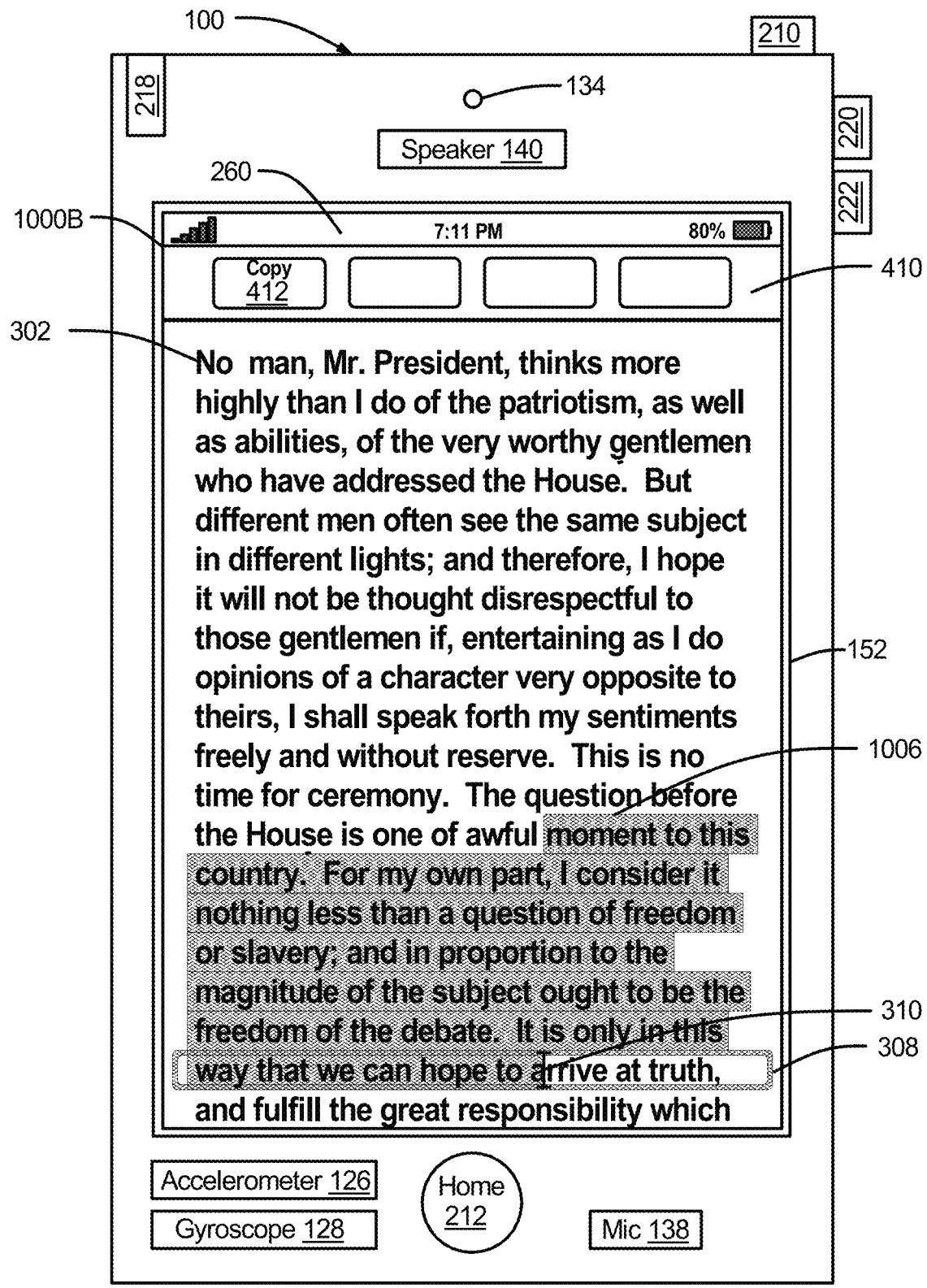
Figure 10C:
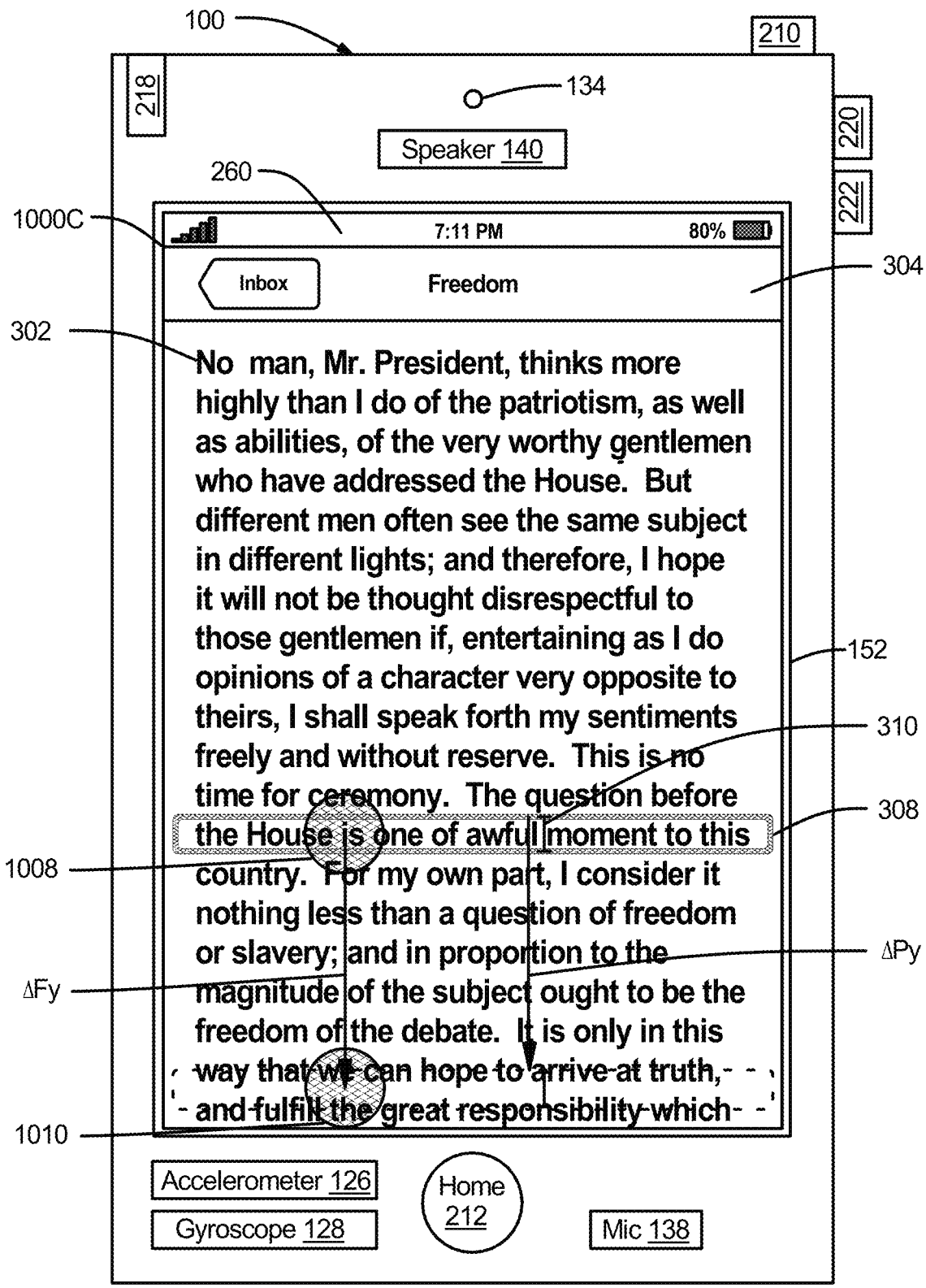
Figure 10D:
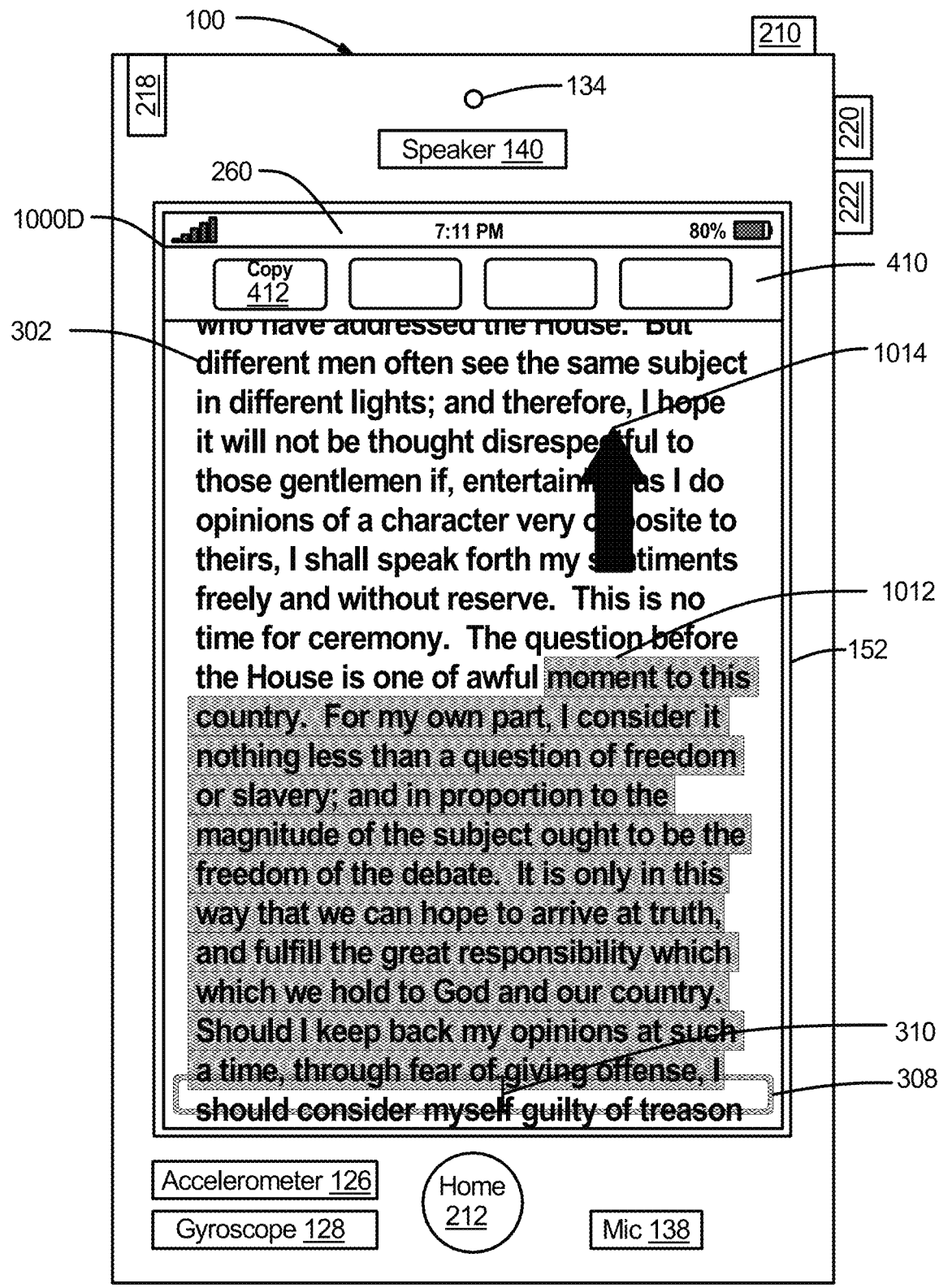

The device displays read-only content 302 in UI 1000A (FIG. 10A) with pointer positioning & control (PPC) icon 308 at a first position and pointer 310 at a first position. The device may also display application navigation bar 304. In a first example, a user may perform tap-and-slide finger gesture 1002 to 1004 on PPC icon 308, as shown in FIG. 10A. In response, the device displays UI 1000B (FIG. 10B) with selected text 1006 displayed from a first position to a second position, and with pointer 310 at a second position. In a second example, a user may perform tap-and-slide finger gesture 1008 to 1010 on PPC icon 308 that moves pointer 310 to a new second position where pointer 310 reaches a limit of travel in the vertical direction, as shown in UI 1000C (FIG. 10C). As pointer 310 approaches its limit of travel at the lower extent of the displayed content, the device displays UI 1000D (FIG. 10D) and scrolls up content 302 as denoted by arrow 1014. This enables the content to be selected from a first position to a new second position farther down the content page. The device also displays PPC icon 308 and pointer 310 at a new second position. In the example shown in FIG. 10D, the content has scrolled up four lines. The device continues to scroll up the content, either until the user moves PPC icon 308 such that pointer 310 is no longer at its limit in vertical travel, or until the page has scrolled to the end of the content.

Figure 10E:
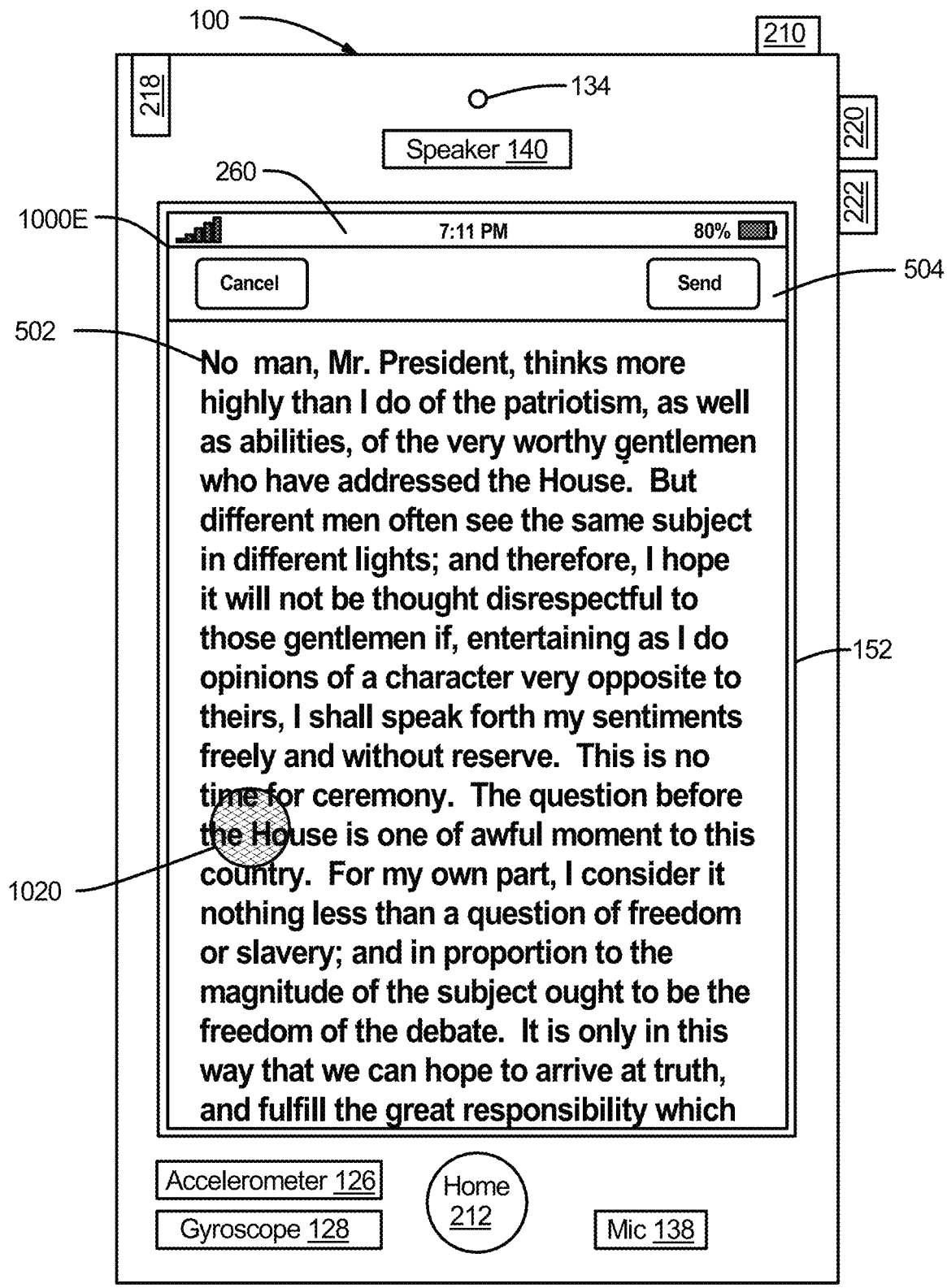
FIGS. 10E-10I illustrate an exemplary user interface for positioning a pointer and a cursor within editable content on a handheld mobile computing device with a touch-sensitive display in accordance with some embodiments when the pointer reaches a limit of travel in the vertical direction.
Figure 10F:
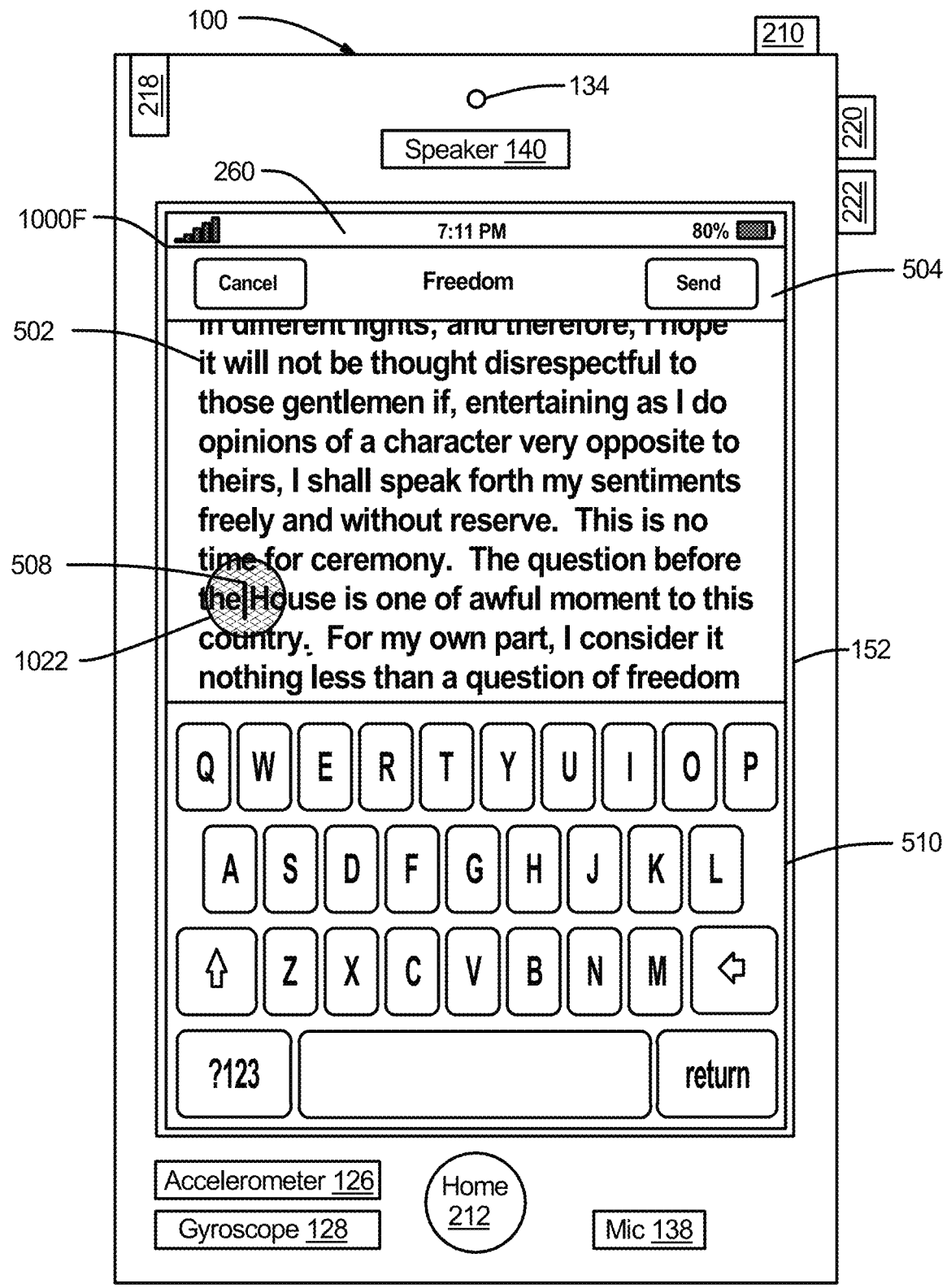
Figure 10G:
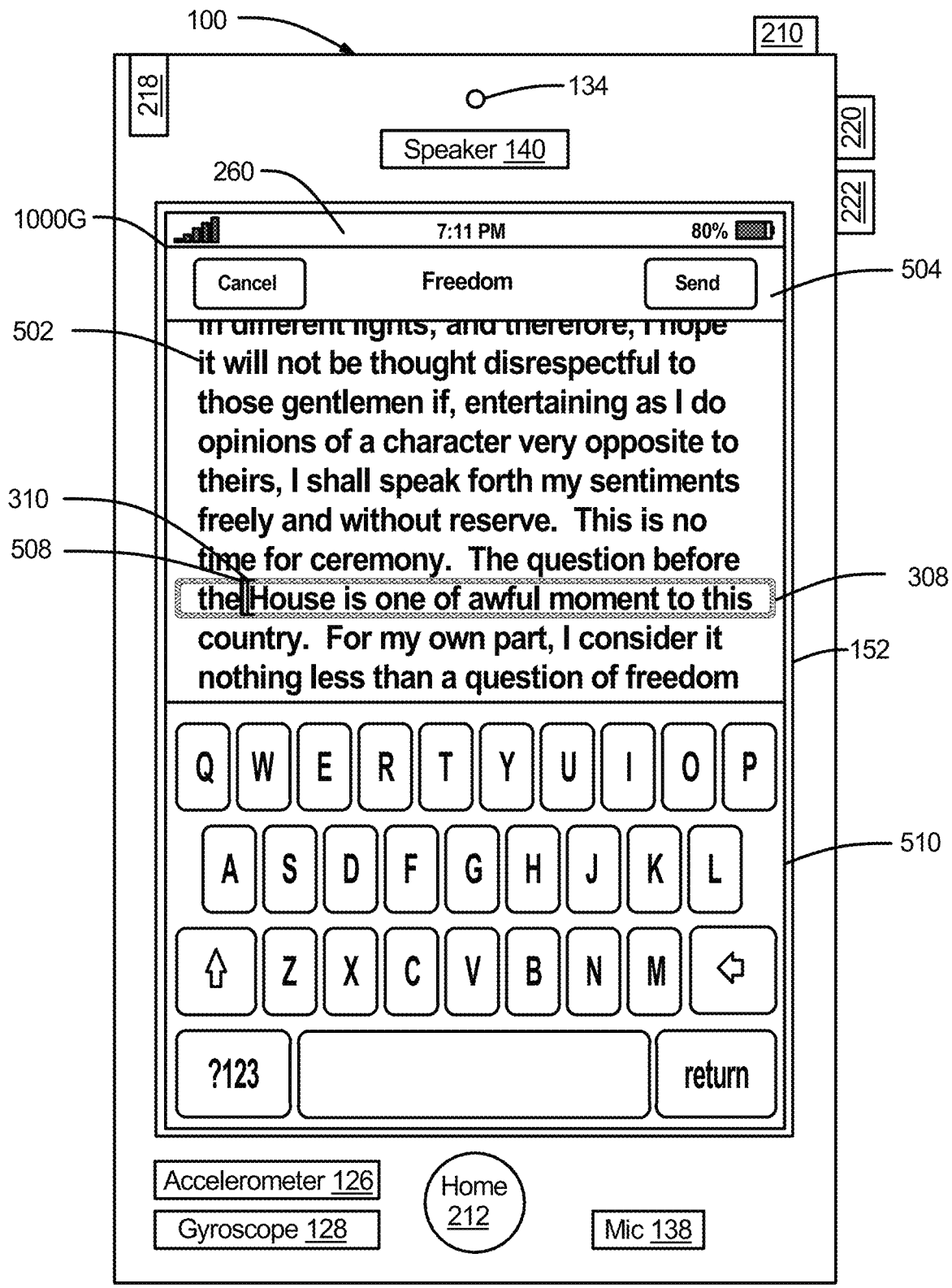
Figure 10H:
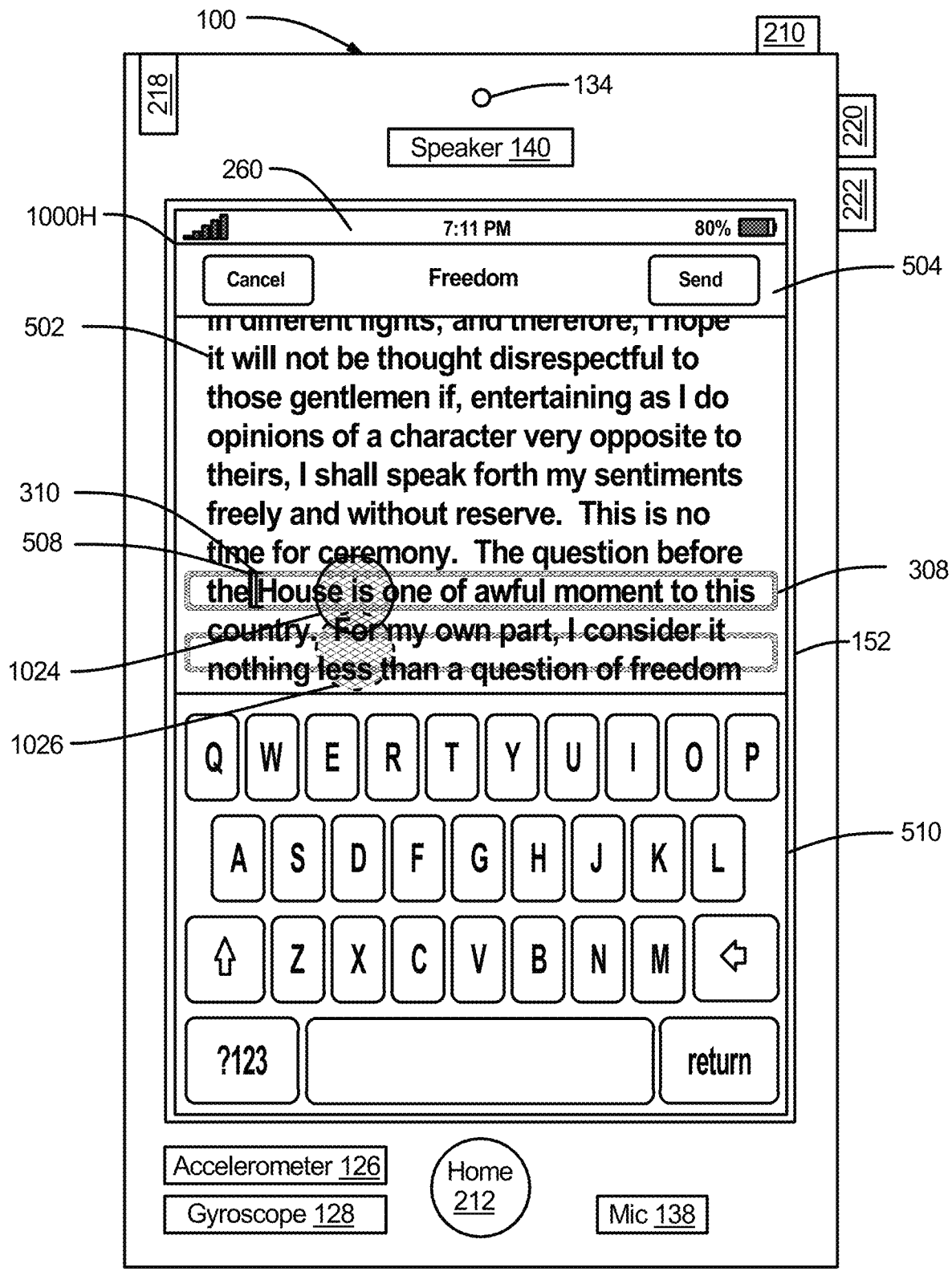
Figure 10I:
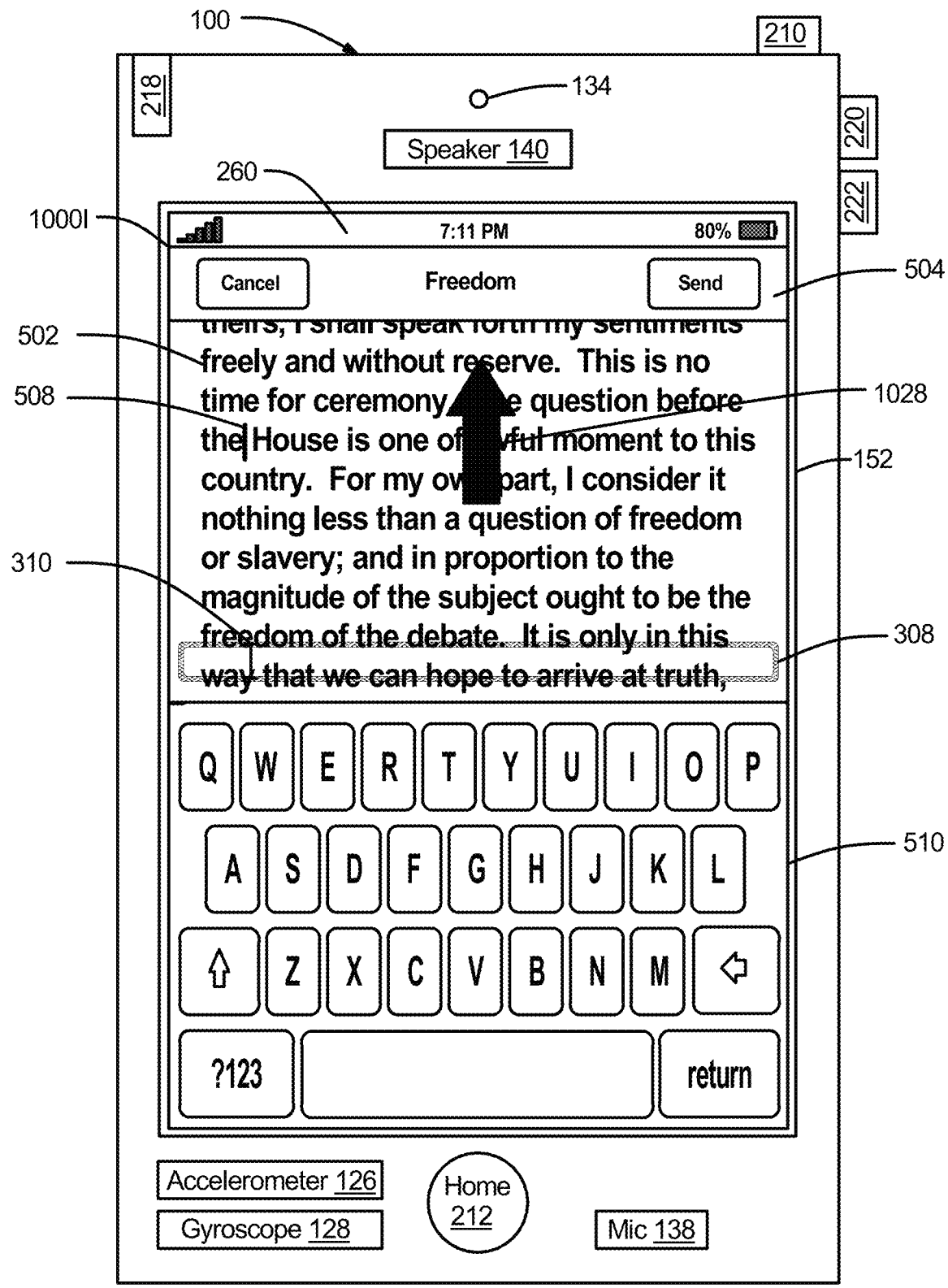

FIGS. 10E-10I illustrate an exemplary user interface for positioning a pointer and a cursor within editable content on a handheld mobile computing device with a touch-sensitive display in accordance with some embodiments when the pointer reaches a limit of travel in the vertical direction. The device displays editable content 502 in UI 1000E (FIG. 10E). A user may perform tap finger gesture 1020 on editable content 502. In response, the device displays UI 1000F (FIG. 10F) with cursor 508 displayed at the location of tap finger gesture 1020, and also displays soft keyboard 510. The device also scrolls up the content in UI 1000F so that the cursor is not hidden by keyboard 510. A user may perform long-press finger gesture 1022 on the content as illustrated in FIG. 10F. In response, the device displays UI 1000G (FIG. 10G) with PPC icon 308 at a first position and pointer 310 at a first position. A user may perform a vertical-slide finger gesture 1024 to 1026 on PPC icon 308 as illustrated in FIG. 10H. This finger gesture moves pointer 310 from the first position down the page toward the limit of travel in the vertical direction at the lower extent of the displayed content. As pointer 310 approaches its limit of travel at the lower extent of the displayed content, the device displays UI 1000I (FIG. 10I) and scrolls up content 502 as denoted by arrow 1028. This enables the content to be selected from a first position to a new second position further down the content page. The device also displays PPC icon 308 and pointer 310 at a new second position. Cursor 508 scrolls up with content 502 and the location of cursor 508 does not change relative to content 502. In the example shown in FIG. 10I, the content has scrolled up four lines. The device continues to scroll up the content, either until the user moves PPC icon 308 such that pointer 310 is no longer at its limit in vertical travel, or until the page has scrolled to the end of the content.

Figure 11A:
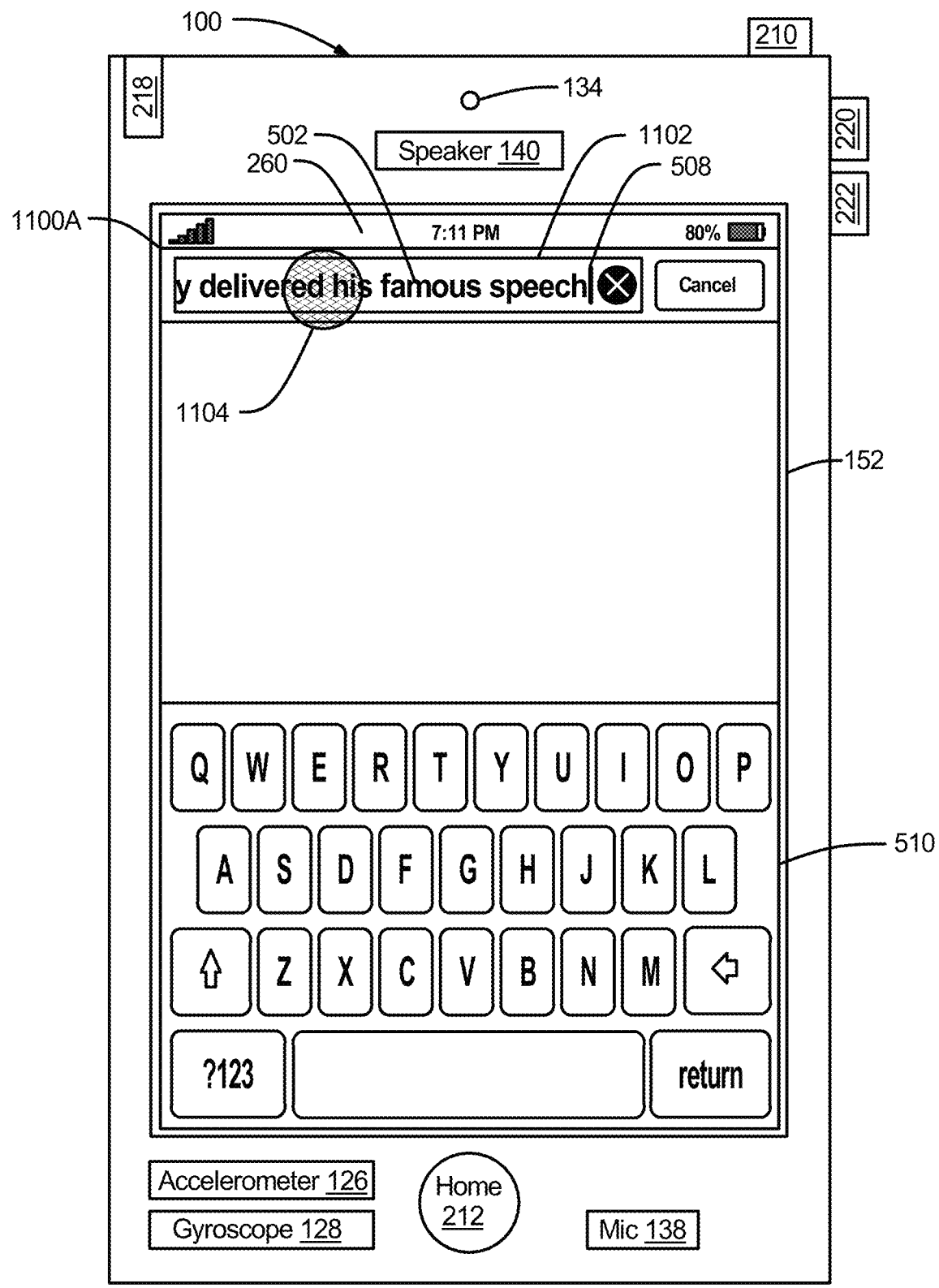
FIGS. 11A-11H illustrate an exemplary user interface for positioning a pointer and a cursor within editable content on a handheld mobile computing device with a touch-sensitive display in accordance with some embodiments when the pointer reaches a limit of travel in the horizontal direction.
Figure 11B:
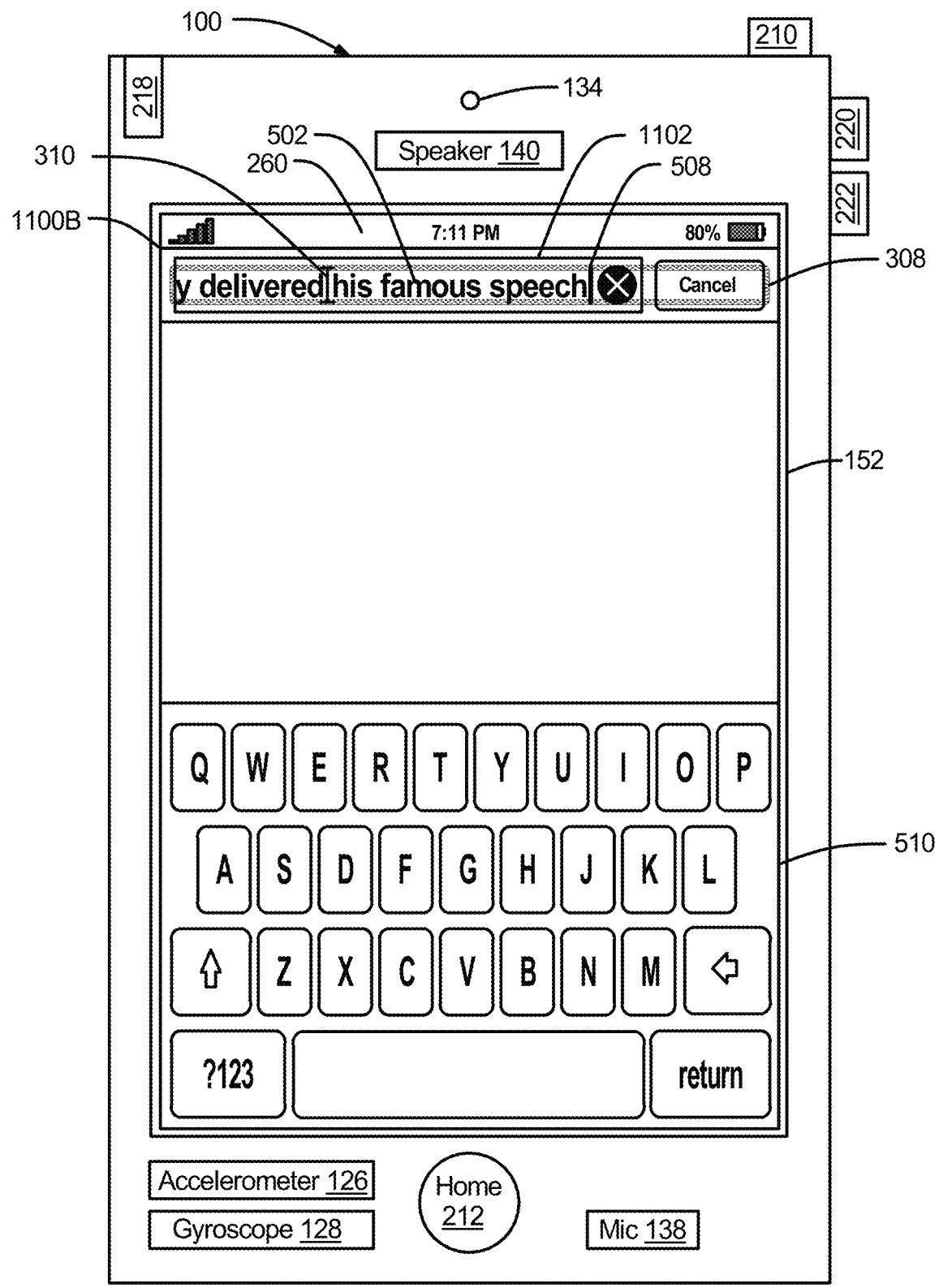
Figure 11C:
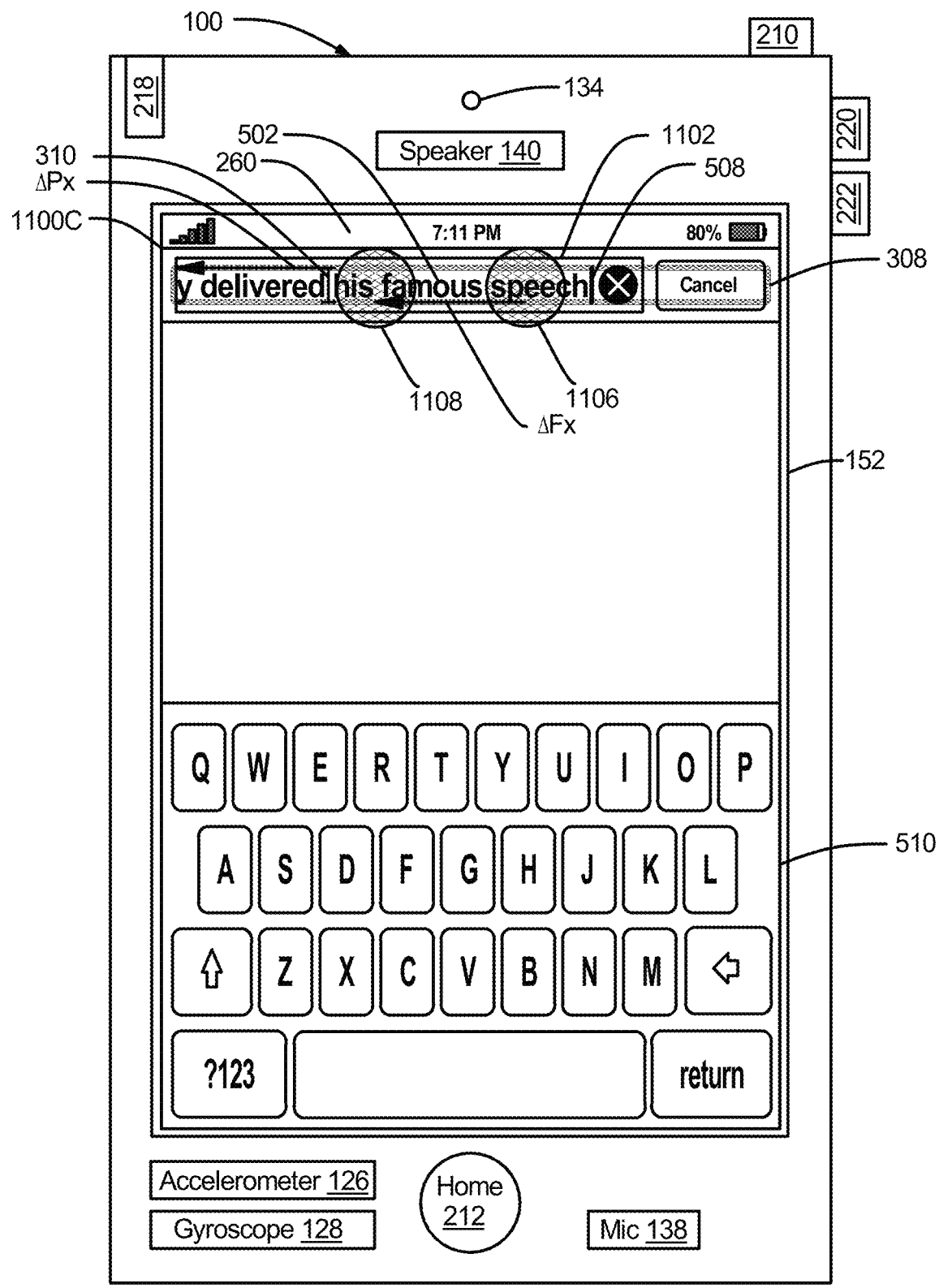
Figure 11D:
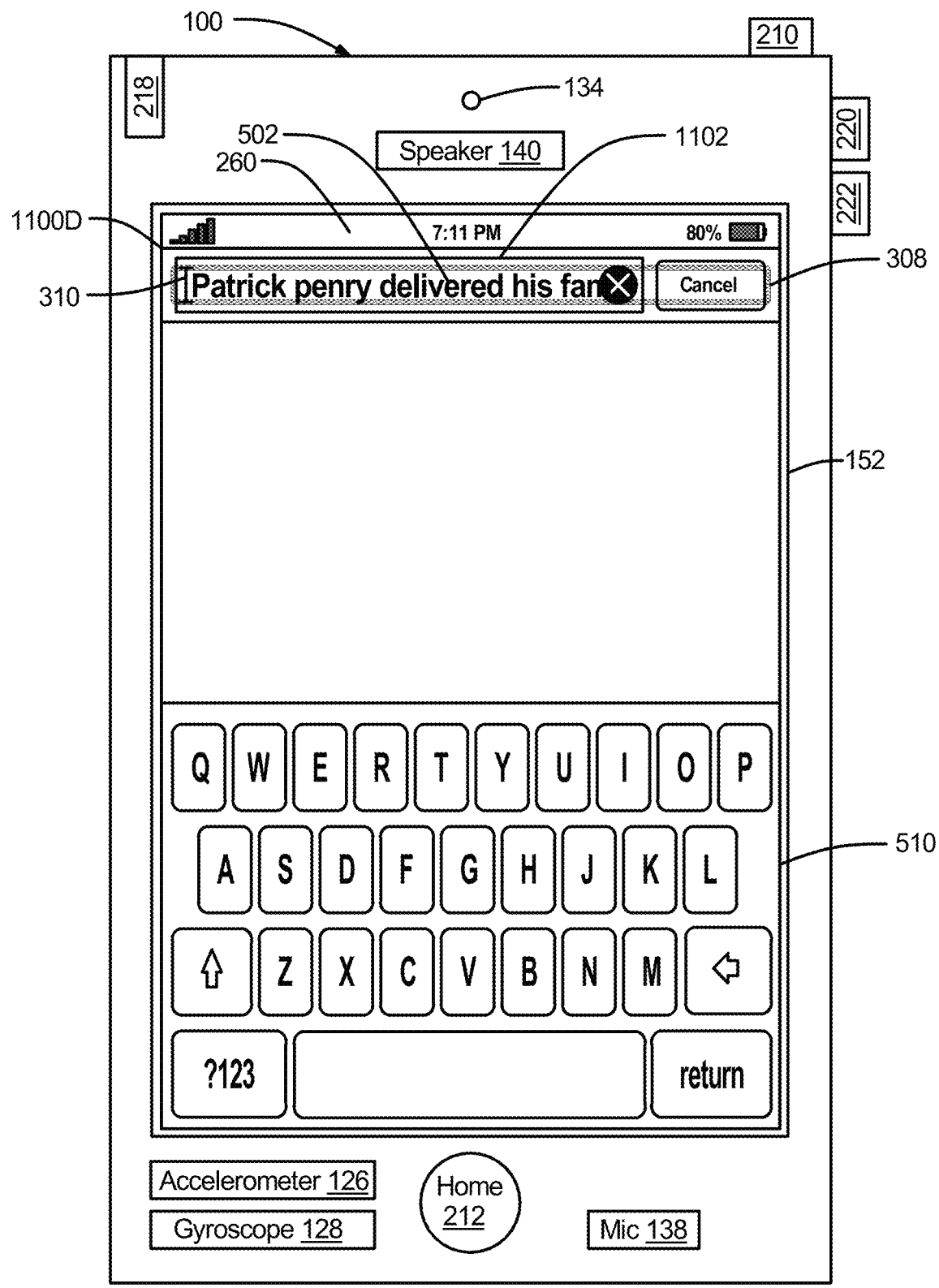
Figure 11E:
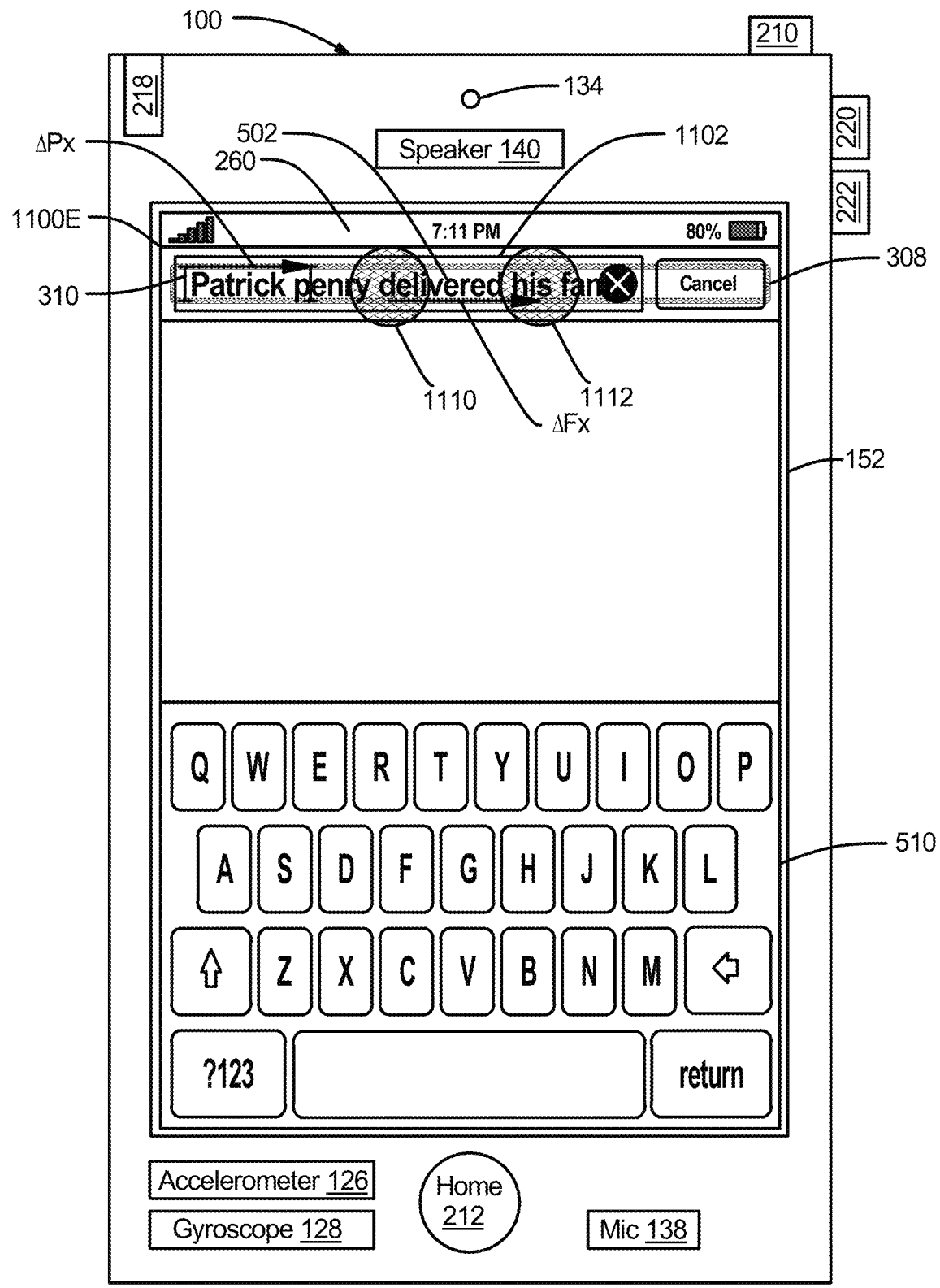
Figure 11F:
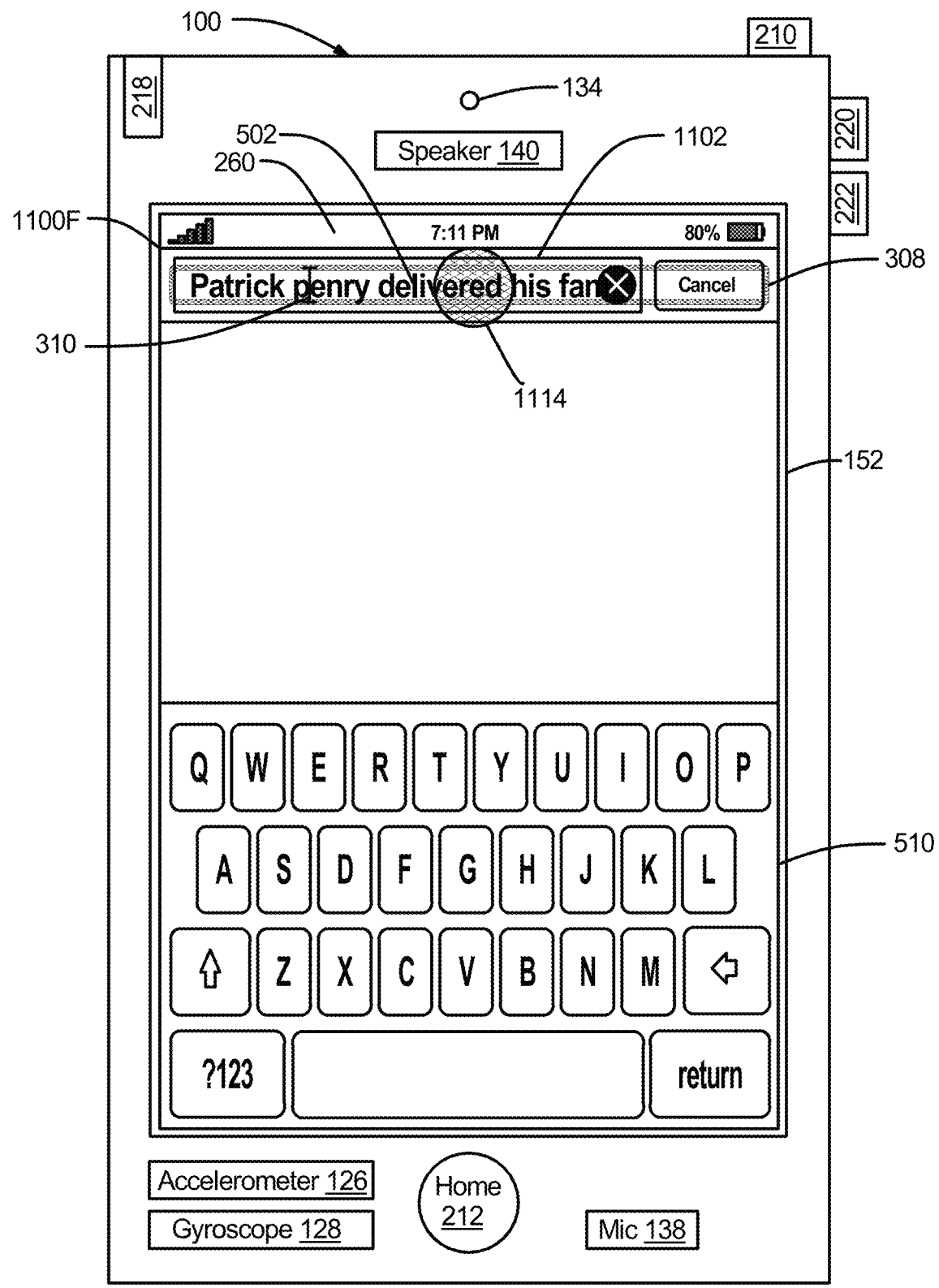
Figure 11G:
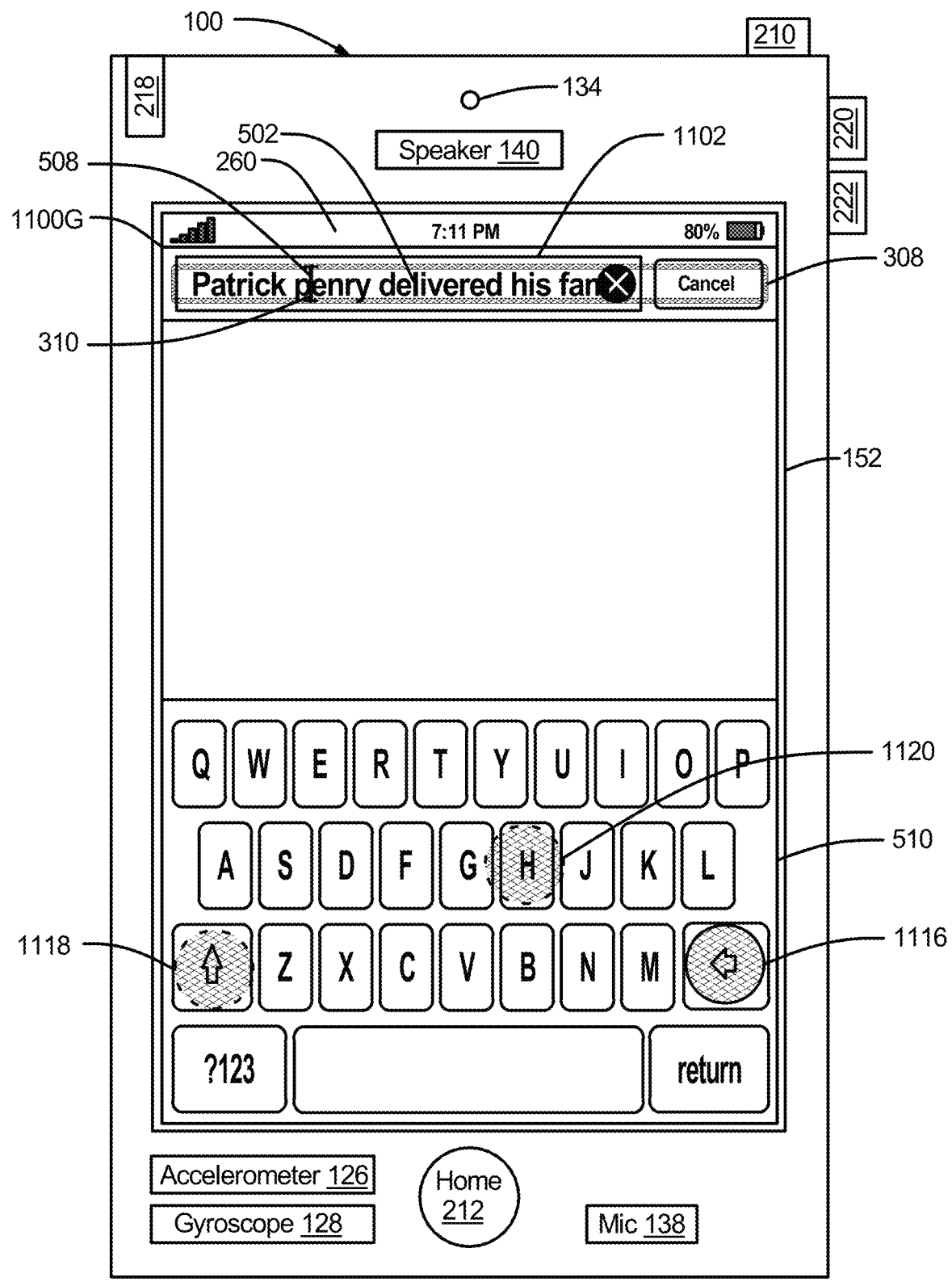
Figure 11H:
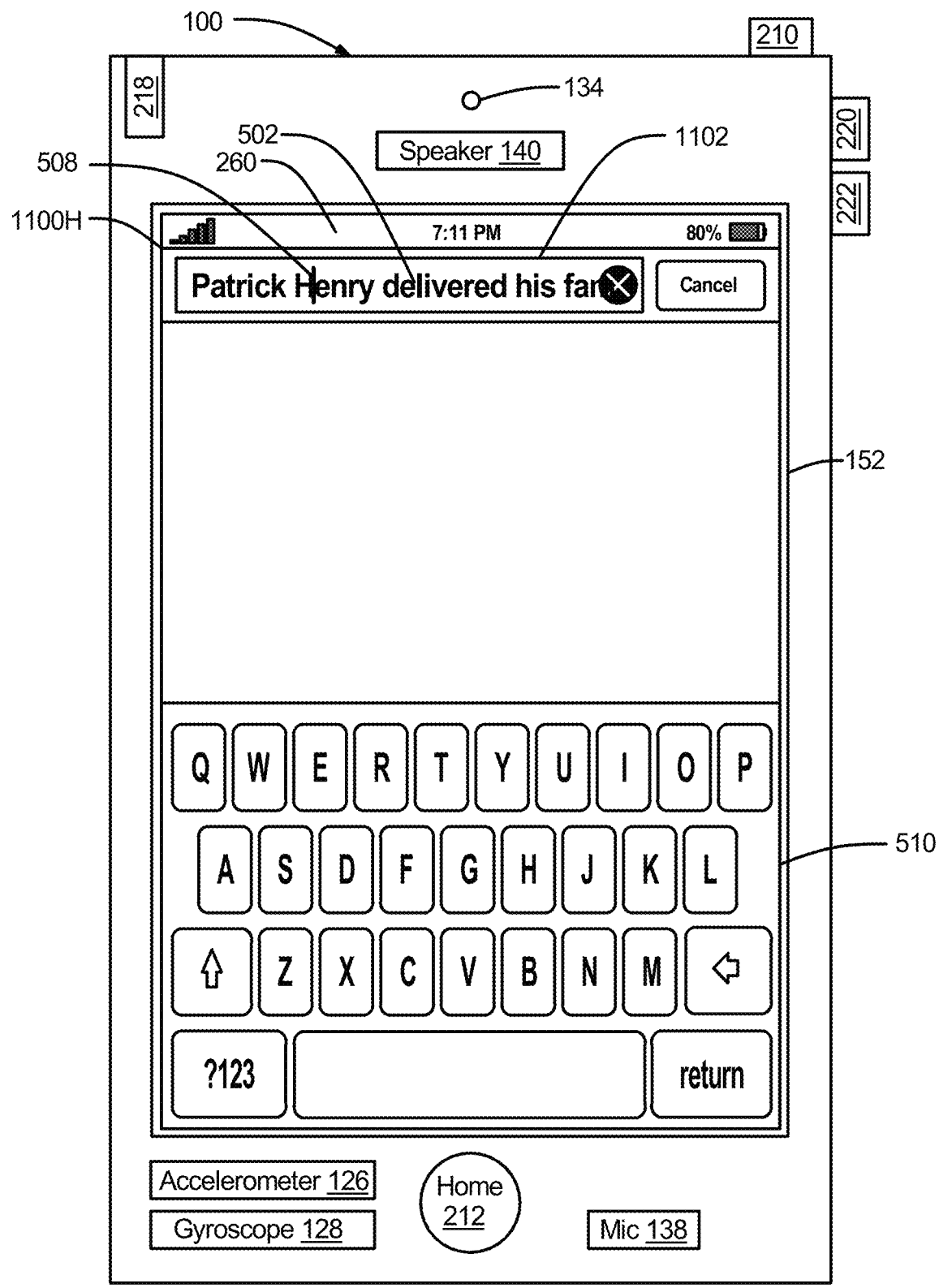

FIGS. 11A-11H illustrate an exemplary user interface for positioning a pointer within editable content on a handheld mobile computing device with a touch-sensitive display in accordance with some embodiments when the pointer reaches a limit of travel in the horizontal direction. The device displays UI 1100A (FIG. 11A) with editable content 502 in text box 1102 with cursor 508 positioned at the rightmost end of the content and soft keyboard 510 displayed below. A user may perform long-press finger gesture 1104 on the content. In response, the device displays UI 1100B (FIG. 11B) with PPC icon 308 at a first position and pointer 310 at a first position. A user may perform left-slide finger gesture 1106 to 1108 on PPC icon 308 as illustrated in FIG. 11C. As the pointer reaches its limit of travel in the horizontal direction, the content scrolls to the right, and the device displays UI 1100D (FIG. 11D) with the pointer positioned at a first position at the start of the content. A user may then perform right-slide finger gesture 1110 to 1112 on PPC icon 308 as illustrated in FIG. 11E. In response, the device moves pointer 310 from the first position at the start of editable content 502 to a second position just to the right of the letter "p" in the word "penry" as illustrated in UI 1100F (FIG. 11F). The user may then perform tap finger gesture 1114 on PPC icon 308 as illustrated in FIG. 11F. In response, the device displays UI 1100G (FIG. 11G) with cursor 508 at the position of pointer 310. A user may then correct the typo error "penry" to "Henry" by tapping backspace key 1116, shift key 1118, and "H" key 1120. Once the correction is completed, the device displays UI 1100H (FIG. 11H). In this example embodiment, we see that pointer 310 and PPC icon 308 is no longer displayed once the text entry is initiated as illustrated in FIG. 11H.

Figure 12A:
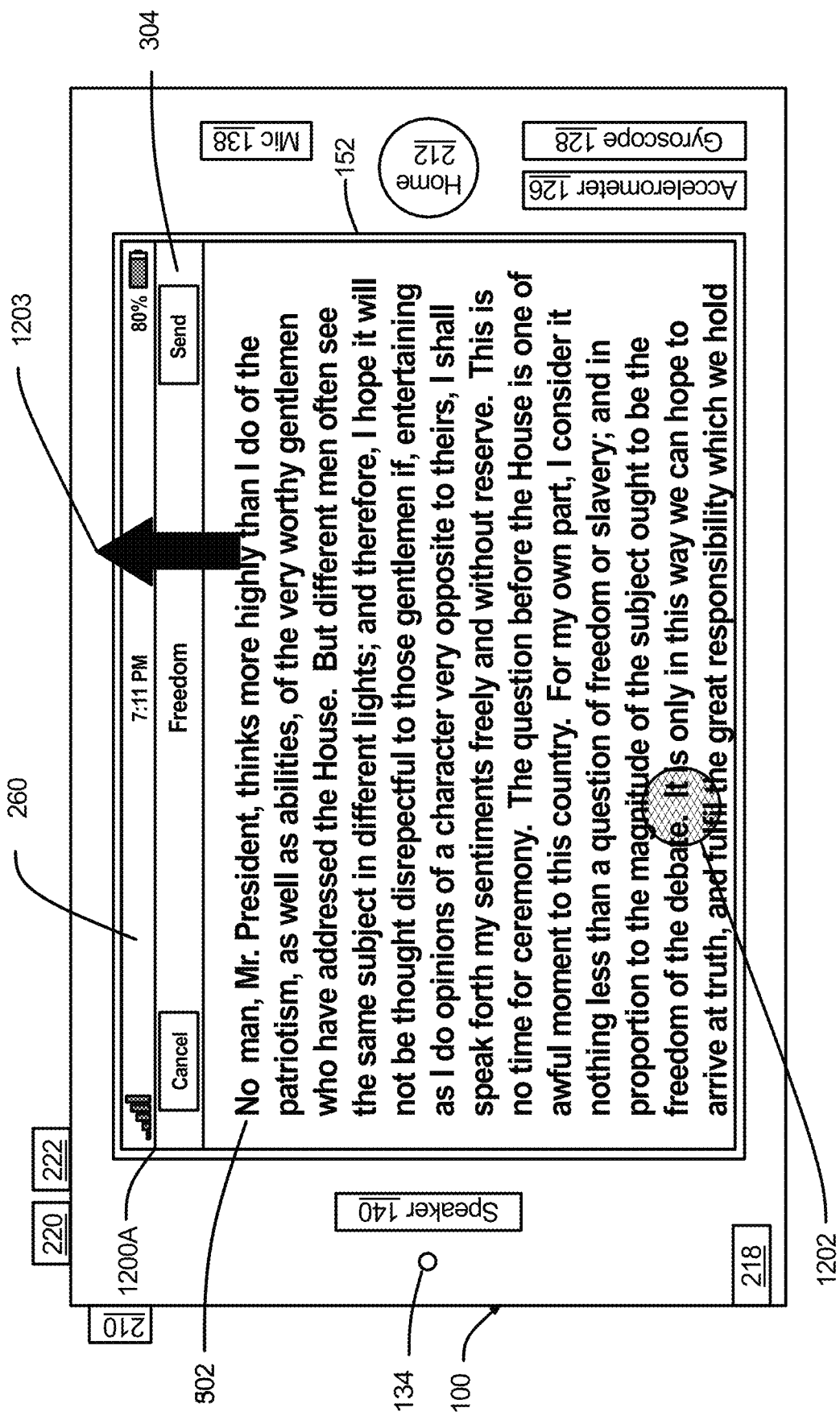
FIGS. 12A-12G illustrate an exemplary user interface for positioning a pointer and selecting within editable content on a handheld mobile computing device with a touch-sensitive display in accordance with some embodiments when the pointer reaches a limit of travel in the vertical direction.
Figure 12B:
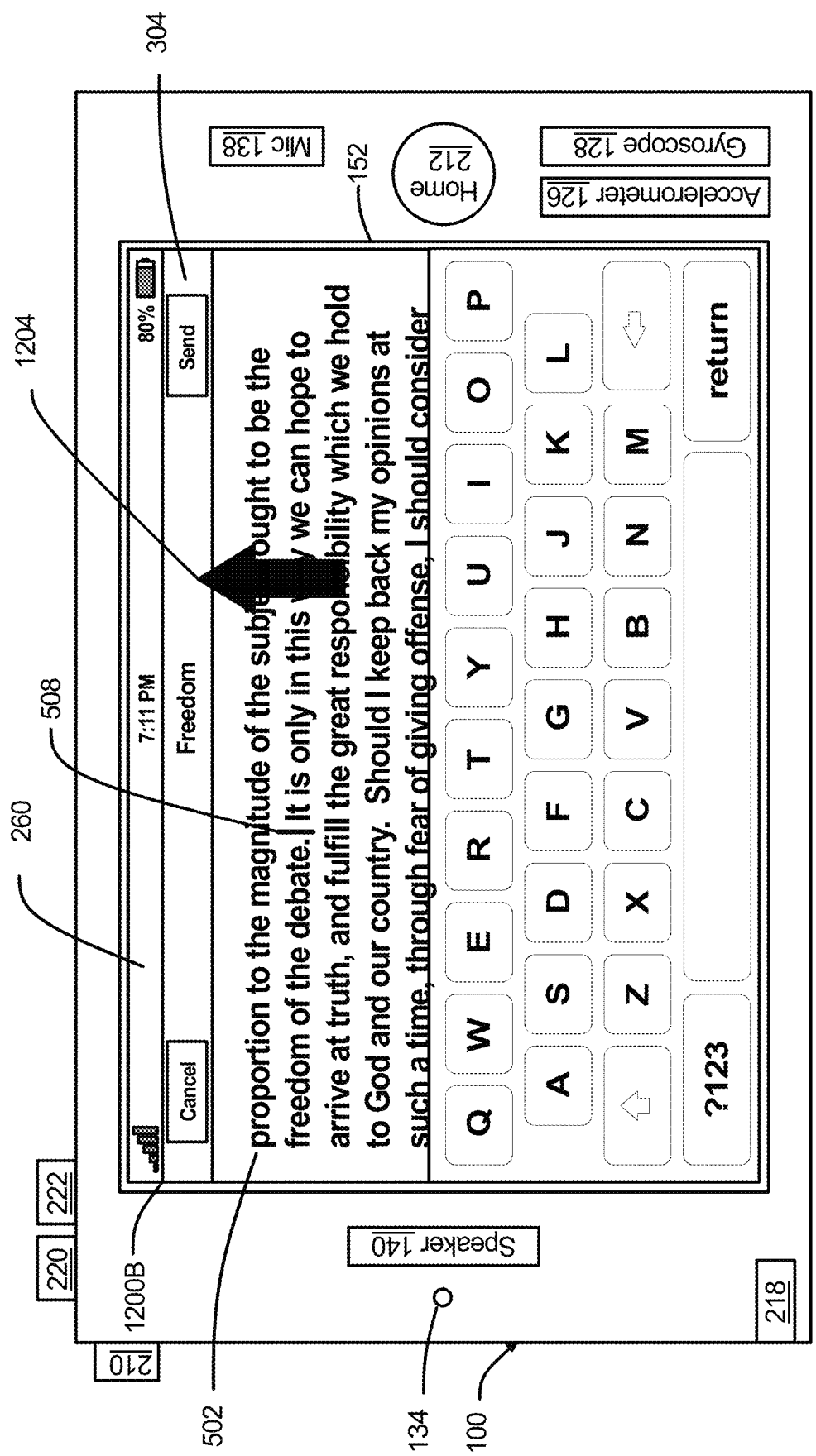
Figure 12C:
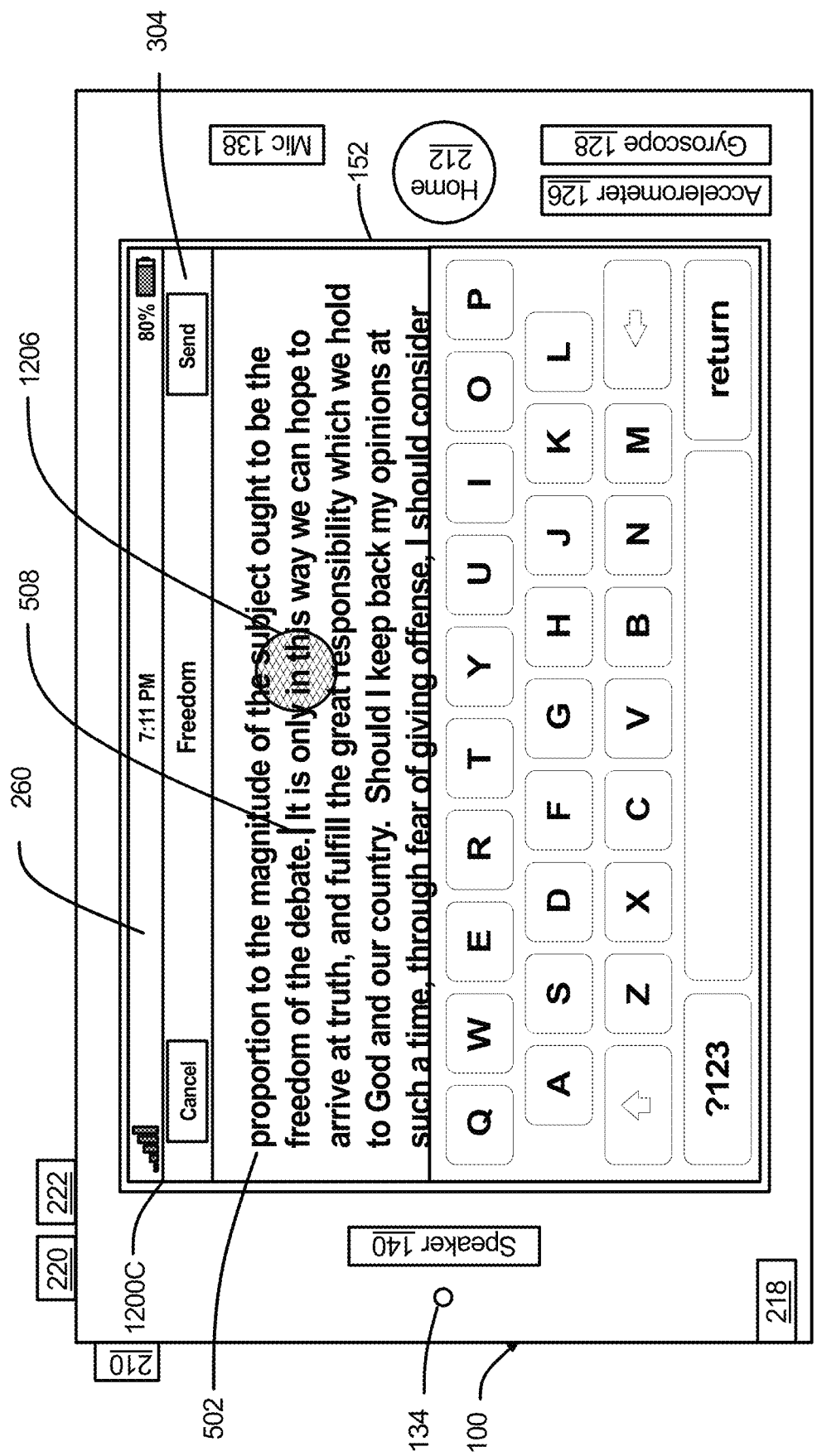
Figure 12D:
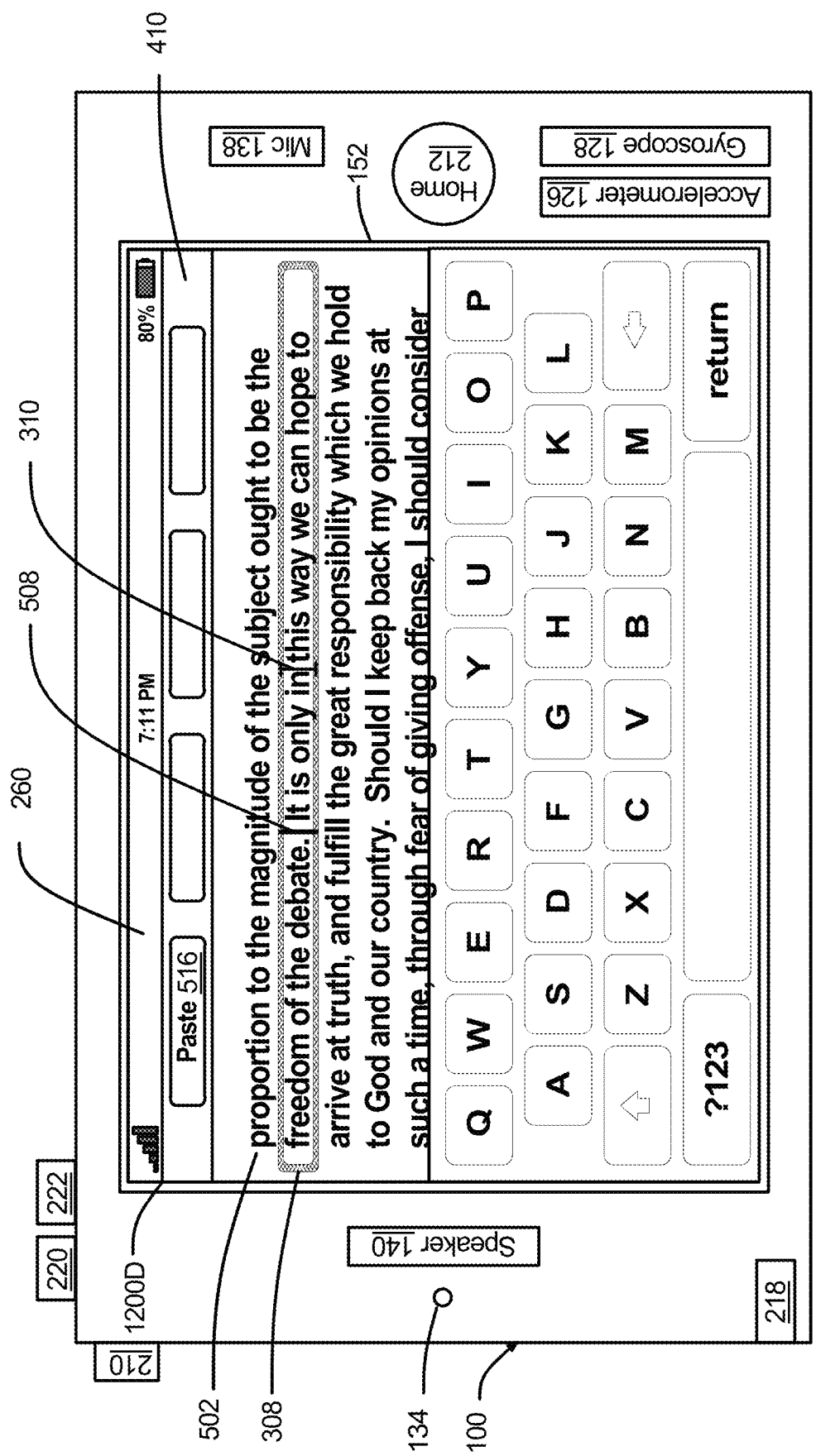
Figure 12E:
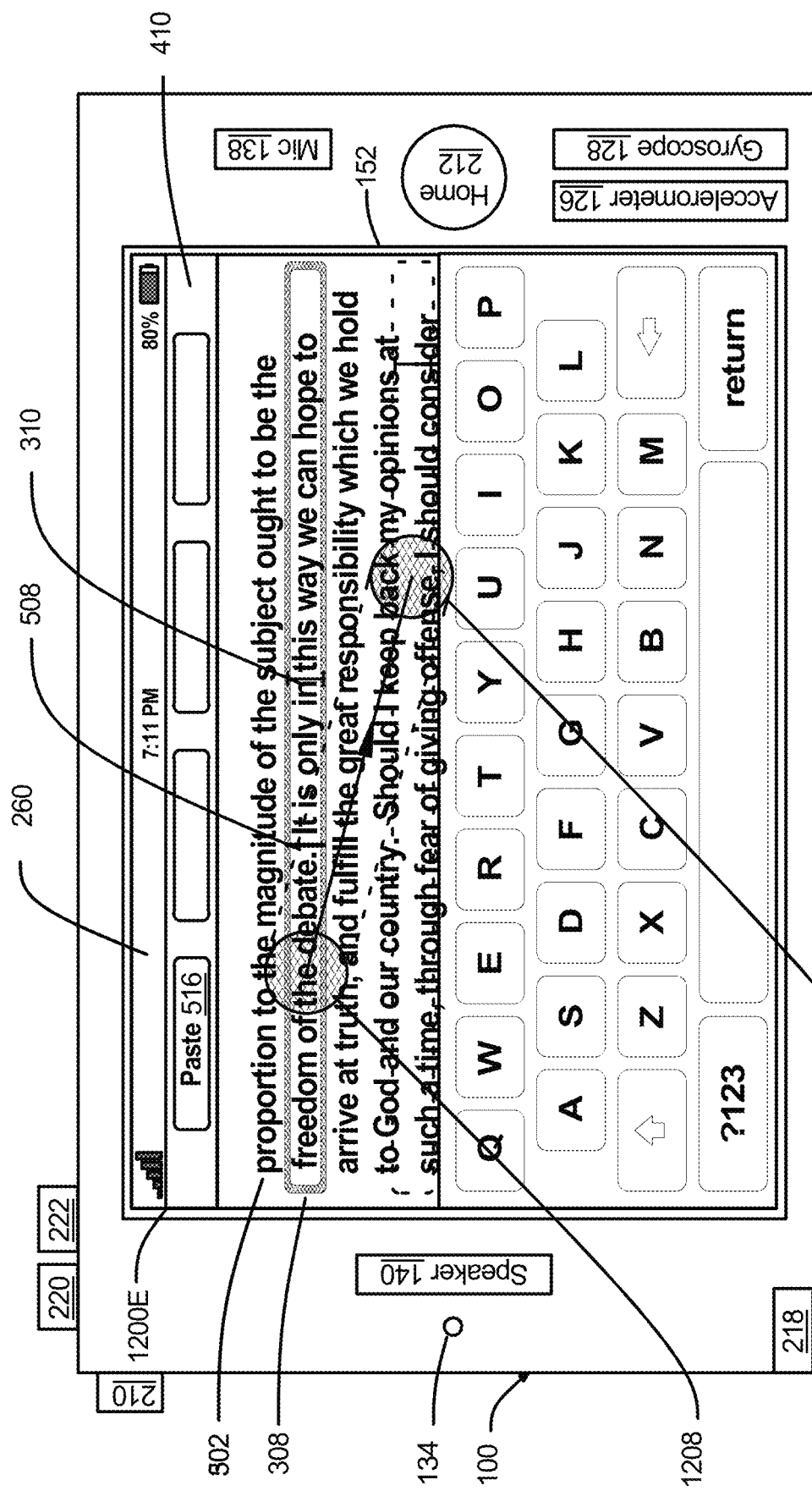
Figure 12F:
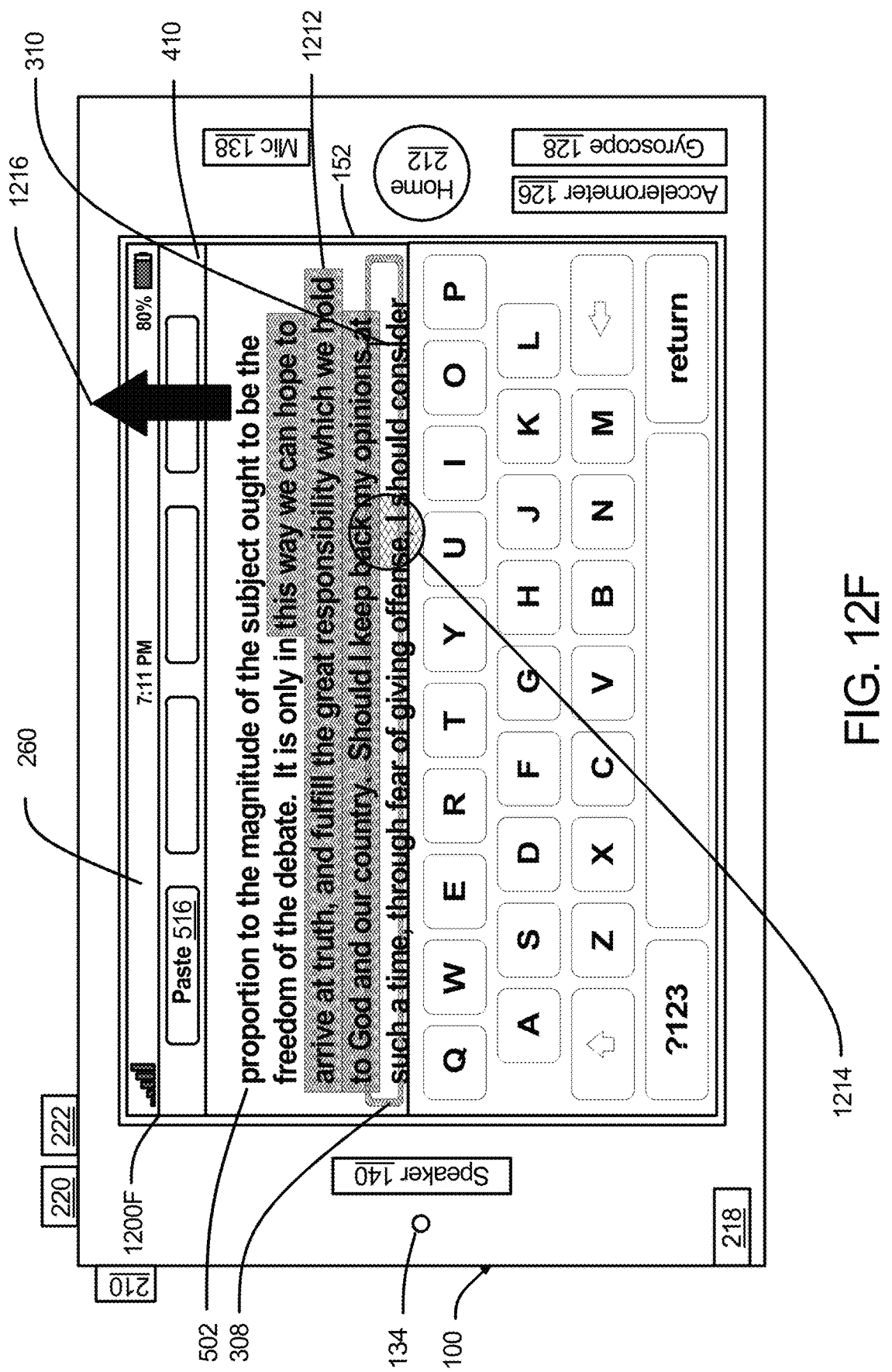
Figure 12G:
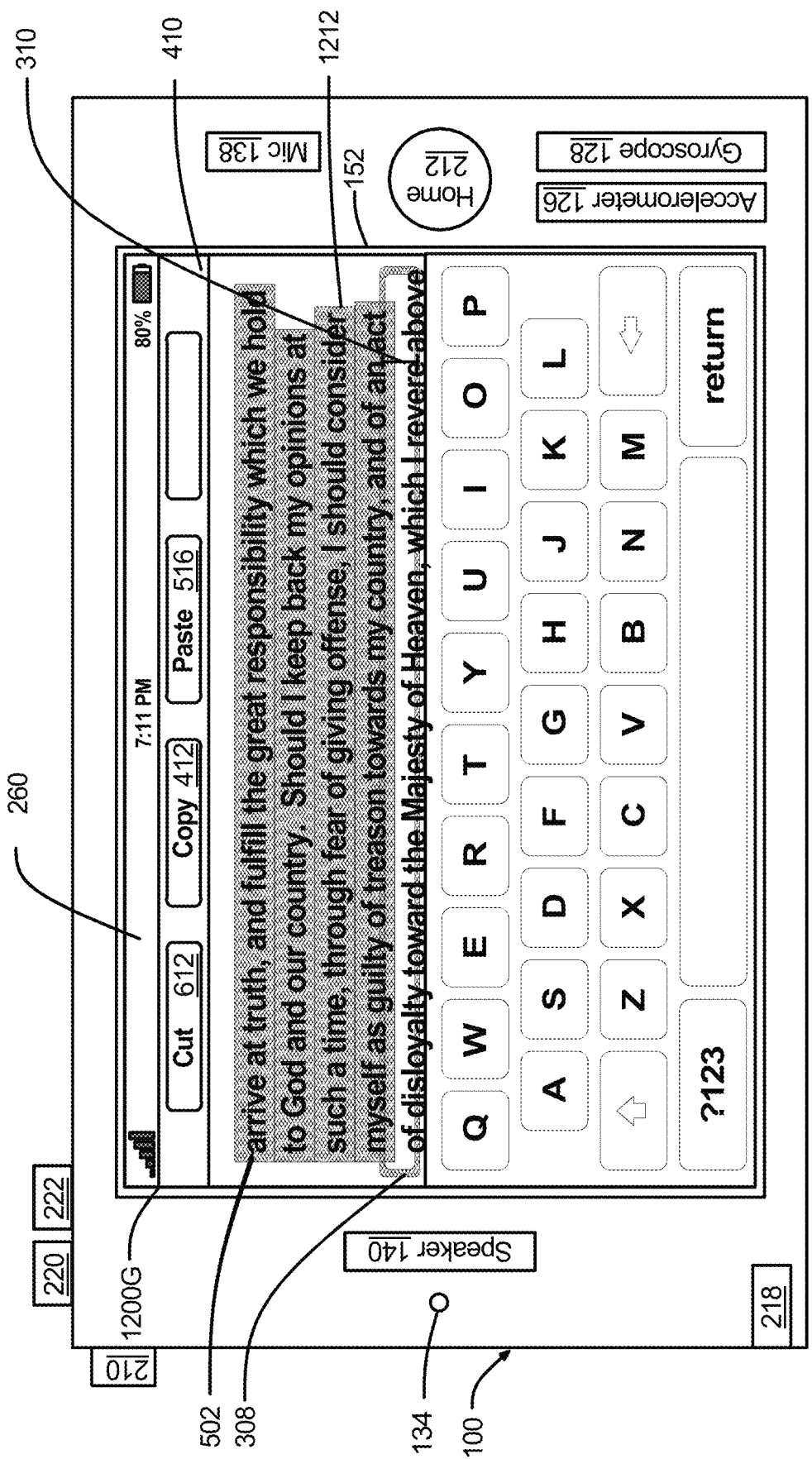

FIGS. 12A-12I illustrate an exemplary user interface for positioning a pointer and selecting within editable content on a handheld mobile computing device with a touch-sensitive display in accordance with some embodiments when the pointer reaches a limit of travel in the vertical direction. The device displays editable content 502 in UI 1200A (FIG. 12A). A user may perform tap finger gesture 1202 on editable content 502 as illustrated in FIG. 12A. In response, the device displays UI 1200B (FIG. 5B) with cursor 508 at the location of tap finger gesture 1202. The UI 1200B displays soft keyboard 510 with the content scrolled up, as indicated by scroll-up direction-arrow 1204, so that cursor 508 is not hidden by keyboard 510. A user may perform long-press finger gesture 1206 on the editable content as illustrated in UI 1200C (FIG. 12C). (In this example embodiment, and in the example embodiments illustrated in FIGS. 3-11 above, the finger gesture for launching PPC icon 308 and pointer 310 is a long-press finger gesture. In other example embodiments, a different gesture may be used.) In response, the device displays UI 1200D (FIG. 12D) with pointer positioning & control (PPC) icon 308 at a first position and pointer 310 at a first position. (In this exemplary embodiment, the pointer first position is the location of long-press finger gesture 1206. In other exemplary embodiments, the pointer may be offset to the left or to the right of the location of the finger gesture.) A user may perform tap-and-slide finger gesture 1208 to 1210 on PPC icon 308 as illustrated in FIG. 12E. In this example, the finger gesture moves pointer 310 toward a limit of travel in the vertical direction. In response, the device begins to scroll up the content as illustrated by scroll-up direction-arrow 1216 in FIG. 12F. In response, the device displays UI 1200G (FIG. 12G) with selected text 1212 displayed from a first position to a second position. In the example shown the text has scrolled up two lines. The device continues to scroll up the content, either until the user moves PPC icon 308 such that pointer 310 is no longer at its limit in vertical travel, or until the page has scrolled to the end of the content.

Figure 13A:
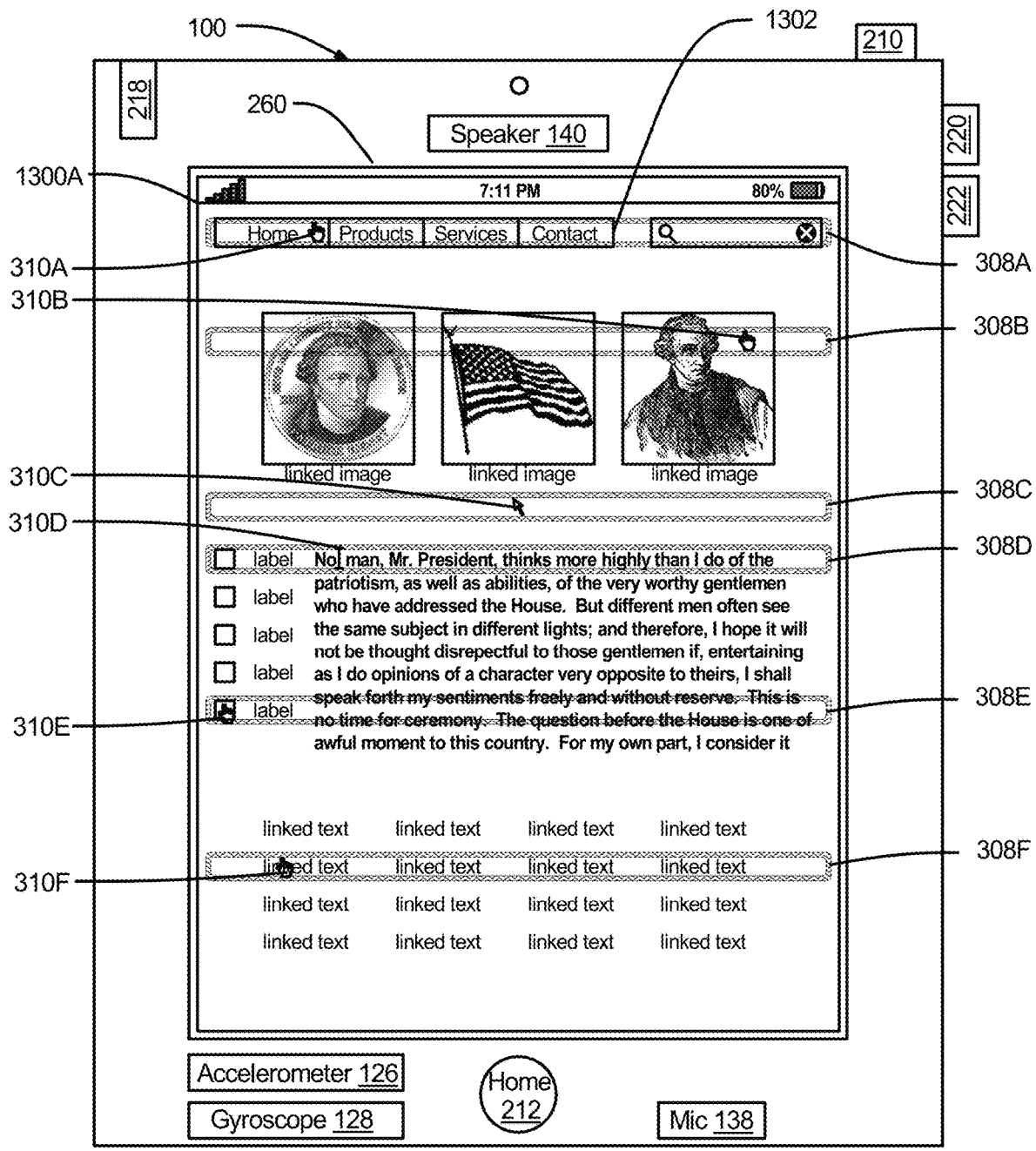
FIG. 13A illustrates an exemplary user interface for positioning a pointer within mixed read-only content on a handheld mobile computing device with a touch-sensitive display in accordance with some embodiments showing change in pointer type with change in content type.

FIG. 13A illustrates an exemplary user interface for positioning a pointer within mixed read-only content on a handheld mobile computing device with a touch-sensitive display in accordance with some embodiments showing change in pointer type with change in content type. FIG. 13A illustrates a device displaying tool icons and mixed read-only content in UI 1300A. The example UI includes web-site navigation bar 1302 with icons labeled "Home", "Products", "Services", and "Contact" linked to content. The UI includes images linked to content, text content, icons linked to content, and text linked to content. In this example, we show how the device changes the pointer type as the user positions the pointer over different types of read-only content. The UI shows PPC icon 308A with pointer 310A positioned over the icon "Home" which is linked to content. In response, the device displays pointer 310A as a "hand" pointer. The UI shows PPC icon 308B with pointer 310B positioned over the image of Patrick Henry that is linked to content. In response, the device displays pointer 310B as a "hand" pointer. The UI shows PPC icon 308C with pointer 310C positioned on the page but not on content. In response, the device displays pointer 310C as an "arrow" pointer. The UI shows PPC icon 308D with pointer 310D positioned on text content. In response, the device displays pointer 310D as a "text" pointer. The UI shows PPC icon 308E with pointer 310E positioned over a small square check box icon linked to content. In response, the device displays pointer 310E as a "hand" pointer. Finally, the UI shows PPC icon 308F with pointer 310F positioned over text linked to content as is often present at the bottom of a web page. In response, the device displays pointer 310F as a "hand" pointer.

Figure 13B:
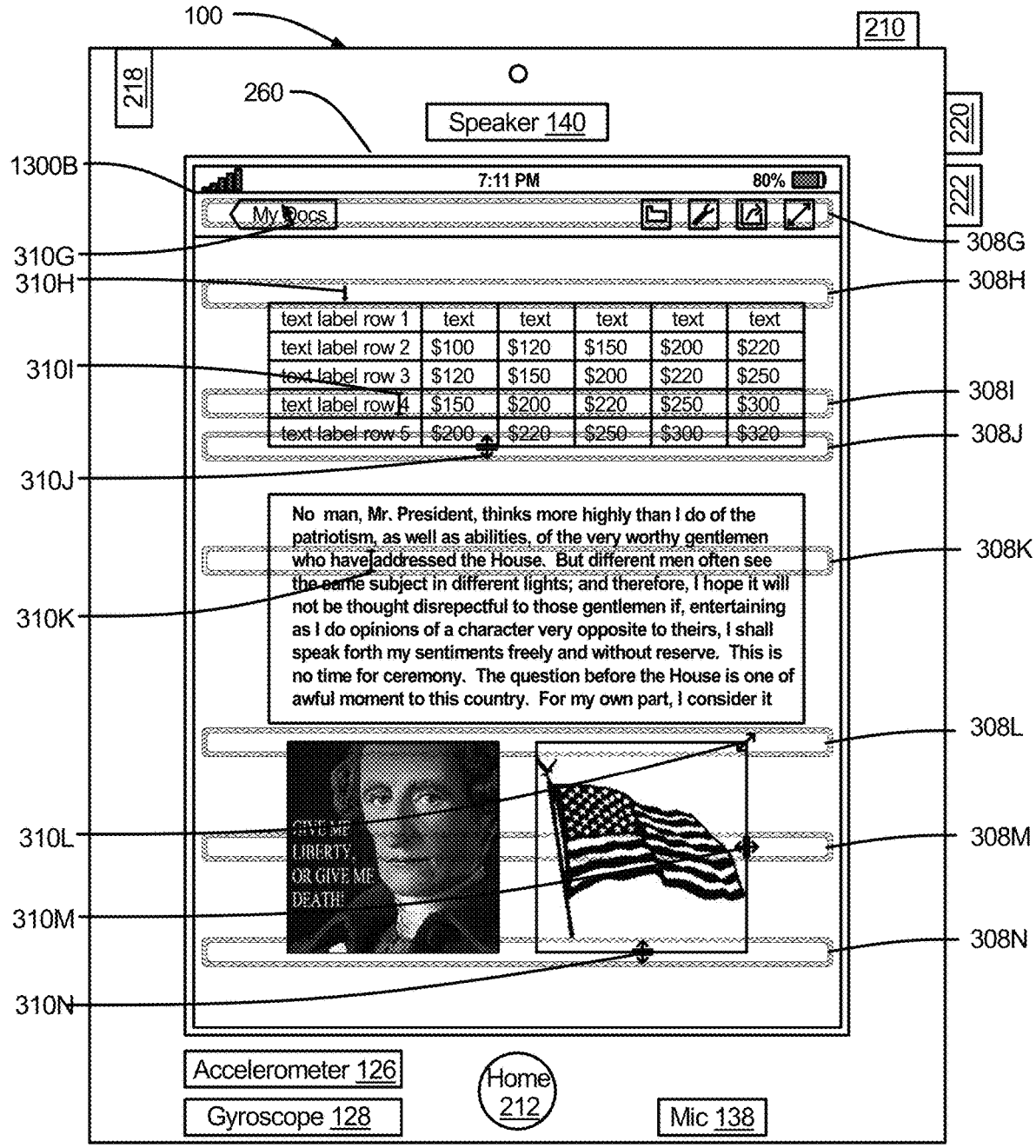
FIG. 13B illustrates an exemplary user interface for positioning a pointer within mixed editable content on a handheld mobile computing device with a touch-sensitive display in accordance with some embodiments showing change in pointer type with change in content type.

FIG. 13B illustrates an exemplary user interface for positioning a pointer within mixed editable content on a handheld mobile computing device with a touch-sensitive display in accordance with some embodiments showing change in pointer type with change in content type.

FIG. 13B shows a device displaying tool icons, navigation icons, and mixed editable content in UI 1300B. The example UI includes a toolbar with a "My Docs" navigation icon, a table, a text passage, and two editable images. In this example, we show how the device changes the pointer type as the user positions the pointer over different types of editable content. The UI shows PPC icon 308G with pointer 310G positioned over the "My Docs" navigation icon. In response, the device displays pointer 310G as an "arrow" pointer. The UI shows PPC icon 308H with pointer 310H positioned above the first column of the table. In response, the device displays pointer 310G as a "down arrow" pointer. The UI shows PPC icon 308I with pointer 310I positioned over text within the table. In response, the device displays pointer 310I as a "text" pointer. The UI shows PPC icon 308J with pointer 310J positioned over the bottom border of the table. In response the device displays pointer 310J as horizontal "edge drag" pointer to enable the user to drag the table border. The UI shows PPC icon 308K with pointer 310K positioned over text within the text passage. In response, the device displays pointer 310K as a "text" pointer. The UI shows PPC icon 308L with pointer 310L positioned at the top right corner of the editable image. In response, the device displays pointer 310L as "diagonal corner drag" pointer. The UI shows PPC icon 308M with pointer 310M positioned at the right edge of the editable image. In response, the device displays pointer 310M as "vertical edge drag" pointer. The UI shows PPC icon 308N with pointer 310N positioned at the bottom edge of the editable image. In response, the device displays pointer 310N as "horizontal edge drag" pointer.

Figure 13C:
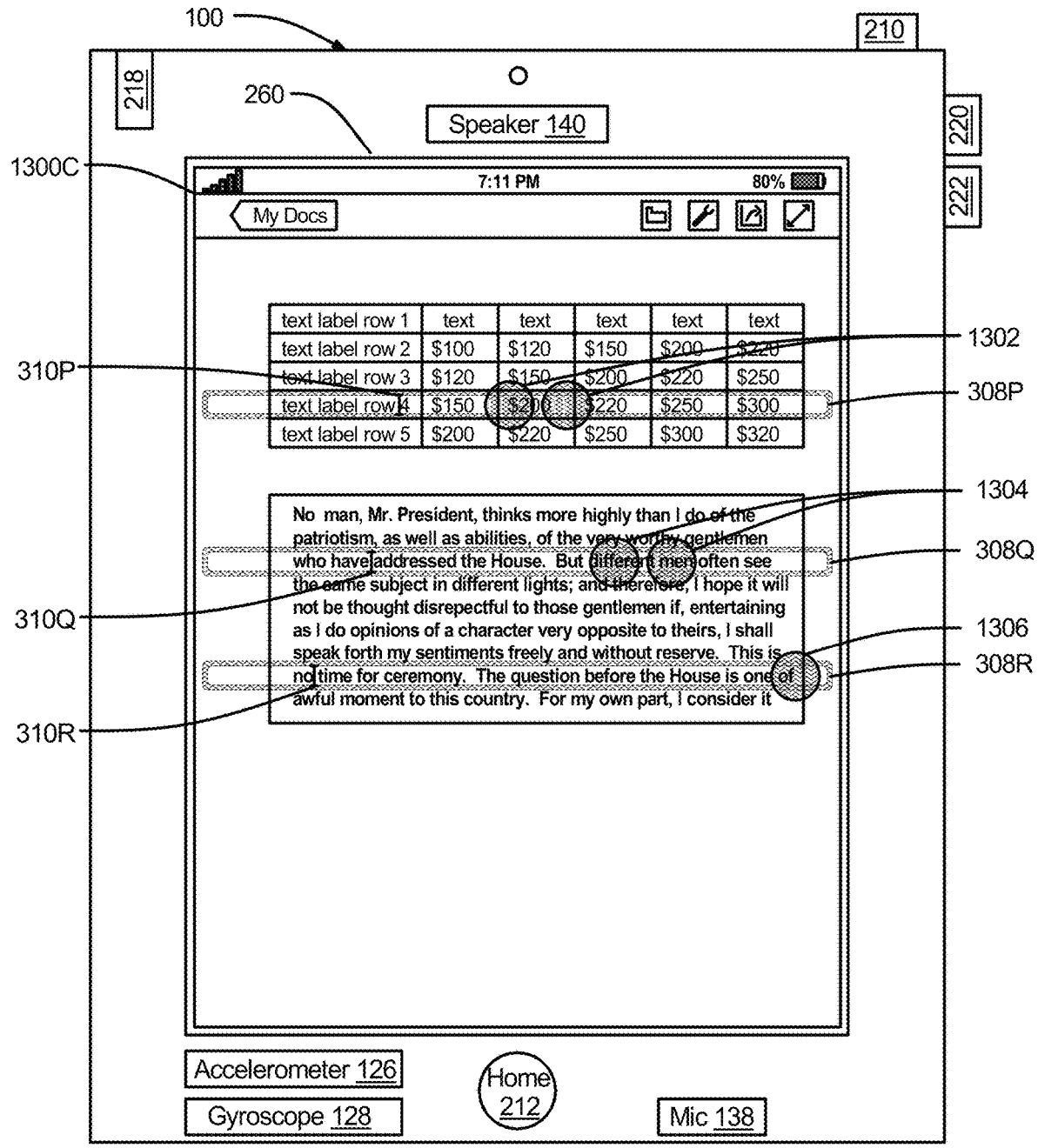
FIGS. 13C-13E illustrates an exemplary user interface and exemplary finger gestures for performing a "secondary click" finger gesture within mixed editable content on a handheld mobile computing device with a touch-sensitive display in accordance with some embodiments.
Figure 13D:
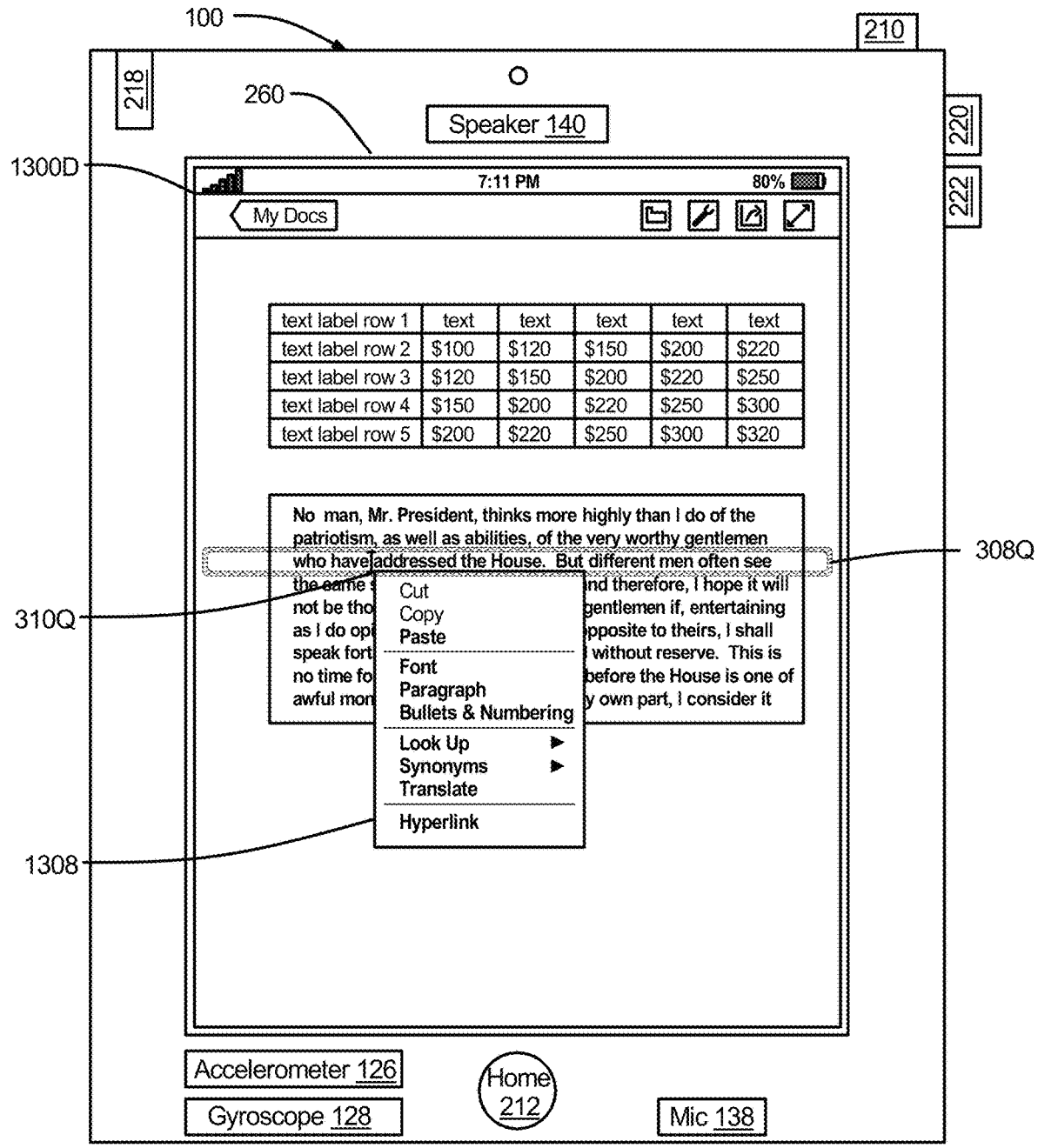
Figure 13E:
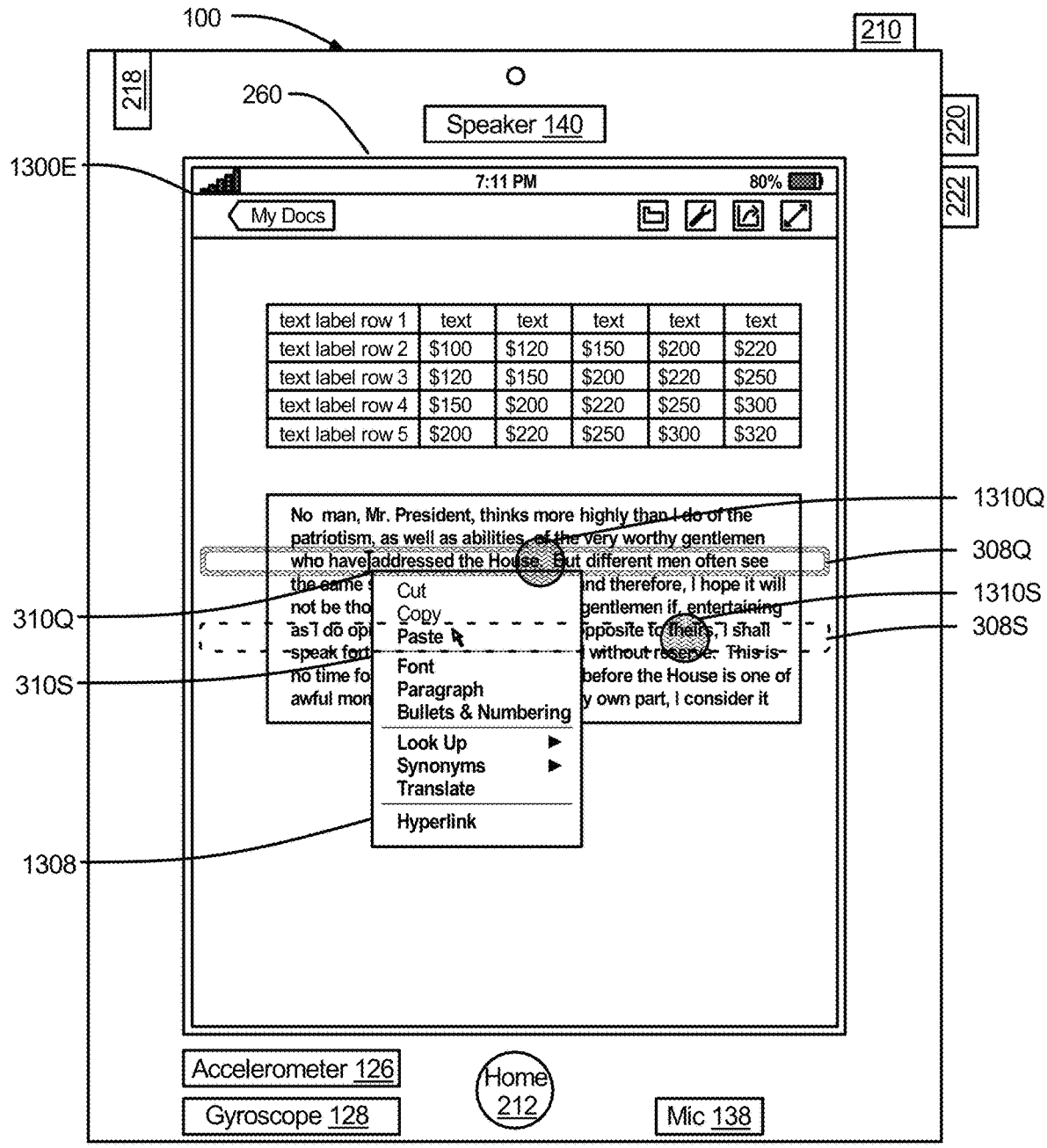

FIGS. 13C-13E illustrates an exemplary user interface and exemplary finger gestures for performing a "secondary-click" finger gesture within mixed editable content on a handheld mobile computing device with a touch-sensitive display in accordance with some embodiments. FIG. 13C shows an exemplary user interface for performing a "secondary-click" finger gesture within mixed editable content. In one embodiment, the secondary-click finger gesture may be defined to be a two-finger-tap finger gesture on PPC icon 308. This is illustrated in UI 1300C (FIG. 13C) by two-finger-tap finger gesture 1302 and two-finger-tap finger gesture 1304. In another embodiment, the secondary click may be defined to be a one-finger-tap finger gesture on PPC icon 308 near the right end of the PPC icon. This is illustrated in FIG. 13C by one-finger-tap finger gesture 1306.

A user may, for example, perform two-finger-tap finger gesture 1304 on PPC icon 308Q within the text passage. In response, the device will display UI 1300D (FIG. 13D) with secondary-click menu 1308 at the location of pointer 310Q as illustrated in FIG. 13D. A user may then perform slide finger gesture 1310Q to 1310S on PPB icon 308Q to move the pointer to select the item labeled "Paste" shown in secondary-click menu 1308. The device changes the pointer type from "text" pointer 310Q to "arrow" pointer 310S as the pointer is moved from a position over text to a position over secondary-click menu 1308 as illustrated in UI 1300E (FIG. 13E).

Figure 14:
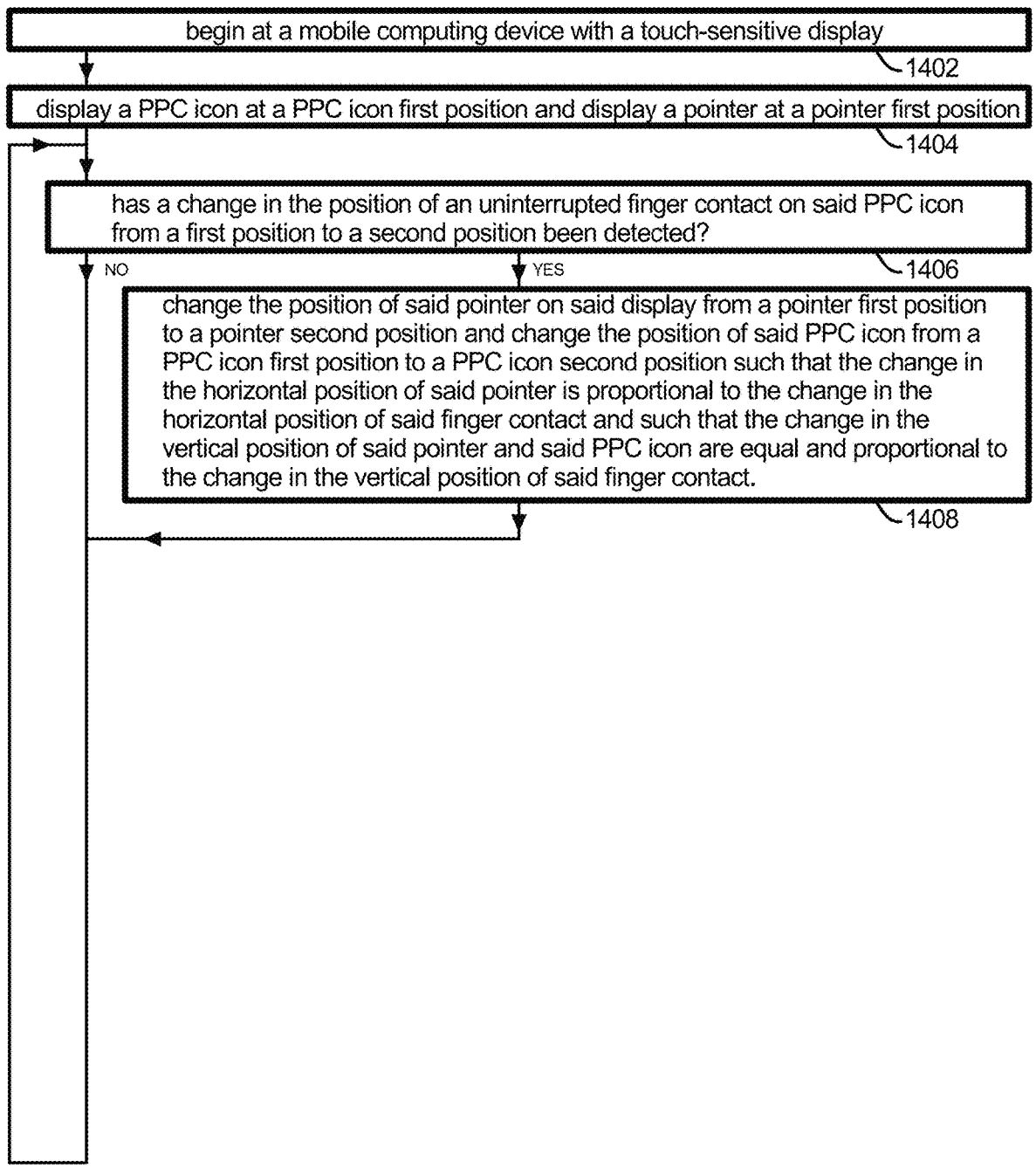
FIG. 14 is a flow diagram illustrating a process for positioning a pointer on a handheld mobile computing device with a touch-sensitive display in accordance with some embodiments.

Method Flow Diagrams:

FIG. 14 is a flow diagram illustrating a process for positioning a pointer on a handheld mobile computing device with a touch-sensitive display in accordance with some embodiments. FIGS. 3A-3J, FIGS. 4A-4H, FIGS. 5A-5G, FIGS. 6A-6F, FIGS. 7A-7E, FIGS. 8A-8H, FIGS. 9A-9D, FIGS. 10A-10D, FIGS. 10E-10I, FIGS. 11A-11H, FIGS. 12A-12G, FIG. 13A, and FIGS. 13B-13E illustrate exemplary user interfaces for use in implementing the methods presented in the flow diagram shown in FIG. 14.

Figure 15:
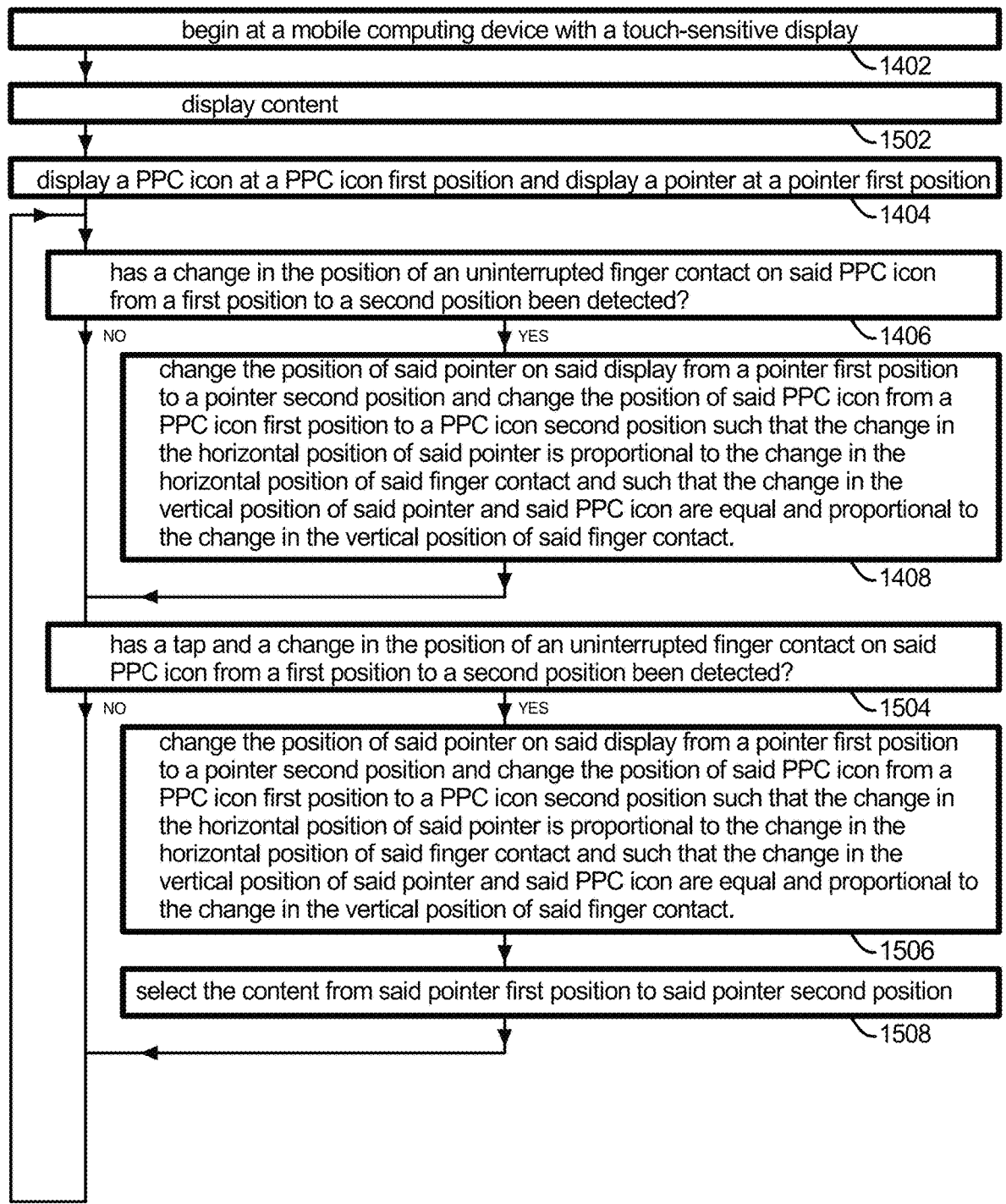
FIG. 15 is a flow diagram illustrating a process for positioning a pointer and selecting content on a handheld mobile computing device with a touch-sensitive display in accordance with some embodiments.

FIG. 15 is a flow diagram illustrating a process for positioning a pointer and selecting content on a handheld mobile computing device with a touch-sensitive display in accordance with some embodiments. FIGS. 3A-3J, FIGS. 4A-4H, FIGS. 5A-5G, FIGS. 6A-6F, FIGS. 7A-7E, FIGS. 8A-8H, FIGS. 9A-9D, FIGS. 10A-10D, FIGS. 10E-10I, FIGS. 11A-11H, FIGS. 12A-12G, FIG. 13A, and FIGS. 13B-13E illustrate exemplary user interfaces for use in implementing the methods presented in the flow diagram shown in FIG. 15.

Figure 16:
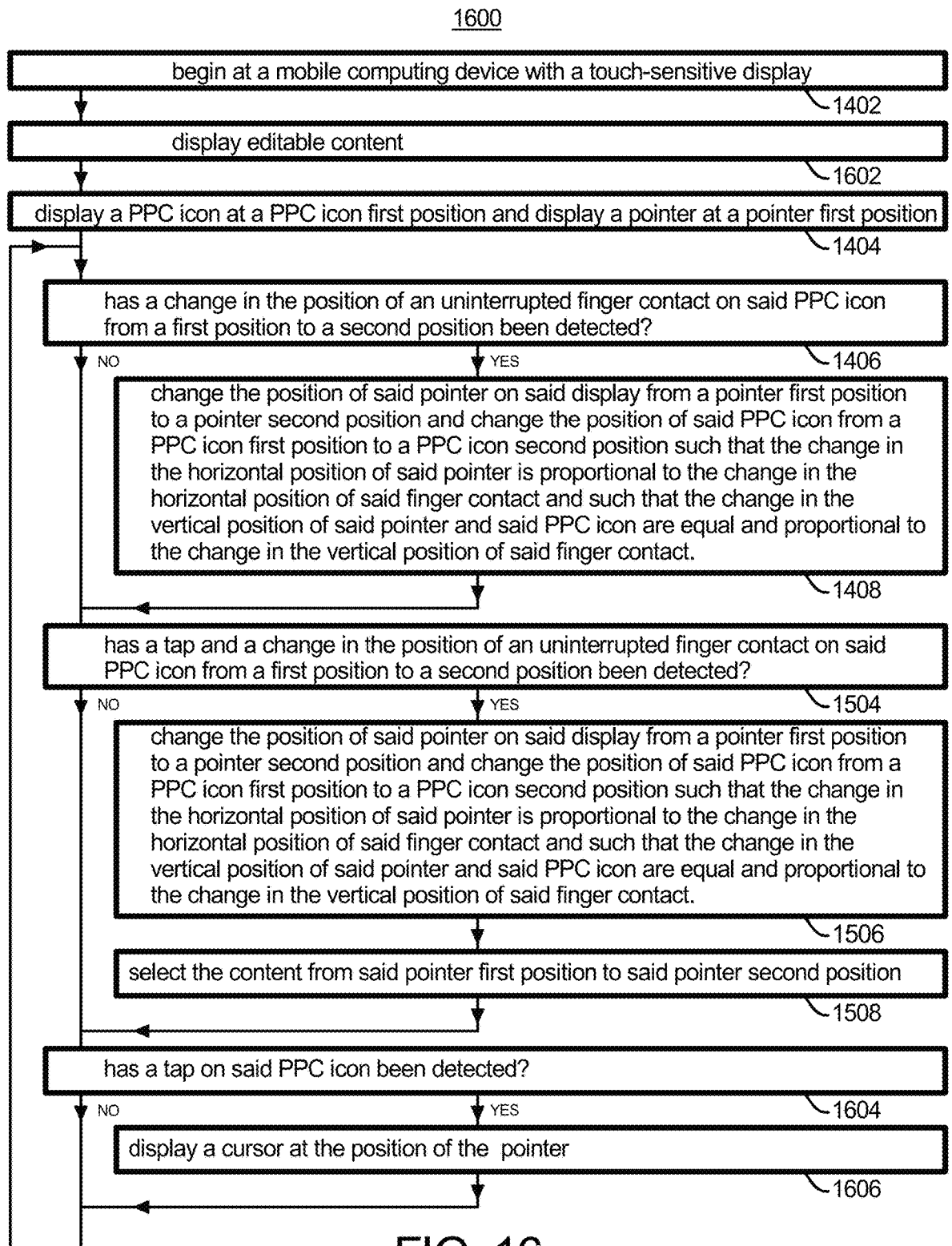
FIG. 16 is a flow diagram illustrating a process for positioning a pointer, selecting content, and positioning a cursor within editable content on a handheld mobile computing device with a touch-sensitive display in accordance with some embodiments.

FIG. 16 is a flow diagram illustrating a process for positioning a pointer, selecting content, and positioning a cursor within editable content on a handheld mobile computing device with a touch-sensitive display in accordance with some embodiments. FIGS. 5A-5G, FIGS. 6A-6F, FIGS. 10E-10I, FIGS. 11A-11H, FIGS. 12A-12G, and FIGS. 13B-13E illustrate exemplary user interfaces for use in implementing the methods presented in the flow diagram shown in FIG. 16.

Figure 17:
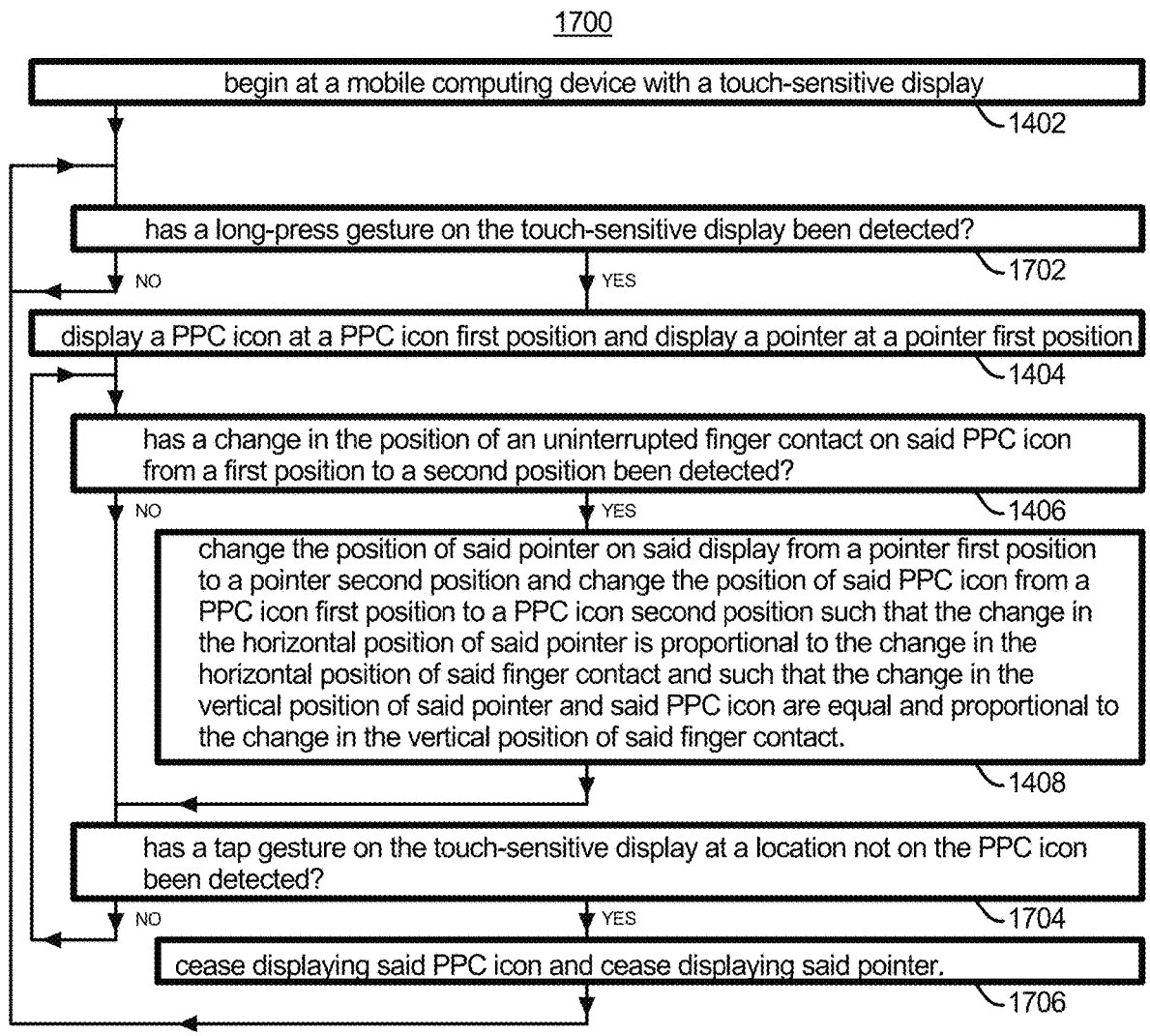
FIG. 17 is a flow diagram illustrating a process for using a finger gesture to display a pointer positioning & control icon for use in positioning a pointer on a handheld mobile computing device with a touch-sensitive display in accordance with some embodiments.

FIG. 17 is a flow diagram illustrating a process for using a finger gesture to display a pointer positioning & control icon for use in positioning a pointer on a handheld mobile computing device with a touch-sensitive display in accordance with some embodiments. FIGS. 3A-3J, FIGS. 4A-4H, FIGS. 5A-5G, FIGS. 6A-6F, FIGS. 7A-7E, FIGS. 8A-8H, FIGS. 9A-9D, FIGS. 10A-10D, FIGS. 10E-10I, FIGS. 11A-11H, FIGS. 12A-12G, FIG. 13A, and FIGS. 13B-13E illustrate exemplary user interfaces for use in implementing the methods presented in the flow diagram shown in FIG. 17.

Figure 18:
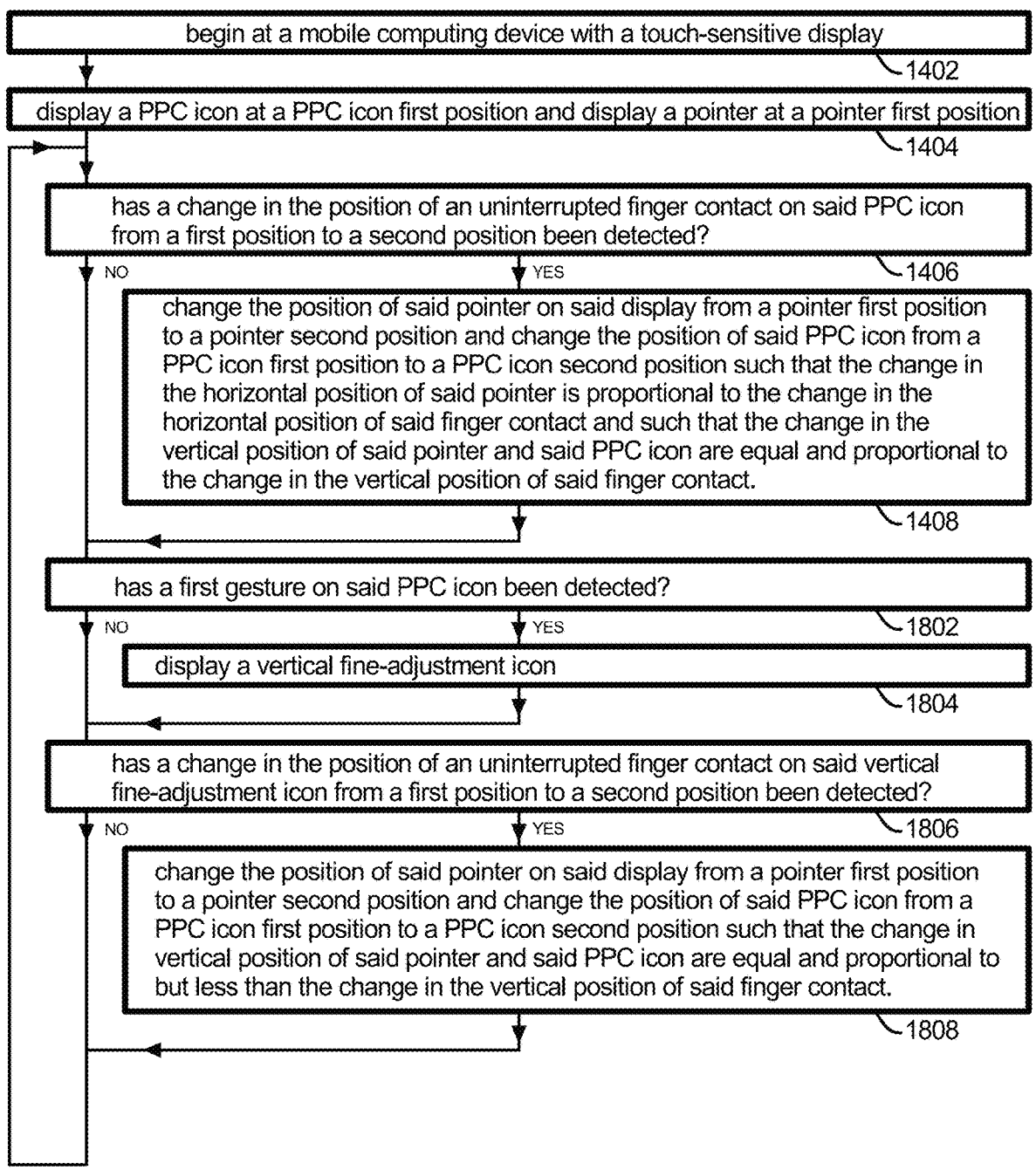
FIG. 18 is a flow diagram illustrating a process for using a finger gesture to display a vertical fine-adjustment icon for use in positioning a pointer on a handheld mobile computing device with a touch-sensitive display in accordance with some embodiments.

FIG. 18 is a flow diagram illustrating a process for using a finger gesture to display a vertical fine-adjustment icon for use in positioning a pointer on a handheld mobile computing device with a touch-sensitive display in accordance with some embodiments. FIGS. 8A-8H illustrate exemplary user interfaces for use in implementing the methods presented in the flow diagram shown in FIG. 18.

Alternative Gestures

The methods and UI may include the use of alternative gestures to those used in the examples shown in conjunction with the exemplary user interfaces in FIGS. 3A-3J, FIGS. 4A-4H, FIGS. 5A-5G, FIGS. 6A-6F, FIGS. 7A-7E, FIGS. 8A-8H, FIGS. 9A-9D, FIGS. 10A-10D, FIGS. 10E-10I, FIGS. 11A-11H, FIGS. 12A-12G, FIG. 13A, and FIGS. 13B-13E, and those used in the example method flow diagrams of FIG. 14, FIG. 15, FIG. 16, FIG. 17, and FIG. 18. These include, but are not limited to, the following:

1) Alternative gestures, actions, or events, or conditions for displaying the PPC icon and pointer:

A long-press finger gesture on touch-sensitive display.
A long-press finger gesture on content on touch-sensitive display.
A gesture elsewhere on the display.
Other gesture such as shaking the device or changing the orientation of the device Other gesture such as voice gesture.
No gesture—display PPC icon when a particular class or type of application is launched.

2) Alternative locations for the pointer first position:

In one exemplary embodiment, the pointer first position is the location of the finger gesture on the content. In other exemplary embodiments the pointer first position may be offset from the location of the finger gesture on the content.

3) Alternative gestures, actions, or events, or conditions for ceasing to display the PPC icon and pointer:

Tap on any location on touch-sensitive display not on the PPC icon.
Tap a PPC cancel icon.
Automatically cease displaying PPC icon if no finger gesture on the PPC icon is detected for a time duration.
Other gesture such as a voice gesture.

4) Alternative gestures, actions, or events, or conditions for displaying the vertical fine-adjustment icon:

A long press finger gesture on the PPC icon.
A short distance UP DN UP or DN UP DN vertical slide finger gesture on the PPC icon.
No gesture required with the vertical fine-adjustment icon always displayed with the PPC icon.
A very slow vertical slide finger gesture on the PPC icon.

5) Alternative gestures, actions, or events, or conditions for ceasing to display the vertical fine-adjustment icon:

Tap on any location on touch-sensitive display not on the vertical fine-adjustment icon.
Tap a vertical fine-adjustment cancel icon.
Cease displaying PPC icon if no finger gesture on the PPC icon is detected for a time duration.
Other gesture such as a voice gesture.

6) Alternative gestures for starting a text selection:

Tap-and-slide gesture on the PPC icon.
Tap on another icon in conjunction with a slide gesture on the PPC icon.
Two-finger slide gesture on the PPC icon.

7) Alternative gestures for placing the cursor at the position of the pointer:

Slide gesture on the PPC icon to position the pointer followed by a tap gesture to place the cursor at the pointer.
Slide gesture on the PPC icon to position the pointer followed by a finger lift to place the cursor at the pointer. In one exemplary embodiment, this gesture alternative can be made active when lift-to-tap is set to "on".

8) Alternative gestures for ending a selection or drag:

Finger lift at the end of the slide gesture on the PPC icon when the select lock or drag lock is set to "off."
Finger lift and a tap at the end of the slide gesture on the PPC icon when the select lock or drag lock set to "on".

9) Alternative gestures or events causing the displaying of a toolbar or menu:

A toolbar comprising one or more editing icons such as a "Cut" icon, "Copy" icon, or "Paste" icon may be displayed by the device whenever content is selected or a cursor is inserted within content as illustrated in FIGS. 3A-3J, FIGS. 4A-4H, FIGS. 5A-5G, FIGS. 6A-6F, FIGS. 7A-7E, FIGS. 8A-8H, FIGS. 9A-9D, FIGS. 10A-10D, FIGS. 10E-10I, FIGS. 11A-11H, FIGS. 12A-12G, FIG. 13A, and FIG. 13B.

A tool bar or menu comprising one or more selectable icons or items may be displayed by the device when a "secondary click" gesture is detected as illustrated in FIGS. 13C-13E.

10) Alternative PPC icon designs and alternative vertical fine-adjustment icon designs:

We have shown several example PPC icon designs in FIG. 3J. There are other variations on the design of the PPC icon with respect to the size and shape of the icon and presence of transparent and/or semitransparent regions, and other features and aspects that may work equally well. For example, the horizontal extent of PPC icon can be less than or equal to the horizontal extent of the display. For example, the horizontal extent of PPC icon can be substantially equal to, approximately one-half of, or approximately one-fourth of the horizontal extent of the display. The value for Kx and the functional dependence of Kx on the time rate of change of finger position in the x direction can be set by the user to provide good usability for the particular horizontal extent of the PPC icon. Finally, the size and shape of the PPC icon can changed to suit the needs of a particular application or use case. The vertical extent of the PPC icon can be chosen similarly. For example, the vertical extent of the PPC icon can be less the vertical extent of the pointer. The vertical extent of the PPC icon can be substantially equal to the vertical extent of the pointer. Finally, the vertical extent of the PPC icon can be two to four or more times the vertical extent of the pointer.

Figure 8C:
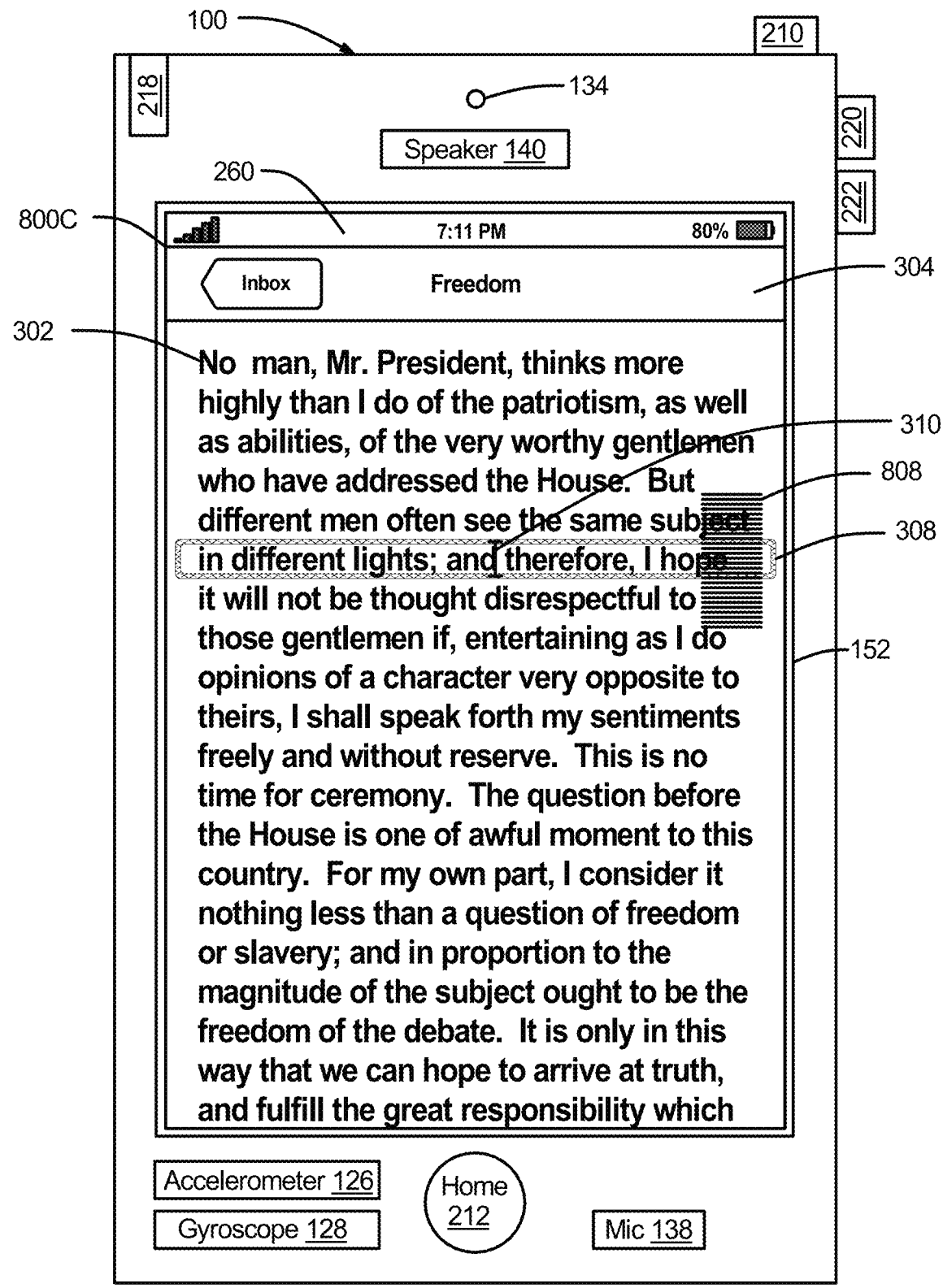
Figure 8D:
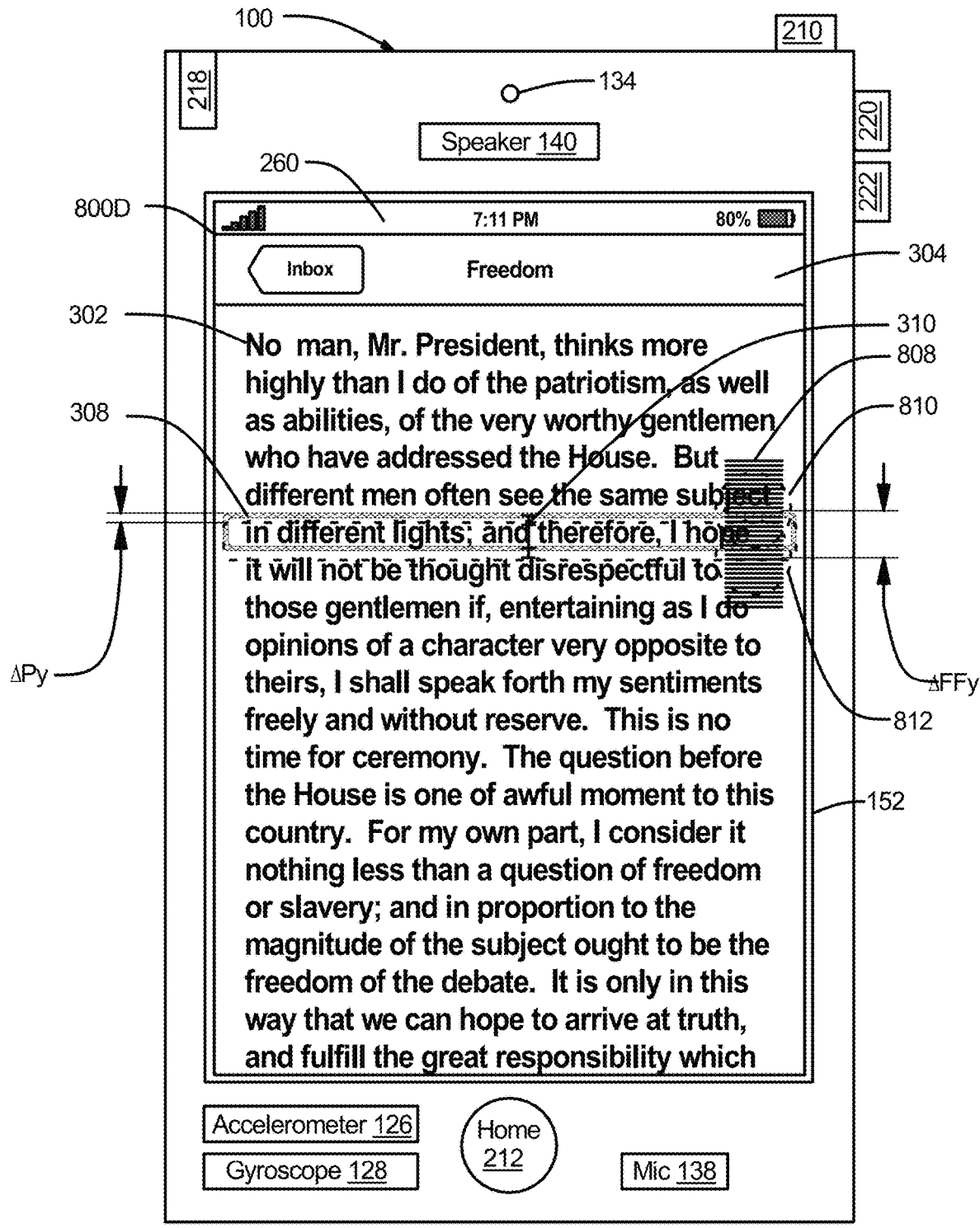
Figure 8E:
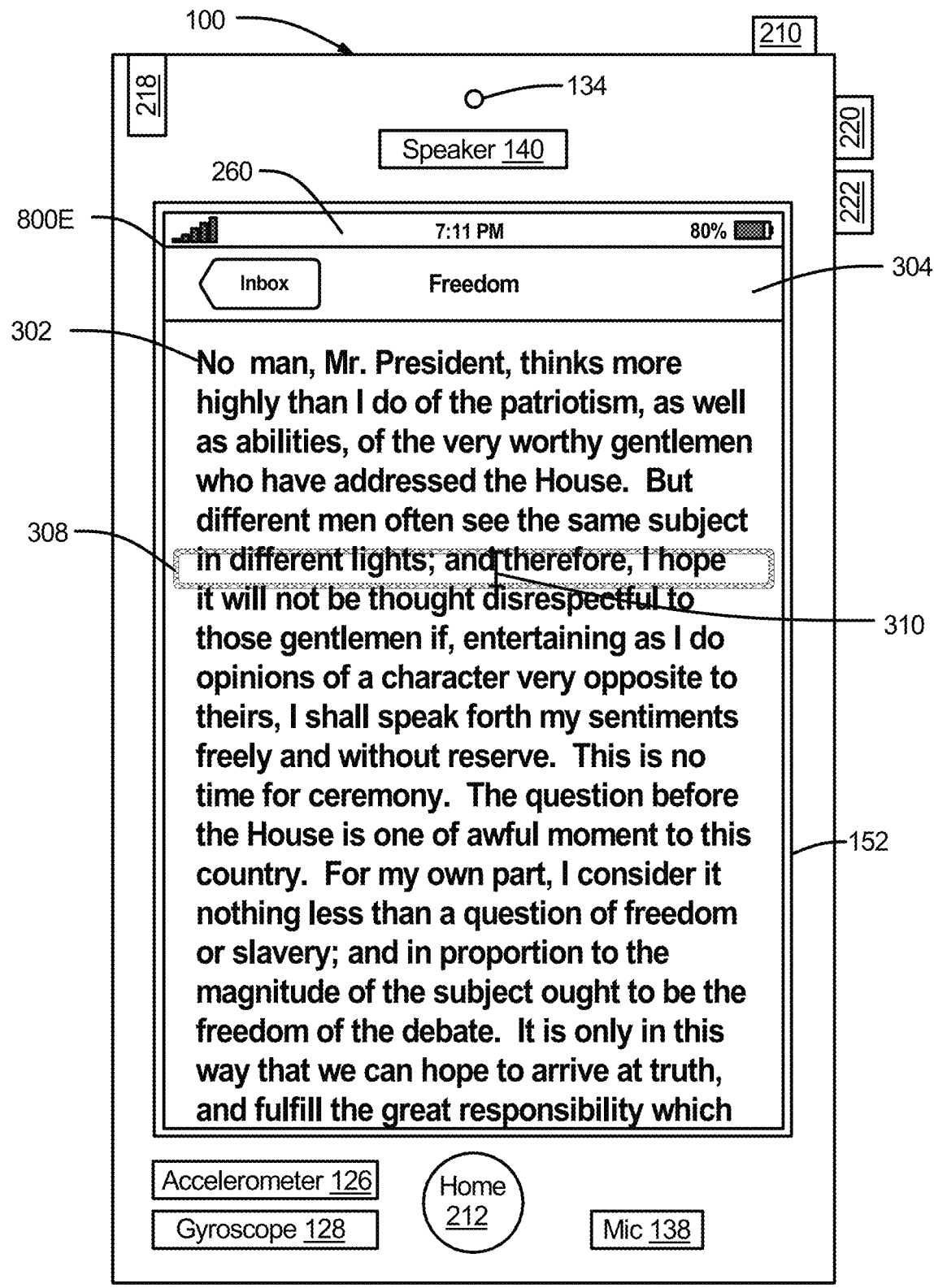
Figure 8F:
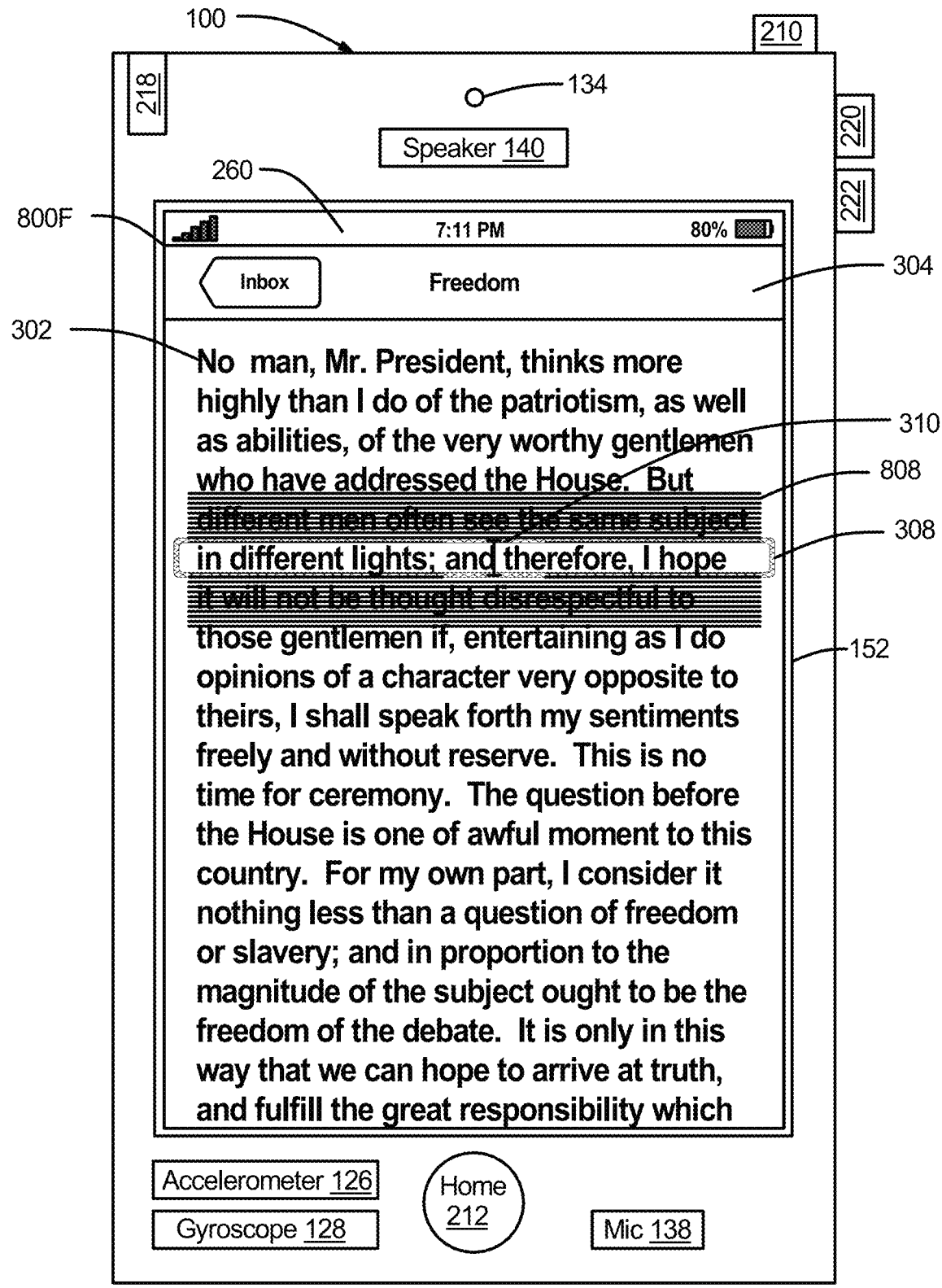
Figure 8G:
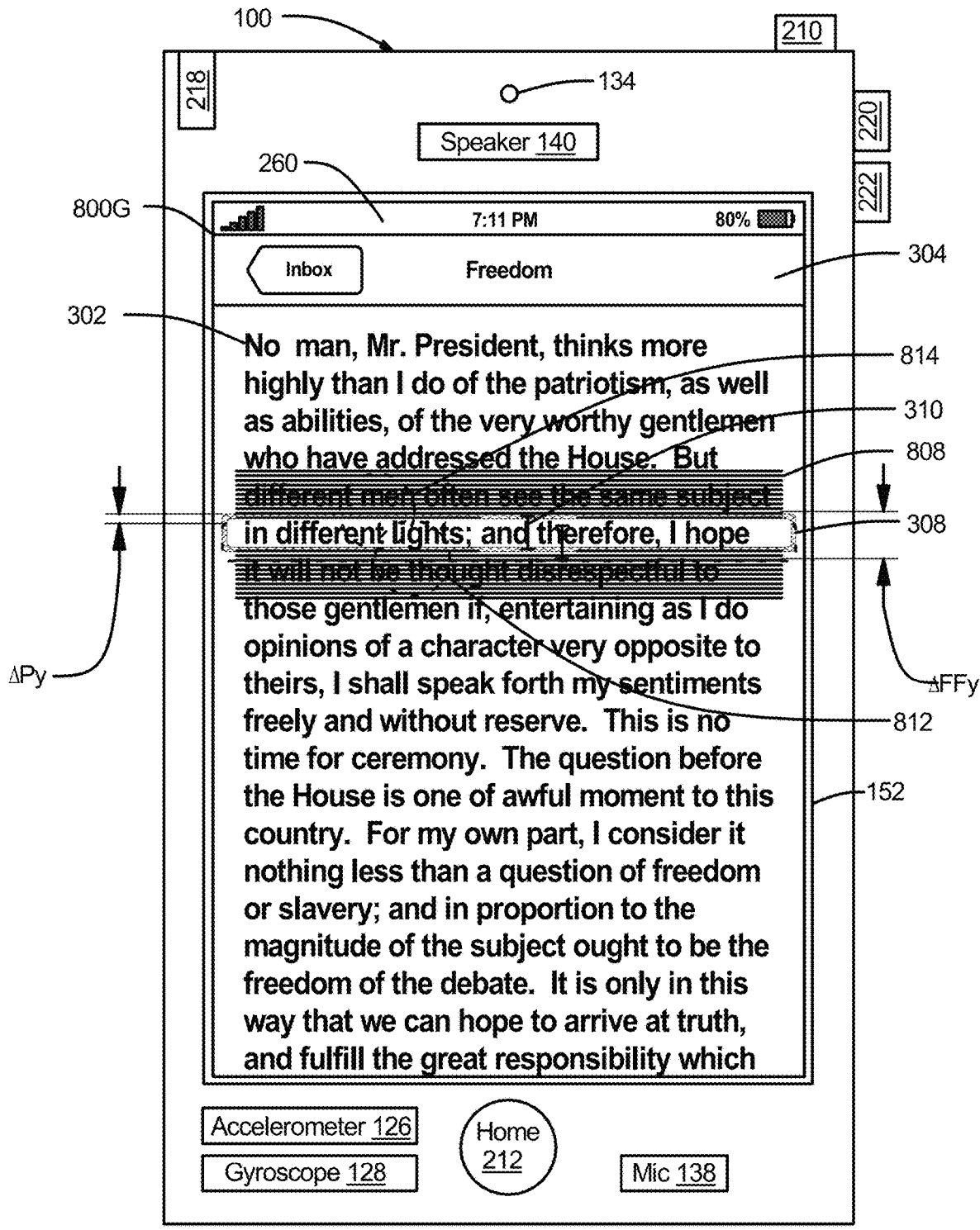
Figure 8H:
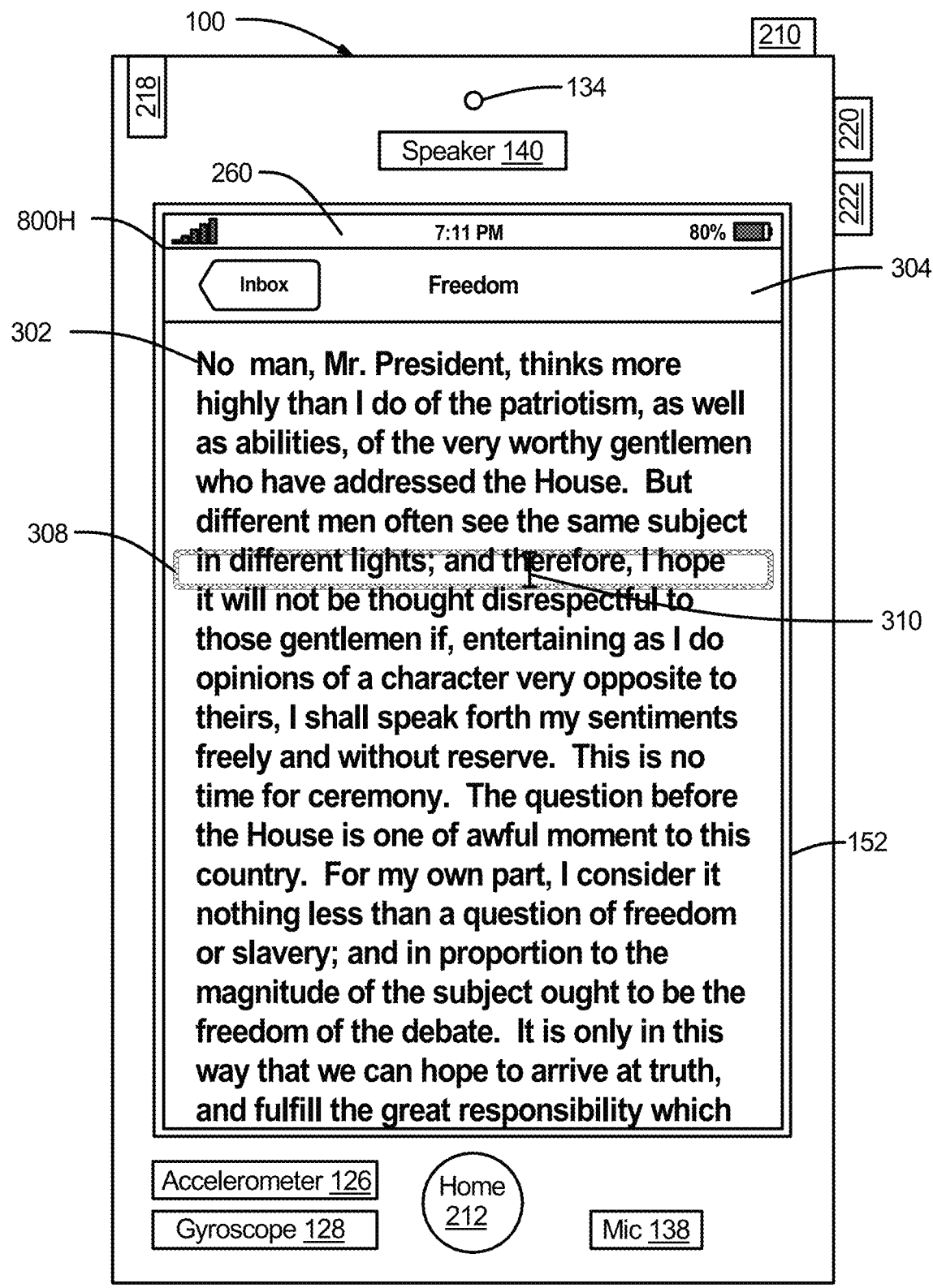

We have shown two example vertical fine-adjustment icon designs in FIG. 8C and FIG. 8F. There are other variations on the design of the vertical fine-adjustment icon with respect to the size and shape of the icon and presence of transparent and/or semitransparent regions, and other features and aspects that may work equally well. In other embodiments the value of Ky may be made a function of the time rate of change in the vertical position of the finger contact.

The methods and UI of this disclosure may include the use of stylus gestures in addition to, or in lieu of finger gestures.

Settings Parameters I:

The methods and UI may include enabling the user to specify via settings a number of parameters. These may include, but are not limited to, the enabling the user to specify one or more of the following:

Specify $K_x$ where $\Delta P_x = K_x \Delta F_x$, $\Delta P_x$ is the change in the pointer position in the x direction, $\Delta F_x$ is the change in the finger position on the PPC icon in the x direction, and $K_x$ is a constant. This can be illustrated by the following three examples: 1) If $K_x = 0.25$ and the user changes her finger position on the PPC icon in the x direction by a distance equal to the full width of the display, then the device will change the position of the pointer in the x direction by a distance equal to $\frac{1}{4}^{th}$ the width of the display. 2) If $K_x = 1.0$ and the user changes her finger position on the PPC icon in the x direction by a distance equal to the full width of the display, then the device will change the position of the pointer in the x direction by a distance equal to the width of the display. 3) If $K_x = 4.0$ and the user changes her finger position on the PPC icon in the x direction by a distance equal to $\frac{1}{4}^{th}$ the width of the display, then the device will change the position of the pointer in the x direction by a distance equal to the width of the display.

Specify $K_x$ where $\Delta P_x = K_x \Delta F_x$, $\Delta P_x$ is the change in the pointer position in the x direction, $\Delta F_x$ is the change in the finger position on the PPC icon in the x direction, and where $K_x$ is a function of the time rate of change of the finger position on the PPC icon in the x direction. This can be written $K_x = f(d\Delta F_x/dt)$. In one example embodiment this may include enabling the user to specify the dependence of $K_x$ on the time rate of change of the finger position on the PPC icon in the x direction by enabling the user to set a "pointer speed" parameter over a range of values from "slow" to "fast". In this example embodiment, with a "pointer speed" parameter set by the user at the "slow" end of the range, $K_x$ may be approximately constant with a weak dependence on the time rate of change of finger position on the PPC icon in the x-direction. With a "pointer speed" parameter set by the user at the "fast" end of the range, $K_x$ may have a strong dependence on the time rate of change of finger position on the PPC icon in the x-direction. With a "pointer speed" parameter set by the user at the mid-range position, then $K_x$ may have a moderate dependence on the time rate of change of finger position on the PPC icon in the x direction. This can be illustrated by the following example. When the time rate of change of finger position on the PPC icon in the x direction is small, then the device may set $K_x = 0.25$; when the time rate of change of finger position on the PPC icon in the x direction is large, then the device may set $K_x = 1.0$.

Specify $KF_y$ where $\Delta P_y = KF_y \Delta FF_y$, $\Delta P_y$ is the change in the pointer position in the y direction, $\Delta FF_y$ is the change in the finger position on the vertical fine-adjustment icon in the y direction, and $KF_y$ is a constant. This can be illustrated by the following two examples. 1) If a user changes her finger position on the PPC icon in the y direction by a distance equal 4 mm, then the device will change the position of the PPC icon and the position of the pointer in the y direction by a distance of 4 mm since $\Delta P_y = \Delta PPC_y = K_y \Delta F_y$ where $K_y = 1$. 2) If $KF_y = 0.25$ and the user changes her finger position on the vertical fine-adjustment icon in the y direction by a distance of 4 mm, then the device will change the position of the pointer in the y direction by a distance of 1 mm since $\Delta P_y = \Delta PPC_y = KF_y \Delta FF_y$ where $KF_y = 0.25$.

Settings Parameters II:

The methods and UI may include enabling the user to specify via settings a number of parameters. These may include, but are not limited to, the enabling the user to specify one or more of the following:

The user may define a "secondary-click" finger gesture. For example the user may define a secondary click to be one the following finger gestures or a combination thereof: 1) a two-finger-tap finger gesture on the PPC icon, 2) a one-finger-tap finger gesture near the rightmost end of the PPC icon, 3) a one-finger-tap finger gesture near the leftmost end of the PPC icon. Example "secondary-click" finger gestures are illustrated in FIGS. 13C-13E. A secondary-click finger gesture is the analog to a mouse "right click" or touch-pad "right click" on a desktop or notebook computer. Other alternative secondary-click finger gestures may be chosen including those incorporating finger gestures on other icons on the device's touch-sensitive display.

The user may define the behavior of the select mode or drag mode. The user may specify select lock (sometimes called drag lock) to be off. In this mode with select lock off, the device would end the selection of content in response to detecting that the user has lifted his finger at the end of a tap-and-slide finger gesture on the PPC icon. The user may specify select lock (sometimes called drag lock) to be on. In this mode with select lock on, the device would not end the selection of content in response to detecting that the user has lifted his finger at the end of a tap-and-slide finger gesture on the PPC icon. The device would end the selection in response to detecting a tap finger gesture after detecting that the user has lifted his finger at the end of the tap-and-slide gesture on the PPC icon. This select lock/drag lock functionality enables a user to conveniently drag an object from one location on the display to another desired location. Here the user performs a tap-and-slide gesture on the PPC icon with the pointer positioned on an object that the user wishes to drag from one position to another. With select lock/drag lock turned on, the user may conveniently drag the object using one or more slide gestures and then end the drag with a one-finger-tap finger gesture on the PPC icon once the object has been moved to the desired position.

In one exemplary embodiment, the user may define alternative gestures for placing the cursor at the position of the pointer following a slide gesture for positioning the pointer. In one setting, this can be a slide gesture on the PPC icon to position the pointer followed by a tap gesture on the PPC icon to place the cursor at the pointer. In another setting, this can be a slide gesture on the PPC icon to position the pointer followed by a finger lift to place the cursor at the pointer. In one exemplary embodiment, the latter gesture alternative can be made active when lift-to-tap is set to "on".

In another exemplary embodiment, the user may define alternative gestures for a select gesture at the position of the pointer following a slide gesture for positioning the pointer. In one setting, this can be a slide gesture on the PPC icon to position the pointer followed by a tap gesture on the PPC icon to select the item at the position of the pointer. In another setting, this can be a slide gesture on the PPC icon to position the pointer followed by a finger lift to select the item at the position of the pointer. In another exemplary embodiment, the latter gesture alternative can be made active when lift-to-tap is set to "on".

Settings Parameters III:

The methods and UI may include enabling the user to specify via settings a number of parameters for providing enhanced accessibility for users. These may include, but are not limited to, the enabling the user to specify one or more of the following:

A user may change the size of the pointer from a standard size (about 12 points in height for example) to a larger size by setting a slider control or by other means to better suit the needs or preferences of the user.

A user may change the vertical extent of the PPC icon from a standard size (about 12 points in height for example) to a larger size by setting a slider control or by other means to better suit the needs or preferences of the user.

A user may change $K_x$ as outlined above under Settings Parameters I to better serve the needs of the user for convenient and precise horizontal positioning of the pointer.

A user may change $KF_y$ as outlined above under Settings Parameters I to better serve the needs of the user for convenient and precise vertical positioning of the pointer.

Enabling the user to define the use of alternative gestures or actions such as voice commands, hand gestures, gaze gestures in addition to, or in lieu of, a particular finger gesture.

Alternative Devices with Touch-Sensitive Displays:

Whereas we have focused this disclosure on methods and graphical user interfaces for pointing and editing on mobile computing devices with touch-sensitive displays such as smart phones and pad computers, these methods and graphical user interfaces may be used with other devices with touch-sensitive displays including, but not limited to, notebook computers with touch-sensitive displays, notebook/pad hybrid devices with touch-sensitive displays, public kiosks with touch-sensitive displays, and equipment and instruments touch-sensitive displays.

This Disclosure Also Includes, but is not Limited to, the Following:

This disclosure includes methods comprising a handheld computing device 100 with a touch-sensitive display implementing one or more of the methods selected from those described in reference to FIGS. 3-13 and those described in FIG. 14, FIG. 15, FIG. 16, FIG. 17, and FIG. 18.

This disclosure includes a handheld mobile computing device 100 comprising a touch screen display, one or more processors, memory; and one or more programs, wherein one or more programs are stored in memory and configured to be executed by the one or more processors, the one or more programs including instructions for implementing one or more of the methods selected from those described in reference to FIGS. 3-13 and those described in FIG. 14, FIG. 15, FIG. 16, FIG. 17, and FIG. 18.

This disclosure includes a computer readable storage medium storage medium storing one or more programs, the one or more programs comprising instructions, which when executed by a handheld mobile computing device 100 with a touch screen display, cause the device to implement one or more of the methods selected from those described in reference to FIGS. 3-13 and those described in FIG. 14, FIG. 15, FIG. 16, FIG. 17, and FIG. 18.

This disclosure includes graphical user interfaces on a computing device with a touch sensitive display, memory, and one or more processors to execute one or more programs stored in memory, the graphical user interfaces comprising the one or more graphical users interfaces selected from those described in reference to FIGS. 3-13 and those described in reference to FIG. 14, FIG. 15, FIG. 16, FIG. 17, and FIG. 18.

Throughout this disclosure we have referred to pointer 310. We have also referred to cursor 508. Finally, we have referred to selected text, denoted by some marker such a highlighting, showing the start and end of the selection within a body of text. One selection example is selection 408 described in reference to FIG. 4D. To avoid confusion in this disclosure, let's describe again each of these items in the context of existing devices and existing graphical user interfaces.

The cursor is sometimes called an insertion mark. In this disclosure the cursor is displayed as a vertical bar. The user may position the cursor to mark the location at which text entry can begin within an editable content displayed on a display screen. In the case of a new document with no text, the cursor is displayed by default at the first position in the document where text may be entered. Since the cursor marks a text entry location, a cursor is displayed within editable content and no cursor is displayed within read-only content. The cursor is familiar to any user of a word processing application.

A text selection is also a type of mark. The user may select the location of the start of a text selection and the location of the end of that text selection. The mark denotes the portion of text that has been selected by the user. Highlighting or other means may be used identify the selected text. Since text may be selected for example for cut, copy, or paste operations within editable content, and for copy operations within read-only content, selected text may be displayed within both editable and read-only content. The selection of text is again familiar to any user of a word processing application.

A pointer is familiar to any user of an application such as a word processing application designed for use with a desktop or notebook computer. The pointer is displayed on the display screen along with any content. The user may employ a mouse device or touch-pad device to change the position of the pointer on a display screen. In one example, the user may position the pointer to a location within a displayed text document. The user may then click or tap the mouse or touch pad to place the cursor at the location of the pointer. In another familiar example, the user may position the pointer to a location within a text document at the start of a selection, hold the mouse button down while sliding the mouse to select a portion of the text content, and then release the mouse button to end the selection.

A marker such as a cursor or a selection is associated with content and thereby moves with the content if the content page is scrolled. The position of the pointer does not move with the content. The movement of the pointer is independent of movement of the content. Moving the content by page scrolling or other means does not move the pointer.

The pointer may be used to position a marker like a cursor or define the starting and ending location for a selection. The pointer may be used to drag an object on the display screen from one location to another. The pointer may be used for example to resize an image or object by placing the pointer on a drag handle at the edge or corner of the image and then moving the pointer to resize image or object. The pointer may be used to select an icon displayed on the display screen to select an action like copy, print, or save. The pointer is not associated with content like a cursor, a selection, or a drag handle.

Desktop and notebook computers employ a graphical-user-interface designed for use with a device such as a mouse or touch pad for controlling the position of a pointer on the display screen. Mobile computing devices with a touch-sensitive displays employ a graphical user interface designed for use with the user's finger as the pointer. Whereas the graphical user interfaces for these devices do include on-screen markers such as the cursor, selection marks, and drag handles for moving a cursor, resizing images, shapes, and selections, the graphical user interfaces of these devices do not employ a pointer. The pointer for these devices with touch sensitive displays is the user's finger. This UI design has a number of deficiencies as previously described in the background section.

The foregoing discussion, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to explain the principals of the invention and its practical applications, to thereby enable others skilled in the art to best utilize the invention and various embodiments with various modifications as are suited to the particular use contemplated.

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

The invention claimed is:

1. A mobile computing device, comprising:
a touch-sensitive display;
a processor;
a memory configured to store one or more programs;
wherein the processor is configured to execute the one or more programs to cause the mobile computing device to:
display a pointer;
display a control icon;
detect a contact on the touch-sensitive display; and
in response to detecting a change in a horizontal position of the contact beginning anywhere on the control icon,
change a horizontal position of the pointer wherein the horizontal position of the pointer with respect to the control icon is changed; and
in response to detecting a change in a vertical position of the contact beginning anywhere on the control icon:
change a vertical position of the pointer; and
change a vertical position of the control icon; and
wherein when content is displayed, a change in a vertical position of the content with respect to an edge of the touch-sensitive display does not cause a change in the vertical position of the pointer with respect to the edge of the touch-sensitive display.

2. The device of claim 1, the one or more programs further including instructions to cause the mobile computing device to:
display the pointer within one or more items;
detect a gesture on the control icon; and
in response to the gesture being a first gesture,
perform a first action at the position of the pointer.

3. The device of claim 2, wherein the first gesture is a tap gesture and perform a first action is select an item.

4. The device of claim 2, wherein the one or more items is editable text and the first gesture is a tap gesture and perform a first action is display an insertion marker.

5. The device of claim 1, the one or more programs further including instructions to cause the mobile computing device to:
display the pointer within one or more items;
detect a gesture on the control icon; and
in response to the gesture being a second gesture,
perform a second action beginning at the position of the pointer.

6. The device of claim 5, wherein the second gesture is a tap and change in a position of a contact beginning anywhere on the control icon and perform a second action is drag an item.

7. The device of claim 5, wherein the one or items is one or more content items, the second gesture is a tap and change in a position of a contact beginning anywhere on the control icon, and second action is select content.

8. The device of claim 1, the one or more programs further including instructions to cause the mobile computing device to:
detect a time rate of change in the horizontal position of the contact on the control icon, and wherein in response to detecting the change in the horizontal position of the contact on the control icon, change a horizontal position of the pointer by an amount proportional to the change and time rate of change in the position of the contact.

9. A non-transitory computer readable storage medium storing one or more programs, the one or more programs comprising instructions that, when executed, cause a mobile computing device having a touch-sensitive display to:
display a pointer;
display a control icon;
detecting a contact on the touch-sensitive display; and
in response to detecting a change in a horizontal position of the contact beginning anywhere on the control icon, change a horizontal position of the pointer wherein the horizontal position of the pointer with respect to the control icon is changed; and in response to detecting a change in a vertical position of a contact beginning anywhere on the control icon:
change a vertical position of the pointer; and
change a vertical position of the control icon; and wherein when content is displayed, a change in a vertical position of the content with respect to an edge of the touch-sensitive display does not cause a change in the vertical position of the pointer with respect to the edge of the touch sensitive display.

10. The non-transitory computer readable storage medium of claim 9, the one or more programs further including instructions that, when executed, cause a mobile computing device having a touch-sensitive display to:
display the pointer within one or more items;
detect a gesture on the control icon; and
in response to the gesture being a first gesture,
perform a first action at the position of the pointer.

11. The non-transitory computer readable storage medium of claim 10, wherein the first gesture is a tap gesture and perform a first action is select an item.

12. The non-transitory computer readable storage medium of claim 10, wherein the one or more items is editable text and the first gesture is a tap gesture and perform a first action is display an insertion marker.

13. The non-transitory computer readable storage medium of claim 9, the one or more programs further including instructions that, when executed, cause a mobile computing device having a touch-sensitive display to:
display the pointer within one or more items;
detect a gesture on the control icon; and
in response to the gesture being a second gesture,
perform a second action beginning at the position of the pointer.

14. The non-transitory computer readable storage medium of claim 13, wherein the second gesture is a tap and change in a position of a contact beginning anywhere on the control icon and perform a second action is drag an item.

15. The non-transitory computer readable storage medium of claim 13, wherein the one or items is one or more content items, the second gesture is a tap and change in a position of a contact beginning anywhere on the control icon, and perform a second action is select content.

16. The non-transitory computer readable storage medium of claim 9, the one or more programs further including instructions that, when executed, cause a mobile computing device having a touch-sensitive display to:
detect a time rate of change in the horizontal position of the contact on the control icon, and wherein in response to detecting the change in the horizontal position of the contact on the control icon, change a horizontal position of the pointer by an amount proportional to the change and time rate of change in the position of the contact.

17. A graphical user interface on a mobile computing device with a touch-sensitive display wherein:
a pointer is displayed;
a control icon is displayed;
a contact on the touch-sensitive display is detected; and
in response to detecting a change in a horizontal position of the contact beginning anywhere on the control icon, a horizontal position of the pointer is changed wherein the horizontal position of the pointer with respect to the control icon is changed; and in response to detecting a change in a vertical position of a contact beginning anywhere on the control icon:
a vertical position of the pointer is changed; and
a vertical position of the control icon is changed; and wherein when content is displayed, a change in a vertical position of the content with respect to an edge of the touch-sensitive display does not cause a change in the vertical position of the pointer with respect to the edge of the touch sensitive display.

18. The graphical user interface of claim 17, further including:
the pointer is displayed within one or more items;
a gesture on the control icon is detected; and
in response to the gesture being a first gesture,
a first action is performed at the position of the pointer.

19. The graphical user interface of claim 18, wherein the first gesture is a tap gesture and a first action is performed is an item is selected.

20. The graphical user interface of claim 18, wherein the one or more items is editable text and the first gesture is a tap gesture and a first action is performed is an insertion marker is displayed.

21. The graphical user interface of claim 17, further including:
a time rate of change in the horizontal position of the contact on the control icon is detected, and wherein in response to detecting the change in the horizontal position of the contact on the control icon, a horizontal position of the pointer is changed by an amount proportional to the change and time rate of change in the position of the contact.

22. A mobile computing device, comprising:
a touch-sensitive display;
a processor;
a memory configured to store one or more programs;
wherein the processor is configured to execute the one or more programs to cause the mobile computing device to:
display a pointer;
display a control icon;
detect a contact on the touch-sensitive display; and
in response to detecting a change in a horizontal position of the contact beginning anywhere on the control icon,
change a horizontal position of the pointer wherein the horizontal position of the pointer with respect to the control icon is changed; and
in response to detecting a change in a vertical position of the contact beginning anywhere on the control icon:
change a vertical position of the pointer; and
change a vertical position of the control icon; and
wherein when content is displayed, a change in a vertical position of the content with respect to an edge of the touch-sensitive display does not cause a change in the vertical position of the control icon with respect to the edge of the touch-sensitive display.

* * * * *